(12) United States Patent
Constantz et al.

(10) Patent No.: US 9,260,314 B2
(45) Date of Patent: *Feb. 16, 2016

(54) METHODS AND SYSTEMS FOR UTILIZING WASTE SOURCES OF METAL OXIDES

(71) Applicant: CALERA CORPORATION, Los Gatos, CA (US)

(72) Inventors: Brent Constantz, Portola Valley, CA (US); Paulo J. M. Monteiro, El Cerrito, CA (US); Sidney Omelon, Ontario (CA); Miguel Fernandez, San Jose, CA (US); Kasra Farsad, San Jose, CA (US); Katharine Geramita, Seattle, WA (US); Karin Yaccato, San Francisco, CA (US)

(73) Assignee: Calera Corporation, Los Gatos, CA (US)

( * ) Notice: Subject to any disclaimer, the term of this patent is extended or adjusted under 35 U.S.C. 154(b) by 311 days.

This patent is subject to a terminal disclaimer.

(21) Appl. No.: 13/887,986

(22) Filed: May 6, 2013

(65) Prior Publication Data

US 2013/0243674 A1  Sep. 19, 2013

Related U.S. Application Data

(60) Continuation of application No. 12/788,735, filed on May 27, 2010, now abandoned, which is a division of application No. 12/486,692, filed on Jun. 17, 2009, now Pat. No. 7,754,169, and a continuation-in-part of (Continued)

(51) Int. Cl.
*C01F 5/24* (2006.01)
*C04B 7/42* (2006.01)

(Continued)

(52) U.S. Cl.
CPC ............... *C01F 11/181* (2013.01); *C01F 5/24* (2013.01); *C04B 7/436* (2013.01); *C04B 14/28* (2013.01);

(Continued)

(58) Field of Classification Search
CPC .... B01D 21/01; B01D 2257/504; C02F 1/52; C02F 1/5236; C02F 1/54; C02F 2103/08; C02F 2103/12; C02F 5/24; C02F 11/18; C02F 11/181; C02F 11/182; C02F 11/185; C04B 7/14; C04B 7/147; C04B 7/153; C04B 7/1535; C04B 7/17; C04B 7/38; C04B 7/40; C04B 7/42; C04B 7/421; C04B 7/424; C04B 7/436; C04B 14/28; C04B 18/06; C04B 18/067; C04B 18/065; C04B 18/04; C04B 18/16; C04B 18/167; C04B 2002/88; C04B 2290/20
USPC ......... 210/702, 710, 714, 717, 718, 721, 723, 210/724, 738, 768–774, 806; 423/155, 160, 423/165, 173, 220, 232, 170, 184, 430, 431, 423/437, 438, 439, 441, 432
See application file for complete search history.

(56) References Cited

U.S. PATENT DOCUMENTS 1,169,766 A  2/1916  Brassert
1,172,930 A  2/1916  Brassert et al.

(Continued)

FOREIGN PATENT DOCUMENTS

AU  2001213118 B2  12/2001
AU  2007100157 A4  4/2007

(Continued)

OTHER PUBLICATIONS

Rawlins, C. Hank, "Geological sequestration of carbon dioxide by hydrous carbonate formation in steelmaking slag", Missouri Curtis Law Wilson Library, Doctoral Dissertations. Paper 1927, Spring 2008.*

(Continued)

*Primary Examiner* — Joseph Drodge
(74) *Attorney, Agent, or Firm* — Calera Corporation; Vandana Bansal

(57) ABSTRACT

Methods are provided for producing a composition comprising carbonates, wherein the methods comprise utilizing waste sources of metal oxides. An aqueous solution of divalent cations, some or all of which are derived from a waste source of metal oxides, may be contacted with CO2 and subjected to precipitation conditions to provide compositions comprising carbonates. In some embodiments, a combustion ash is the waste source of metal oxides for the aqueous solution containing divalent cations. In some embodiments, a combustion ash is used to provide a source of proton-removing agents, divalent cations, silica, metal oxides, or other desired constituents or a combination thereof.

16 Claims, 10 Drawing Sheets

Figure 1:
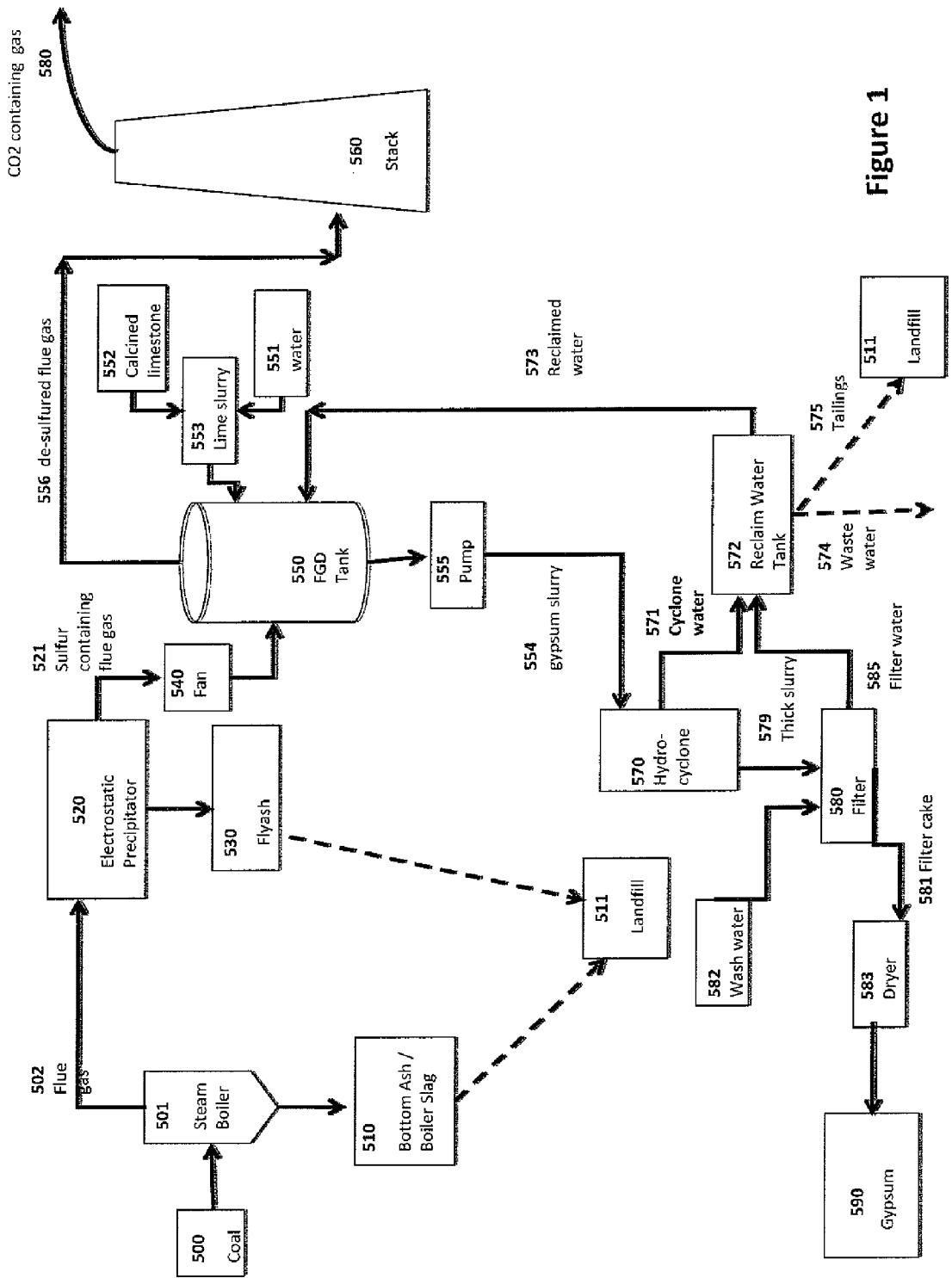

Related U.S. Application Data application No. 12/344,019, filed on Dec. 24, 2008, now Pat. No. 7,887,694, said application No. 12/486,692 is a continuation-in-part of application No. 12/344,019, filed on Dec. 24, 2008, now Pat. No. 7,887,694, and a continuation-in-part of application No. PCT/US2008/088242, filed on Dec. 23, 2008, and a continuation-in-part of application No. PCT/US2008/088246, filed on Dec. 23, 2008.

(60) Provisional application No. 61/121,872, filed on Dec. 11, 2008, provisional application No. 61/101,626, filed on Sep. 30, 2008, provisional application No. 61/088,347, filed on Aug. 13, 2008, provisional application No. 61/088,340, filed on Aug. 12, 2008, provisional application No. 61/082,766, filed on Jul. 22, 2008, provisional application No. 61/079,790, filed on Jul. 10, 2008, provisional application No. 61/073,319, filed on Jun. 17, 2008, provisional application No. 61/057,173, filed on May 29, 2008, provisional application No. 61/017,405, filed on Dec. 28, 2007.

(51) Int. Cl.
*C04B 14/28* (2006.01)
*C04B 18/06* (2006.01)
*C01F 11/18* (2006.01)
*C04B 7/43* (2006.01)

(52) U.S. Cl.
CPC ....... *B01D 2257/504* (2013.01); *C01P 2002/72* (2013.01); *C01P 2002/82* (2013.01); *C01P 2002/88* (2013.01); *C01P 2004/03* (2013.01); *C01P 2004/61* (2013.01); *C01P 2006/12* (2013.01); *C04B 2290/20* (2013.01); *Y02P 40/123* (2015.11); *Y02P 40/18* (2015.11)

(56) References Cited

U.S. PATENT DOCUMENTS

| | | |
|---|---|---|
| 1,176,747 A | 3/1916 | Ferguson |
| 1,493,579 A | 5/1924 | Walter |
| 1,543,942 A | 6/1925 | Mathesius |
| 1,655,171 A | 1/1928 | Wagner |
| 1,678,345 A | 7/1928 | Mattison |
| 1,759,361 A | 5/1930 | Miller |
| 1,785,365 A | 12/1930 | Seil |
| 1,823,269 A | 9/1931 | Grilli |
| 1,865,833 A | 7/1932 | Chesny |
| 1,897,725 A | 2/1933 | Gaus et al. |
| 1,924,503 A | 8/1933 | Lambert |
| 1,986,736 A | 1/1935 | Mauthe et al. |
| 2,006,295 A | 6/1935 | Chewning et al. |
| 2,054,315 A | 9/1936 | Ebner et al. |
| 2,082,101 A | 6/1937 | Dougherty |
| 2,204,771 A | 6/1940 | Rice et al. |
| 2,227,465 A | 1/1941 | Roche, Jr. et al. |
| 2,241,674 A | 5/1941 | Mohr, Jr. et al. |
| 2,242,294 A | 5/1941 | Fox et al. |
| 2,273,795 A | 2/1942 | Heise et al. |
| 2,304,391 A | 12/1942 | Zimmerman |
| 2,329,940 A | 9/1943 | Ponzer |
| 2,383,674 A | 8/1945 | Osborne |
| 2,458,039 A | 1/1949 | Wait |
| 2,474,381 A | 6/1949 | Sladick |
| 2,606,839 A | 8/1952 | Evans |
| 2,650,084 A | 8/1953 | White |
| 2,776,132 A | 1/1957 | Pyzel |
| 2,810,450 A | 10/1957 | Hartmann |
| 2,934,419 A | 4/1960 | Cook |
| 2,967,807 A | 1/1961 | Osborne et al. |
| 3,046,152 A | 7/1962 | Tsuneyoshi |
| 3,067,007 A | 8/1962 | Hatch et al. |
| 3,120,426 A | 2/1964 | Crawford, Jr. |
| 3,165,460 A | 1/1965 | Zang et al. |
| 3,179,579 A | 4/1965 | Gustave et al. |
| 3,196,092 A | 7/1965 | Beer |
| 3,202,522 A | 8/1965 | Chi-Sun Yang et al. |
| 3,222,267 A | 12/1965 | Tirrell et al. |
| 3,262,865 A | 7/1966 | Waters, Jr. |
| 3,264,125 A | 8/1966 | Bourlin et al. |
| 3,321,269 A | 5/1967 | Yasui et al. |
| 3,322,574 A | 5/1967 | Justi et al. |
| 3,340,003 A | 9/1967 | Judd |
| 3,350,292 A | 10/1967 | Weinberger et al. |
| 3,374,164 A | 3/1968 | Balej et al. |
| 3,420,775 A | 1/1969 | Cadwallader |
| 3,463,814 A | 8/1969 | Blanco et al. |
| 3,466,169 A | 9/1969 | Nowak et al. |
| 3,471,999 A | 10/1969 | Schon |
| 3,511,595 A | 5/1970 | Fuchs |
| 3,511,712 A | 5/1970 | Giner |
| 3,525,675 A | 8/1970 | Gaudin |
| 3,538,036 A | 11/1970 | Frazier et al. |
| 3,558,769 A | 1/1971 | Globus |
| 3,574,530 A | 4/1971 | Suriani et al. |
| 3,627,479 A | 12/1971 | Yee |
| 3,627,480 A | 12/1971 | Birchall |
| 3,630,762 A | 12/1971 | Olton et al. |
| 3,663,379 A | 5/1972 | Kendall |
| 3,686,372 A | 8/1972 | Hiatt et al. |
| 3,721,621 A | 3/1973 | Hough |
| 3,725,267 A | 4/1973 | Gelblum |
| 3,733,788 A | 5/1973 | Crowley |
| 3,816,592 A | 6/1974 | Rinaldi et al. |
| 3,834,129 A | 9/1974 | Darlinger et al. |
| 3,847,632 A | 11/1974 | Blengsli |
| 3,861,928 A | 1/1975 | Slater et al. |
| 3,864,236 A | 2/1975 | Lindstrom |
| 3,869,255 A | 3/1975 | De Witt et al. |
| 3,904,496 A | 9/1975 | Harke et al. |
| 3,907,526 A | 9/1975 | Saleem et al. |
| 3,912,801 A | 10/1975 | Stephens |
| 3,917,795 A | 11/1975 | Pelczarski et al. |
| 3,925,534 A | 12/1975 | Singleton et al. |
| 3,953,568 A | 4/1976 | Seko et al. |
| 3,959,419 A | 5/1976 | Kitterman |
| 3,963,592 A | 6/1976 | Lindstrom |
| 3,970,528 A | 7/1976 | Zirngiebl et al. |
| 3,975,503 A | 8/1976 | Hauschild et al. |
| 3,984,523 A | 10/1976 | Schafer et al. |
| 3,997,303 A | 12/1976 | Newton |
| 4,000,991 A | 1/1977 | Melin, Jr. et al. |
| 4,002,721 A | 1/1977 | Guffy et al. |
| 4,026,716 A | 5/1977 | Urschel, III et al. |
| 4,036,749 A | 7/1977 | Anderson |
| 4,040,852 A | 8/1977 | Jones |
| 4,045,524 A | 8/1977 | Bornert |
| 4,069,063 A | 1/1978 | Ball |
| 4,080,270 A | 3/1978 | O'Leary et al. |
| 4,106,296 A | 8/1978 | Leonard, Jr. et al. |
| 4,107,022 A | 8/1978 | Strempel et al. |
| 4,117,060 A | 9/1978 | Murray |
| 4,128,462 A | 12/1978 | Ghiringhelli et al. |
| 4,140,510 A | 2/1979 | Scholze et al. |
| 4,147,599 A | 4/1979 | O'Leary et al. |
| 4,157,250 A | 6/1979 | Regehr et al. |
| 4,164,537 A | 8/1979 | Drostholm et al. |
| 4,174,974 A * | 11/1979 | Fondriest ............... 106/735 |
| 4,181,580 A | 1/1980 | Kitayama et al. |
| 4,188,291 A | 2/1980 | Anderson |
| 4,217,186 A | 8/1980 | McRae |
| 4,219,396 A | 8/1980 | Gancy et al. |
| 4,242,185 A | 12/1980 | McRae |
| 4,246,075 A | 1/1981 | Hilbertz |
| 4,253,922 A | 3/1981 | Welch |
| 4,263,021 A | 4/1981 | Downs et al. |
| 4,264,367 A | 4/1981 | Schutz |
| 4,303,549 A | 12/1981 | Boylan |
| 4,307,066 A | 12/1981 | Davidson |
| 4,308,298 A | 12/1981 | Chen |
| 4,312,646 A | 1/1982 | Fattinger et al. |

(56) References Cited

U.S. PATENT DOCUMENTS

| | | |
|---|---|---|
| 4,315,872 A | 2/1982 | Senjo et al. |
| 4,335,788 A | 6/1982 | Murphey et al. |
| 4,337,230 A | 6/1982 | Ellestad et al. |
| 4,340,572 A | 7/1982 | Ben-Shmuel et al. |
| 4,361,475 A | 11/1982 | Moeglich |
| 4,363,667 A | 12/1982 | Birchall |
| 4,370,307 A | 1/1983 | Judd |
| 4,376,101 A | 3/1983 | Sartori et al. |
| 4,377,554 A | 3/1983 | Johnson |
| 4,410,606 A | 10/1983 | Loutfy et al. |
| 4,432,175 A | 2/1984 | Smith |
| 4,440,611 A | 4/1984 | Dhar et al. |
| 4,450,009 A | 5/1984 | Childs et al. |
| 4,477,573 A | 10/1984 | Taufen |
| 4,508,545 A | 4/1985 | DeLoach |
| 4,561,945 A | 12/1985 | Coker et al. |
| 4,588,443 A | 5/1986 | Bache |
| 4,620,969 A | 11/1986 | Wilkinson |
| 4,634,533 A | 1/1987 | Somerville et al. |
| 4,670,234 A | 6/1987 | Holter et al. |
| 4,716,027 A | 12/1987 | Morrison |
| 4,738,695 A | 4/1988 | Can et al. |
| 4,804,449 A | 2/1989 | Sweeney |
| 4,818,367 A | 4/1989 | Winkler |
| 4,838,941 A | 6/1989 | Hill |
| 4,852,344 A | 8/1989 | Warner |
| 4,876,097 A | 10/1989 | Autant et al. |
| 4,880,447 A | 11/1989 | Bloch |
| 4,889,633 A | 12/1989 | Pfenninger |
| 4,899,544 A | 2/1990 | Boyd |
| 4,915,877 A | 4/1990 | Shepherd |
| 4,915,914 A | 4/1990 | Morrison |
| 4,931,264 A | 6/1990 | Rochelle et al. |
| 5,037,286 A | 8/1991 | Roberts |
| 5,100,633 A | 3/1992 | Morrison |
| 5,127,765 A | 7/1992 | Millgard |
| 5,141,620 A | 8/1992 | Molter |
| 5,230,734 A | 7/1993 | Kumasaka et al. |
| 5,244,304 A | 9/1993 | Weill et al. |
| 5,246,551 A | 9/1993 | Pletcher et al. |
| 5,275,651 A | 1/1994 | Minayoshi et al. |
| 5,275,794 A | 1/1994 | Luna |
| 5,282,935 A | 2/1994 | Cawlfield et al. |
| 5,318,758 A | 6/1994 | Fujii et al. |
| 5,332,564 A | 7/1994 | Chapnerkar et al. |
| 5,348,712 A | 9/1994 | Marquis et al. |
| 5,362,688 A | 11/1994 | Porta et al. |
| 5,364,611 A | 11/1994 | Iijima et al. |
| 5,366,513 A | 11/1994 | Goldmann et al. |
| 5,376,343 A | 12/1994 | Fouche |
| 5,378,279 A | 1/1995 | Conroy |
| 5,388,456 A | 2/1995 | Kettel |
| 5,427,608 A | 6/1995 | Auer et al. |
| 5,439,509 A | 8/1995 | Spink et al. |
| 5,455,013 A | 10/1995 | Shibata et al. |
| 5,470,671 A | 11/1995 | Fletcher et al. |
| 5,520,898 A | 5/1996 | Pinnavaia et al. |
| 5,527,387 A | 6/1996 | Anderson et al. |
| 5,531,821 A | 7/1996 | Wu |
| 5,531,865 A | 7/1996 | Cole |
| 5,536,310 A | 7/1996 | Brook et al. |
| 5,547,027 A | 8/1996 | Chan et al. |
| 5,569,558 A | 10/1996 | Takeuchi et al. |
| 5,584,923 A | 12/1996 | Wu |
| 5,584,926 A | 12/1996 | Borgholm et al. |
| 5,587,083 A | 12/1996 | Twardowski |
| 5,595,641 A | 1/1997 | Traini et al. |
| 5,614,078 A | 3/1997 | Lubin et al. |
| 5,618,392 A | 4/1997 | Furuya |
| 5,624,493 A | 4/1997 | Wagh et al. |
| 5,643,415 A | 7/1997 | Wise et al. |
| 5,676,749 A | 10/1997 | Takagi |
| 5,683,587 A | 11/1997 | Ferrara et al. |
| 5,690,729 A | 11/1997 | Jones, Jr. |
| 5,702,585 A | 12/1997 | Hillrichs et al. |
| 5,749,930 A | 5/1998 | Wolf et al. |
| 5,766,338 A | 6/1998 | Weber |
| 5,766,339 A | 6/1998 | Babu et al. |
| 5,776,328 A | 7/1998 | Traini et al. |
| 5,785,868 A | 7/1998 | Li et al. |
| 5,792,440 A | 8/1998 | Huege |
| 5,792,441 A | 8/1998 | Paleologou et al. |
| 5,803,894 A | 9/1998 | Kao et al. |
| 5,833,736 A | 11/1998 | Durham et al. |
| 5,846,669 A | 12/1998 | Smotkin et al. |
| 5,849,075 A | 12/1998 | Hopkins et al. |
| 5,853,686 A | 12/1998 | Doxsee |
| 5,855,666 A | 1/1999 | Kao et al. |
| 5,855,759 A | 1/1999 | Keating et al. |
| 5,879,948 A | 3/1999 | Van Pelt et al. |
| 5,885,478 A | 3/1999 | Montgomery et al. |
| 5,897,704 A | 4/1999 | Baglin |
| 5,904,829 A | 5/1999 | Foller et al. |
| 5,925,255 A | 7/1999 | Mukhopadhyay |
| 5,958,353 A | 9/1999 | Eyal |
| 5,965,201 A | 10/1999 | Jones, Jr. |
| 5,994,838 A | 11/1999 | Klinedinst et al. |
| 6,024,848 A | 2/2000 | Dufner et al. |
| 6,059,974 A | 5/2000 | Scheurman, III |
| 6,071,336 A | 6/2000 | Fairchild et al. |
| 6,080,297 A | 6/2000 | Ayers |
| 6,080,320 A | 6/2000 | von Phul |
| 6,090,197 A | 7/2000 | Vivian et al. |
| 6,129,832 A | 10/2000 | Fuhr et al. |
| 6,139,605 A | 10/2000 | Carnell et al. |
| 6,174,507 B1 | 1/2001 | Wallace et al. |
| 6,180,012 B1 | 1/2001 | Rongved |
| 6,180,074 B1 | 1/2001 | Fourcot et al. |
| 6,186,426 B1 | 2/2001 | Killer |
| 6,190,301 B1 | 2/2001 | Murray et al. |
| 6,190,428 B1 | 2/2001 | Rolison et al. |
| 6,200,381 B1 | 3/2001 | Rechichi |
| 6,200,543 B1 | 3/2001 | Allebach et al. |
| 6,217,728 B1 | 4/2001 | Lehmann et al. |
| 6,221,225 B1 | 4/2001 | Mani |
| 6,228,145 B1 | 5/2001 | Falk-Pedersen et al. |
| 6,235,186 B1 | 5/2001 | Tanaka et al. |
| 6,248,166 B1 | 6/2001 | Solsvik |
| 6,251,255 B1 | 6/2001 | Copping et al. |
| 6,251,356 B1 | 6/2001 | Mathur |
| 6,264,736 B1 | 7/2001 | Knopf et al. |
| 6,264,740 B1 | 7/2001 | McNulty, Jr. |
| 6,280,505 B1 | 8/2001 | Torkildsen et al. |
| 6,284,208 B1 | 9/2001 | Thomassen, Thomas |
| 6,293,731 B1 | 9/2001 | Studer |
| 6,309,570 B1 | 10/2001 | Fellabaum |
| 6,331,207 B1 | 12/2001 | Gebhardt |
| 6,352,576 B1 | 3/2002 | Spencer et al. |
| 6,375,825 B1 | 4/2002 | Mauldin et al. |
| 6,387,174 B2 | 5/2002 | Knopf et al. |
| 6,387,212 B1 | 5/2002 | Christian |
| 6,402,824 B1 | 6/2002 | Freeman et al. |
| 6,402,831 B1 | 6/2002 | Sawara et al. |
| 6,416,574 B1 | 7/2002 | Steelhammer et al. |
| 6,428,767 B1 | 8/2002 | Burch et al. |
| 6,444,107 B2 | 9/2002 | Hartel et al. |
| 6,447,437 B1 | 9/2002 | Lee et al. |
| 6,468,074 B1 | 10/2002 | Wu |
| 6,475,460 B1 | 11/2002 | Max |
| 6,495,013 B2 | 12/2002 | Mazur et al. |
| 6,500,319 B2 | 12/2002 | LaConti et al. |
| 6,517,631 B1 | 2/2003 | Bland |
| 6,518,217 B2 | 2/2003 | Xing et al. |
| 6,537,456 B2 | 3/2003 | Mukhopadhyay |
| 6,589,405 B2 | 7/2003 | Weres et al. |
| 6,602,630 B1 | 8/2003 | Gopal |
| 6,613,141 B2 | 9/2003 | Key, Jr. |
| 6,620,856 B1 | 9/2003 | Mortimer et al. |
| 6,623,555 B1 | 9/2003 | Haverinen et al. |
| 6,638,413 B1 | 10/2003 | Weinberg et al. |
| 6,648,949 B1 | 11/2003 | Der et al. |
| 6,676,744 B2 | 1/2004 | Merkley et al. |
| 6,712,946 B2 | 3/2004 | Genders et al. |
| 6,755,905 B2 | 6/2004 | Oates et al. |

(56) References Cited

U.S. PATENT DOCUMENTS

| | | |
|---|---|---|
| 6,776,972 B2 | 8/2004 | Vohra et al. |
| 6,786,963 B2 | 9/2004 | Matherly et al. |
| 6,841,512 B1 | 1/2005 | Fetcenko et al. |
| 6,881,256 B2 | 4/2005 | Orange et al. |
| 6,890,419 B2 | 5/2005 | Reichman et al. |
| 6,890,497 B2 | 5/2005 | Rau et al. |
| 6,908,507 B2 | 6/2005 | Lalande et al. |
| 6,936,573 B2 | 8/2005 | Wertz et al. |
| 6,938,425 B2 | 9/2005 | Simpson et al. |
| 7,037,434 B2 | 5/2006 | Myers et al. |
| 7,040,400 B2 | 5/2006 | de Rouffignac et al. |
| 7,132,090 B2 | 11/2006 | Dziedzic et al. |
| 7,135,604 B2 | 11/2006 | Ding et al. |
| 7,147,692 B2 | 12/2006 | Fornai et al. |
| 7,182,851 B2 | 2/2007 | Gomez |
| 7,198,722 B2 | 4/2007 | Hussain |
| 7,255,842 B1 | 8/2007 | Yeh et al. |
| 7,261,912 B2 | 8/2007 | Zeigler |
| 7,264,704 B2 | 9/2007 | Nevosi et al. |
| 7,273,540 B2 | 9/2007 | Sonoda et al. |
| 7,282,189 B2 | 10/2007 | Zauderer |
| 7,285,166 B2 | 10/2007 | Luke et al. |
| 7,314,847 B1 | 1/2008 | Siriwardane |
| 7,347,896 B2 | 3/2008 | Harrison |
| 7,390,444 B2 | 6/2008 | Ramme et al. |
| 7,427,449 B2 | 9/2008 | Delaney et al. |
| 7,440,871 B2 | 10/2008 | McConnell et al. |
| 7,452,449 B2 | 11/2008 | Weinberg et al. |
| 7,455,854 B2 | 11/2008 | Gower et al. |
| 7,459,134 B2 | 12/2008 | Cadours et al. |
| 7,541,011 B2 | 6/2009 | Hu |
| 7,595,001 B2 | 9/2009 | Arakel et al. |
| 7,597,747 B1 | 10/2009 | Nagel |
| 7,628,847 B2 | 12/2009 | Pope et al. |
| 7,674,443 B1 | 3/2010 | Davis |
| 7,699,909 B2 | 4/2010 | Lackner et al. |
| 7,704,369 B2 | 4/2010 | Olah et al. |
| 7,704,370 B2 | 4/2010 | Coustry et al. |
| 7,727,374 B2 | 6/2010 | Jones |
| 7,735,274 B2 | 6/2010 | Constantz et al. |
| 7,736,430 B2 | 6/2010 | Barron et al. |
| 7,744,761 B2 | 6/2010 | Constantz et al. |
| 7,749,476 B2 | 7/2010 | Constantz et al. |
| 7,753,618 B2 | 7/2010 | Constantz et al. |
| 7,754,169 B2 | 7/2010 | Constantz et al. |
| 7,771,684 B2 | 8/2010 | Constantz et al. |
| 7,790,012 B2 | 9/2010 | Kirk et al. |
| 7,815,880 B2 | 10/2010 | Constantz et al. |
| 7,829,053 B2 | 11/2010 | Constantz et al. |
| 7,842,264 B2 | 11/2010 | Cooper et al. |
| 7,875,163 B2 | 1/2011 | Gilliam et al. |
| 7,875,674 B2 | 1/2011 | Kirkpatrick et al. |
| 7,887,694 B2 | 2/2011 | Constantz et al. |
| 7,906,028 B2 | 3/2011 | Constantz et al. |
| 7,914,685 B2 | 3/2011 | Constantz et al. |
| 7,919,064 B2 | 4/2011 | Kawatra et al. |
| 7,922,809 B1 | 4/2011 | Constantz et al. |
| 7,931,809 B2 | 4/2011 | Constantz et al. |
| 7,939,336 B2 | 5/2011 | Constantz et al. |
| 7,966,250 B2 | 6/2011 | Constantz et al. |
| 7,993,500 B2 | 8/2011 | Gilliam et al. |
| 7,993,511 B2 | 8/2011 | Gilliam et al. |
| 8,006,446 B2 | 8/2011 | Constantz et al. |
| 8,062,418 B2 | 11/2011 | Constantz et al. |
| 8,105,558 B2 | 1/2012 | Comrie |
| 8,114,214 B2 | 2/2012 | Constantz et al. |
| 8,137,455 B1 | 3/2012 | Constantz et al. |
| 8,431,100 B2 | 4/2013 | Constantz et al. |
| 8,470,275 B2 | 6/2013 | Constantz et al. |
| 8,603,424 B2 | 12/2013 | Constantz et al. |
| 8,869,477 B2 | 10/2014 | Ha et al. |
| 8,883,104 B2 | 11/2014 | Seeker et al. |
| 8,894,830 B2 | 11/2014 | Gilliam et al. |
| 9,061,940 B2 * | 6/2015 | Chen et al. |
| 2001/0022952 A1 | 9/2001 | Rau et al. |
| 2001/0023655 A1 | 9/2001 | Knopf et al. |
| 2001/0054253 A1 | 12/2001 | Takahashi et al. |
| 2002/0009410 A1 | 1/2002 | Mathur |
| 2002/0091177 A1 * | 7/2002 | Gonnon et al. ............... 524/5 |
| 2002/0127474 A1 | 9/2002 | Fleischer et al. |
| 2002/0151017 A1 | 10/2002 | Stemmer et al. |
| 2002/0155103 A1 | 10/2002 | Crippen et al. |
| 2003/0017088 A1 | 1/2003 | Downs et al. |
| 2003/0027023 A1 | 2/2003 | Dutil et al. |
| 2003/0123930 A1 | 7/2003 | Jacobs et al. |
| 2003/0126899 A1 | 7/2003 | Wolken |
| 2003/0146163 A1 | 8/2003 | Sasowsky et al. |
| 2003/0170159 A1 | 9/2003 | Honjo et al. |
| 2003/0188668 A1 | 10/2003 | Bland |
| 2003/0213937 A1 | 11/2003 | Yaniv |
| 2003/0229572 A1 | 12/2003 | Raines et al. |
| 2004/0007476 A1 | 1/2004 | Tennakoon et al. |
| 2004/0014845 A1 | 1/2004 | Takamura et al. |
| 2004/0028963 A1 | 2/2004 | Kormann et al. |
| 2004/0040671 A1 | 3/2004 | Duesel, Jr. et al. |
| 2004/0040715 A1 | 3/2004 | Wellington et al. |
| 2004/0052865 A1 | 3/2004 | Gower et al. |
| 2004/0094279 A1 | 5/2004 | Myatt |
| 2004/0109927 A1 | 6/2004 | Ang et al. |
| 2004/0111968 A1 | 6/2004 | Day et al. |
| 2004/0126293 A1 | 7/2004 | Geerlings et al. |
| 2004/0139891 A1 | 7/2004 | Merkley et al. |
| 2004/0151957 A1 | 8/2004 | Brooks et al. |
| 2004/0213705 A1 | 10/2004 | Blencoe et al. |
| 2004/0219090 A1 | 11/2004 | Dziedzic et al. |
| 2004/0224214 A1 | 11/2004 | Vamos et al. |
| 2004/0228788 A1 | 11/2004 | Nagai et al. |
| 2004/0231568 A1 | 11/2004 | Morioka et al. |
| 2004/0234443 A1 | 11/2004 | Chen et al. |
| 2004/0259231 A1 | 12/2004 | Bhattacharya |
| 2004/0267077 A1 | 12/2004 | Ding et al. |
| 2005/0002847 A1 | 1/2005 | Maroto-Valer et al. |
| 2005/0011770 A1 | 1/2005 | Katsuyoshi et al. |
| 2005/0031515 A1 | 2/2005 | Charette |
| 2005/0031522 A1 | 2/2005 | Delaney et al. |
| 2005/0036932 A1 | 2/2005 | Takahashi et al. |
| 2005/0087496 A1 | 4/2005 | Borseth |
| 2005/0098499 A1 | 5/2005 | Hussain |
| 2005/0103234 A1 | 5/2005 | McNulty |
| 2005/0106110 A1 | 5/2005 | Liu |
| 2005/0112044 A1 | 5/2005 | Kuma et al. |
| 2005/0118081 A1 | 6/2005 | Harris et al. |
| 2005/0129606 A1 | 6/2005 | Mitsuhashi et al. |
| 2005/0136310 A1 | 6/2005 | Luo et al. |
| 2005/0154669 A1 | 7/2005 | Streetman |
| 2005/0180910 A1 | 8/2005 | Park et al. |
| 2005/0232855 A1 | 10/2005 | Stevens et al. |
| 2005/0232856 A1 | 10/2005 | Stevens et al. |
| 2005/0238563 A1 | 10/2005 | Eighmy et al. |
| 2005/0252215 A1 | 11/2005 | Beaumont |
| 2005/0255174 A1 | 11/2005 | Shelley et al. |
| 2006/0039853 A1 | 2/2006 | Fan et al. |
| 2006/0048517 A1 | 3/2006 | Fradette et al. |
| 2006/0051274 A1 | 3/2006 | Wright et al. |
| 2006/0057036 A1 | 3/2006 | Ayala Hermosillo |
| 2006/0060532 A1 | 3/2006 | Davis |
| 2006/0093540 A1 | 5/2006 | Fan et al. |
| 2006/0105082 A1 | 5/2006 | Zeigler |
| 2006/0165583 A1 | 7/2006 | Makino et al. |
| 2006/0169177 A1 | 8/2006 | Jardine et al. |
| 2006/0169593 A1 | 8/2006 | Xu et al. |
| 2006/0173169 A1 | 8/2006 | Cheryan |
| 2006/0184445 A1 | 8/2006 | Sandor et al. |
| 2006/0185516 A1 | 8/2006 | Moriyama et al. |
| 2006/0185560 A1 | 8/2006 | Ramme et al. |
| 2006/0185985 A1 | 8/2006 | Jones |
| 2006/0186562 A1 | 8/2006 | Wright et al. |
| 2006/0189837 A1 | 8/2006 | Forrester |
| 2006/0194086 A1 | 8/2006 | Hsu |
| 2006/0195002 A1 | 8/2006 | Grandjean et al. |
| 2006/0196836 A1 | 9/2006 | Arakel et al. |
| 2006/0245993 A1 | 11/2006 | Magumbe et al. |
| 2006/0249380 A1 | 11/2006 | Gestermann et al. |
| 2006/0286011 A1 | 12/2006 | Anttila et al. |

(56) References Cited

U.S. PATENT DOCUMENTS

| | | |
|---|---|---|
| 2006/0288912 A1 | 12/2006 | Sun et al. |
| 2007/0045125 A1 | 3/2007 | Hartvigsen et al. |
| 2007/0056487 A1 | 3/2007 | Anthony et al. |
| 2007/0084344 A1 | 4/2007 | Moriya et al. |
| 2007/0092427 A1 | 4/2007 | Anthony et al. |
| 2007/0099038 A1 | 5/2007 | Galloway |
| 2007/0113500 A1 | 5/2007 | Zhao |
| 2007/0148509 A1 | 6/2007 | Colbow et al. |
| 2007/0163443 A1 | 7/2007 | Moriyama et al. |
| 2007/0184394 A1 | 8/2007 | Comrie |
| 2007/0186820 A1 | 8/2007 | O'Hearn |
| 2007/0187247 A1 | 8/2007 | Lackner et al. |
| 2007/0202032 A1 | 8/2007 | Geerlings et al. |
| 2007/0212584 A1 | 9/2007 | Chuang |
| 2007/0217981 A1 | 9/2007 | Van Essendelft |
| 2007/0233616 A1 | 10/2007 | Richards et al. |
| 2007/0240570 A1 | 10/2007 | Jadhav et al. |
| 2007/0251393 A1 | 11/2007 | Pope et al. |
| 2007/0261947 A1 | 11/2007 | Geerlings et al. |
| 2007/0266632 A1 | 11/2007 | Tsangaris et al. |
| 2008/0031801 A1 | 2/2008 | Lackner et al. |
| 2008/0035036 A1 | 2/2008 | Bassani et al. |
| 2008/0053104 A1 | 3/2008 | Haase et al. |
| 2008/0059206 A1 | 3/2008 | Jenkins |
| 2008/0099122 A1 | 5/2008 | Andersen et al. |
| 2008/0104858 A1 | 5/2008 | Carin et al. |
| 2008/0112868 A1 | 5/2008 | Blencoe et al. |
| 2008/0134891 A1 | 6/2008 | Jarvenpaa |
| 2008/0138265 A1 | 6/2008 | Lackner et al. |
| 2008/0171158 A1 | 7/2008 | Maddan |
| 2008/0178739 A1 | 7/2008 | Lewnard et al. |
| 2008/0213146 A1 | 9/2008 | Zauderer |
| 2008/0223727 A1 | 9/2008 | Oloman et al. |
| 2008/0233029 A1 | 9/2008 | Fan et al. |
| 2008/0236143 A1 | 10/2008 | Lo |
| 2008/0241337 A1 | 10/2008 | Durand et al. |
| 2008/0245012 A1 | 10/2008 | Boisvert et al. |
| 2008/0245274 A1 | 10/2008 | Ramme |
| 2008/0245660 A1 | 10/2008 | Little et al. |
| 2008/0245672 A1 | 10/2008 | Little et al. |
| 2008/0248350 A1 | 10/2008 | Little et al. |
| 2008/0270272 A1 | 10/2008 | Branscomb |
| 2008/0275149 A1 | 11/2008 | Ladely et al. |
| 2008/0276553 A1 | 11/2008 | Ingjaldsdottir et al. |
| 2008/0276803 A1 | 11/2008 | Molaison et al. |
| 2008/0277319 A1 | 11/2008 | Wyrsta |
| 2008/0289495 A1 | 11/2008 | Eisenberger et al. |
| 2009/0001020 A1 | 1/2009 | Constantz et al. |
| 2009/0010827 A1 | 1/2009 | Geerlings et al. |
| 2009/0020044 A1 | 1/2009 | Constantz et al. |
| 2009/0043687 A1 | 2/2009 | van Soestbergen et al. |
| 2009/0078162 A1 | 3/2009 | Clausi et al. |
| 2009/0081092 A1 | 3/2009 | Yang et al. |
| 2009/0081093 A1 | 3/2009 | Comrie |
| 2009/0081096 A1 | 3/2009 | Pellegrin |
| 2009/0081112 A1 | 3/2009 | Virtanen |
| 2009/0087890 A1 | 4/2009 | Pyle et al. |
| 2009/0090277 A1 | 4/2009 | Joshi et al. |
| 2009/0101008 A1 | 4/2009 | Lackner et al. |
| 2009/0107038 A1 | 4/2009 | Wan |
| 2009/0117019 A1 | 5/2009 | Comrie |
| 2009/0120288 A1 | 5/2009 | Lackner et al. |
| 2009/0120644 A1 | 5/2009 | Roddy et al. |
| 2009/0143211 A1 | 6/2009 | Riman et al. |
| 2009/0148238 A1 | 6/2009 | Smith |
| 2009/0169452 A1 | 7/2009 | Constantz et al. |
| 2009/0186244 A1 | 7/2009 | Mayer |
| 2009/0202410 A1 | 8/2009 | Kawatra et al. |
| 2009/0214408 A1 | 8/2009 | Blake et al. |
| 2009/0232861 A1 | 9/2009 | Wright et al. |
| 2009/0263301 A1 | 10/2009 | Reddy et al. |
| 2009/0294366 A1 | 12/2009 | Wright et al. |
| 2009/0301352 A1 | 12/2009 | Constantz et al. |
| 2009/0308760 A1 | 12/2009 | Wei et al. |
| 2009/0317488 A1 | 12/2009 | Mehta et al. |
| 2010/0000444 A1 | 1/2010 | Constantz et al. |
| 2010/0024686 A1 | 2/2010 | Constantz et al. |
| 2010/0037653 A1 | 2/2010 | Enis et al. |
| 2010/0051859 A1 | 3/2010 | House et al. |
| 2010/0063902 A1 | 3/2010 | Constantz et al. |
| 2010/0068109 A1 | 3/2010 | Comrie |
| 2010/0077691 A1 | 4/2010 | Constantz et al. |
| 2010/0077922 A1 | 4/2010 | Constantz et al. |
| 2010/0083880 A1 | 4/2010 | Constantz et al. |
| 2010/0084280 A1 | 4/2010 | Gilliam et al. |
| 2010/0089142 A1 | 4/2010 | Sukhija et al. |
| 2010/0111810 A1 | 5/2010 | Constantz et al. |
| 2010/0116683 A1 | 5/2010 | Gilliam |
| 2010/0132556 A1 | 6/2010 | Constantz et al. |
| 2010/0132591 A1 | 6/2010 | Constantz et al. |
| 2010/0135865 A1 | 6/2010 | Constantz et al. |
| 2010/0135882 A1 | 6/2010 | Constantz et al. |
| 2010/0140103 A1 | 6/2010 | Gilliam et al. |
| 2010/0144521 A1 | 6/2010 | Constantz et al. |
| 2010/0150802 A1 | 6/2010 | Gilliam et al. |
| 2010/0154679 A1 | 6/2010 | Constantz et al. |
| 2010/0155258 A1 | 6/2010 | Kirk et al. |
| 2010/0158786 A1 | 6/2010 | Constantz et al. |
| 2010/0196104 A1 | 8/2010 | Constantz et al. |
| 2010/0200419 A1 | 8/2010 | Gilliam et al. |
| 2010/0219373 A1 | 9/2010 | Seeker et al. |
| 2010/0224503 A1 | 9/2010 | Kirk et al. |
| 2010/0229725 A1 | 9/2010 | Farsad et al. |
| 2010/0230293 A1 | 9/2010 | Gilliam et al. |
| 2010/0230830 A1 | 9/2010 | Farsad et al. |
| 2010/0236242 A1 | 9/2010 | Farsad et al. |
| 2010/0239467 A1 | 9/2010 | Constantz et al. |
| 2010/0239487 A1 | 9/2010 | Constantz et al. |
| 2010/0247410 A1 | 9/2010 | Constantz et al. |
| 2010/0258035 A1 | 10/2010 | Constantz et al. |
| 2010/0258506 A1 | 10/2010 | Berkowitz et al. |
| 2010/0276299 A1 | 11/2010 | Kelly et al. |
| 2010/0290967 A1 | 11/2010 | Detournay et al. |
| 2010/0313793 A1 | 12/2010 | Constantz et al. |
| 2010/0313794 A1 | 12/2010 | Constantz et al. |
| 2010/0319586 A1 | 12/2010 | Blount et al. |
| 2010/0326328 A1 | 12/2010 | Constantz et al. |
| 2011/0024361 A1 | 2/2011 | Schwartzel et al. |
| 2011/0030586 A1 | 2/2011 | Constantz et al. |
| 2011/0030957 A1 | 2/2011 | Constantz et al. |
| 2011/0033239 A1 | 2/2011 | Constantz et al. |
| 2011/0035154 A1 | 2/2011 | Kendall et al. |
| 2011/0036728 A1 | 2/2011 | Farsad |
| 2011/0042230 A1 | 2/2011 | Gilliam et al. |
| 2011/0054084 A1 | 3/2011 | Constantz et al. |
| 2011/0059000 A1 | 3/2011 | Constantz et al. |
| 2011/0067600 A1 | 3/2011 | Constantz et al. |
| 2011/0067603 A1 | 3/2011 | Constantz et al. |
| 2011/0067605 A1 | 3/2011 | Constantz et al. |
| 2011/0071309 A1 | 3/2011 | Constantz et al. |
| 2011/0079515 A1 | 4/2011 | Gilliam et al. |
| 2011/0083968 A1 | 4/2011 | Gilliam et al. |
| 2011/0091366 A1 | 4/2011 | Kendall et al. |
| 2011/0091955 A1 | 4/2011 | Constantz et al. |
| 2011/0132234 A1 | 6/2011 | Constantz et al. |
| 2011/0147227 A1 | 6/2011 | Gilliam et al. |
| 2011/0203489 A1 | 8/2011 | Constantz et al. |
| 2011/0226989 A9 | 9/2011 | Seeker et al. |
| 2011/0240916 A1 | 10/2011 | Constantz et al. |
| 2011/0247336 A9 | 10/2011 | Farsad et al. |
| 2011/0277474 A1 | 11/2011 | Constantz et al. |
| 2011/0277670 A1 | 11/2011 | Self et al. |
| 2011/0290156 A1 | 12/2011 | Constantz et al. |
| 2011/0303551 A1 | 12/2011 | Gilliam et al. |
| 2011/0308964 A1 | 12/2011 | Gilliam et al. |
| 2012/0082839 A1 | 4/2012 | Ha et al. |
| 2012/0111236 A1 | 5/2012 | Constantz et al. |
| 2012/0213688 A1 | 8/2012 | Constantz et al. |
| 2012/0312697 A1 | 12/2012 | Gilliam et al. |
| 2013/0036945 A1 | 2/2013 | Constantz et al. |
| 2014/0041553 A1 | 2/2014 | Constantz et al. |
| 2014/0332401 A1 | 11/2014 | Gilliam et al. |

(56) References Cited

U.S. PATENT DOCUMENTS

| | | | |
|---|---|---|---|
| 2015/0000558 A1 | 1/2015 | Ha et al. | |
| 2015/0037231 A1 | 2/2015 | Seeker et al. | |
| 2015/0083607 A1 | 3/2015 | Gilliam et al. | |

FOREIGN PATENT DOCUMENTS

| | | | |
|---|---|---|---|
| AU | 2007201171 A1 | 10/2007 | |
| AU | 2007101174 A4 | 1/2008 | |
| AU | 2008256636 B2 | 12/2008 | |
| AU | 2008101140 A4 | 1/2009 | |
| CA | 1303822 C | 6/1988 | |
| CA | 1335974 A1 | 6/1995 | |
| CA | 2308224 C | 4/1999 | |
| CA | 2255287 A1 | 6/2000 | |
| CA | 2353830 A1 | 6/2000 | |
| CA | 2440325 A1 | 1/2003 | |
| CA | 2646462 | 9/2007 | |
| CA | 2617325 A1 | 11/2007 | |
| CA | 2682952 A1 | 10/2008 | |
| CA | 2659447 A1 | 12/2008 | |
| CN | 1059173 A | 3/1992 | |
| CN | 1185989 | 7/1998 | |
| CN | 1369576 A | 9/2002 | |
| CN | 1220793 C | 9/2005 | |
| CN | 101219330 A | 7/2008 | |
| CN | 101240426 A | 8/2008 | |
| CN | 101250711 A | 8/2008 | |
| CN | 101289200 A | 10/2008 | |
| CN | 101990523 A | 3/2011 | |
| CN | 102335553 A | 2/2012 | |
| DE | 2653649 A1 | 6/1978 | |
| DE | 3146326 A1 | 6/1983 | |
| DE | 3638317 A1 | 6/1987 | |
| DE | 19512163 A1 | 10/1995 | |
| DE | 19523324 A1 | 3/1996 | |
| DE | 19631794 A1 | 8/1997 | |
| EP | 0522382 A1 | 1/1993 | |
| EP | 0558275 A1 | 9/1993 | |
| EP | 0487102 B1 | 8/1995 | |
| EP | 0591350 B1 | 11/1996 | |
| EP | 0628339 B1 | 9/1999 | |
| EP | 0844905 B1 | 3/2000 | |
| EP | 1379469 B1 | 3/2006 | |
| EP | 1650162 A1 | 4/2006 | |
| EP | 1716911 A1 | 11/2006 | |
| EP | 1554031 B1 | 12/2006 | |
| EP | 1571105 B1 | 12/2007 | |
| EP | 2253600 A1 | 11/2010 | |
| GB | 911386 A | 11/1962 | |
| GB | 1392907 | 5/1975 | |
| GB | 2032441 | 5/1980 | |
| GB | 2050325 A | 1/1981 | |
| GB | 2208163 A | 3/1989 | |
| GB | 2210035 A | 6/1989 | |
| GB | 2371810 A | 8/2002 | |
| JP | 51102357 A1 | 9/1976 | |
| JP | 59100280 | 6/1984 | |
| JP | 1142093 | 11/1987 | |
| JP | 63-312988 A2 | 12/1988 | |
| JP | 03-020491 A2 | 1/1991 | |
| JP | 03-170363 A | 7/1991 | |
| JP | 04-190829 | 7/1992 | |
| JP | 04-317721 A | 11/1992 | |
| JP | 7061842 A | 3/1995 | |
| JP | 7265688 A | 10/1995 | |
| JP | H 08246178 A | 9/1996 | |
| JP | 10287461 A | 10/1998 | |
| JP | 10305212 A | 11/1998 | |
| JP | 2000226402 A | 8/2000 | |
| JP | 03184892 B2 | 7/2001 | |
| JP | 2002-273163 A | 9/2002 | |
| JP | 2003041388 | 2/2003 | |
| JP | 2004-174370 | 6/2004 | |
| JP | 2004-174371 A | 6/2004 | |
| JP | 2005-052762 | 3/2005 | |
| JP | 2006-075717 A | 3/2006 | |
| JP | 2006-076825 | 3/2006 | |
| JP | 2006-076825 A | 3/2006 | |
| JP | 2006-137620 A | 6/2006 | |
| JP | 2009279530 A | 12/2009 | |
| NL | 7607470 A | 1/1978 | |
| SU | 1819854 A1 | 6/1993 | |
| WO | WO 93/16216 A1 | 8/1993 | |
| WO | WO 94/18119 A1 | 8/1994 | |
| WO | WO 96/34997 A1 | 11/1996 | |
| WO | WO 99/08778 A1 | 2/1999 | |
| WO | WO 99/13967 A1 | 3/1999 | |
| WO | WO 2006/009600 A2 | 1/2000 | |
| WO | WO 00/10691 A1 | 3/2000 | |
| WO | WO 01/07365 A1 | 2/2001 | |
| WO | WO 01/96243 A1 | 12/2001 | |
| WO | WO 02/00551 A2 | 1/2002 | |
| WO | WO 02/085788 A1 | 10/2002 | |
| WO | WO 03/008071 A1 | 1/2003 | |
| WO | WO 03/054508 A2 | 7/2003 | |
| WO | WO 03/068685 A1 | 8/2003 | |
| WO | WO 2004/041731 A1 | 5/2004 | |
| WO | WO 2004/094043 A2 | 11/2004 | |
| WO | WO 2004/098740 A2 | 11/2004 | |
| WO | WO 2005/028379 A1 | 3/2005 | |
| WO | WO 2005/078836 A2 | 8/2005 | |
| WO | WO 2005/086843 A2 | 9/2005 | |
| WO | WO 2005/108297 A2 | 11/2005 | |
| WO | WO 2006/008242 A1 | 1/2006 | |
| WO | WO 2006/032797 A1 | 3/2006 | |
| WO | WO 2006/034339 A1 | 3/2006 | |
| WO | WO 2006/036396 A2 | 4/2006 | |
| WO | WO 2006/094968 A1 | 9/2006 | |
| WO | WO 2006/099599 A2 | 9/2006 | |
| WO | WO 2006/113997 A1 | 11/2006 | |
| WO | WO 2006/134080 A1 | 12/2006 | |
| WO | WO 2007/003013 A1 | 1/2007 | |
| WO | WO 2007/016271 A2 | 2/2007 | |
| WO | WO 2007/022595 A1 | 3/2007 | |
| WO | WO 2007/060149 A1 | 5/2007 | |
| WO | WO 2007/069902 A1 | 6/2007 | |
| WO | WO 2007/071633 A1 | 6/2007 | |
| WO | WO 2007/082505 A2 | 7/2007 | |
| WO | WO 2007/094691 A1 | 8/2007 | |
| WO | WO 2007/096671 A1 | 8/2007 | |
| WO | WO 2007/106372 A2 | 9/2007 | |
| WO | WO 2007/106883 A2 | 9/2007 | |
| WO | WO 2007/123917 A2 | 11/2007 | |
| WO | WO 2007/139392 A1 | 12/2007 | |
| WO | WO 2007/140544 A1 | 12/2007 | |
| WO | WO 2007/142945 A2 | 12/2007 | |
| WO | WO 2008/018928 A2 | 2/2008 | |
| WO | WO 2008/026201 A2 | 3/2008 | |
| WO | WO 2008/031834 A1 | 3/2008 | |
| WO | WO 2008/061305 A1 | 5/2008 | |
| WO | WO 2008/068322 A1 | 6/2008 | |
| WO | WO 2008/089523 A1 | 7/2008 | |
| WO | WO 2008/095057 A2 | 8/2008 | |
| WO | WO 2008/101293 A1 | 8/2008 | |
| WO | WO 2008/108657 A1 | 9/2008 | |
| WO | WO 2008/115662 A1 | 9/2008 | |
| WO | WO 2008/124538 A1 | 10/2008 | |
| WO | WO 2008/140821 A2 | 11/2008 | |
| WO | WO 2008/142017 A2 | 11/2008 | |
| WO | WO 2008/142025 A2 | 11/2008 | |
| WO | WO 2008/148055 A1 | 12/2008 | |
| WO | WO 2008/151060 A1 | 12/2008 | |
| WO | WO 2009/006295 A2 | 1/2009 | |
| WO | WO 2009/024826 A1 | 2/2009 | |
| WO | WO 2009/032331 A2 | 3/2009 | |
| WO | WO 2009/036087 A1 | 3/2009 | |
| WO | WO 2009/039655 A1 | 4/2009 | |
| WO | WO 2009/049085 A2 | 4/2009 | |
| WO | WO 2009/052313 A1 | 4/2009 | |
| WO | WO 2009/065031 A1 | 5/2009 | |
| WO | WO 2009/070273 A1 | 6/2009 | |
| WO | WO 2009/086460 A1 | 7/2009 | |
| WO | WO 2009/102816 A2 | 8/2009 | |

(56) References Cited

FOREIGN PATENT DOCUMENTS

| | | |
|---|---|---|
| WO | WO 2009/102817 A2 | 8/2009 |
| WO | WO 2009/146436 A1 | 12/2009 |
| WO | WO 2009/155378 A1 | 12/2009 |
| WO | WO 2010/006242 A1 | 1/2010 |
| WO | WO 2010/008896 A1 | 1/2010 |
| WO | WO 2010/009273 A1 | 1/2010 |
| WO | WO 2010/030826 A1 | 3/2010 |
| WO | WO 2010/039903 A1 | 4/2010 |
| WO | WO 2010/039909 A1 | 4/2010 |
| WO | WO 2010/048457 A1 | 4/2010 |
| WO | WO 2010/051458 A1 | 5/2010 |
| WO | WO 2010/068924 A1 | 6/2010 |
| WO | WO 2010/074686 A1 | 7/2010 |
| WO | WO 2010/074687 A1 | 7/2010 |
| WO | WO 2010/087823 A1 | 8/2010 |
| WO | WO 2010/091029 A1 | 8/2010 |
| WO | WO 2010/093713 A1 | 8/2010 |
| WO | WO 2010/093716 A1 | 8/2010 |
| WO | WO 2010/101953 A1 | 9/2010 |
| WO | WO 2010/104989 A1 | 9/2010 |
| WO | WO 2010/132863 A1 | 11/2010 |
| WO | WO 2010/136744 A1 | 12/2010 |
| WO | WO 2011/008223 A1 | 1/2011 |
| WO | WO 2011/017609 A1 | 2/2011 |
| WO | WO 2011/038076 A1 | 3/2011 |
| WO | WO 2011/049996 A1 | 4/2011 |
| WO | WO 2011/066293 A1 | 6/2011 |
| WO | WO 2011/075680 A1 | 6/2011 |
| WO | WO 2011/081681 A1 | 7/2011 |
| WO | WO 2011/097468 A2 | 8/2011 |
| WO | WO 2011/102868 A1 | 8/2011 |

OTHER PUBLICATIONS

Olga Shtepenko et al, "The effect of carbon dioxide on b-dicalcium silicate and Portland cement", Chemical Engineering Journal, vol. 118, Published 2006, pp. 107-118.*
U.S. Appl. No. 60/921,598, filed Apr. 3, 2007, Little et al.
Aker, "Aker Clean Carbon, Carbon Capture Solutions Provider" Aker Clean Carbon Presentation for UN's IPCC; Jan. 24, 2008; 8pp.
Alexander, G. et al., "Evaluation of reaction variables in the dissolution of serpentine for mineral carbonation"; Elsevier; ScienceDirect Fuel 86 Jun. 2007 273-281.
Allen, L.M. 1992. Boron and Sulfur Isotopic Fractionation in the Coal Combustion System. A Thesis Submitted to the Faculty of the Department of Hydrology and Water Resources. The University of Arizona.
Amelingmeier. "ARAGONIT", Roempp, Fachgebiet: Chemie Unterthema: Mineralogie, Geochimie May (2005), Retrieved from the internet: URL: http://www.roempp.com/prod/ [retrieved on Jun. 19, 2012]—with machine English translation.
Amelingmeier. "Vaterit", Roempp, Fachgebiet: Chemie Unterthema: Mineralogie, Geochimie Nov. (2010), Retrieved from the internet: URL: http://www.roempp.com/prod/ [retrieved on Jun. 19, 2012]—with machine English translation.
Avery, G.B. et al. 2006. Carbon isotopic characterization of dissolved organic carbon in rainwater: Terrestrial and marine influences. Science Direct. 40(39): 7539-7545. Retrieved from the internet on May 20, 2010.
Back, M. et al.,"Reactivity of Alkaline Lignite Fly Ashes Towards CO in Water." Environmental Science & Technology. vol. 42, No. 12 May 2008 pp. 4520-4526.
Baer, D.S., et al. (2002). Sensitive absorption measurements in the near-infrared region using off-axis integrated-cavity-output spectroscopy. Appl. Phys. B. 5 pages.
Bagotsky, V.S. "Conductive Polymers: Polymers with Ionic Functions" Fundamentals of Electrochemistry. Dec. (2005) Second Edition. New Jersey: John Wiley & Sons. pp. 454-455.
Bauer, C.F., et al. Jul. (1981). Identification and Quantitation of Carbonate Compounds in Coal Fly Ash. American Chemical Society. 15(7): 783-788.
Berg et al., "A 3-Hydroxyproprionate/ 4-Hydroxybutyrate Autotrophic Carbon Dioxide Assimilation Pathway in Archea"; Science 14, Dec. 2007; vol. 318, No. 5857 DOI 10.1126/science 1149976; pp. 1782-1786.
Biello, D. Cement from CO2: A Concrete Cure for Global Warming? Scientific American Aug. 7, 2008., pp. 1-3 [online] [retrieved on Dec. 29, 2009] <URL: http://www.scientificamerican.com/article.cfm>.
Biennier, L., et al. (2004). Multiplex integrated cavity output spectroscopy of cold PAH cations. Chemical Physics Letters. 387: 287-294.
Biomass Burning: A Hot Issue in Global Change. National Aeronautics and Space Administration. Langley Research Center, Hampton, Virginia. Fact Sheet FS-2001-02-56-LaRC. Feb. 2001. 4 pages.
Bommaraju, T.V. et al. Nov. 2001 Brine Electrolysis. <http://electrochem.cwru.edu/encycl/art-b01-brine.htm>. Retrieved on Oct. 6, 2010. pp. 1-25.
Bond, G.M., et al. (2001). CO2 Capture from Coal-Fired Utility Generation Plant Exhausts, and Sequestration by a Biomimetic Route Based on Enzymatic Catalysis—Current Status (paper presented at the First National Conference on Carbon Sequestration, May 14-17, in Washington D.C., USA; Paper Sa.5.
Bond, G.M., et al. (2002). Brines as possible cation sources for biomimetic carbon dioxide sequestration. American Geophysical Union Abstract #U22A-07.
Bottomley, D.J. et al. 1999. The origin and evolution of Canadian Shield brines: evaporation or freezing of seawater? New lithium isotope and geochemical evidence from the Slave craton. Chemical Geology. 155: 295-320.
Bradfield, D.L. Jan. (1984). Conventional Uranium Processing: The Yeelirrie Uranium Project. Practical Hydromet '83—7th Annual Symposium on Uranium and Precious Metals. pp. 39-47. Lakewood, CO.
Cannell, M.G.R. Aug. 2003. "Carbon sequestration and biomass energy offset: theoretical, potential and achievable capacities globally, in Europe and the UK." Biomass and Bioenergy. 24: 97-116.
Carbon Sequestration. National Energy Technology Laboratory, Jul. 1, 2008 (online) [retrieved on Dec. 21, 2009] <URL: http://web.archive.org/web/20080701213124/http://www.netl.doe.gov/technologies/carbon_seq/index.html>.
Cerling, T.E. 1984. The stable isotopic composition of modern soil carbonate and its relationship to climate. Earth and Planetary Science Letters. 71: 229-240.
Christensen, L.E., et al. Measurement of Sulfur Isotope Compositions by Tunable Laser Spectroscopy of SO2. Analytical Chemistry, Nov. 17, 2007, vol. 79, No. 24, pp. 9261-9268 (abstract) [online] [retrieved on Dec. 30, 2009] <URL: http://pubs.acs.org/doi/abs/10.1021/ac071040p>.
CICCS "Aims and Research"; www.nottingham.ac.uk/carbonmanagement/ccs_aims.php 2pp Aug. 3, 2007.
Constantz, B. (2009) "The Risk of Implementing New Regulations on Game-Changing Technology: Sequestering CO2 in the Built Environment" AGU, 90(22), Jt. Assem, Suppl., Abstract.
Criss, R.E. 1995. Stable Isotope Distribution: Variations from Temperature, Organic and Water-Rock Interactions. Washington University, St. Louis, Department of Earch and Planetary Sciences. American Geophysical Union. pp. 292-307.
Dickens, A. et al. 2004. Reburial of fossil organic carbon in marine sediments. Nature. 427: 336-339. Retrieved from the internet on May 20, 2010.
Druckenmiller, M. et al., "Carbon sequestration using brine of adjusted pH to form mineral carbonates"; Elsevier; www.elsevier.com/locate/fuproc; Fuel Processing Technology 86 (2005) 1599-1614.
Ehleringer, J.R., et al. 2002. Stable Isotopes. vol. 2, The Earth System: biological and ecological dimensions of global environmental change. pp. 544-550. Edited by Professor Harold A. Mooney and Dr. Josep G. Canadell in Encyclopedia of Global Environmental Change. John Wiley & Sons, Ltd. Chichester.
Eldorado Beaverlodge Operation. Jun. 1960 Canadian Mining Journal. 81(6): 111-138.
Electrochemical cell. Wikipedia (2009), http:en.wikipedia.org/wiki/Electrochemical_Cell, Nov. 24, 2009, 5 pp.

(56) References Cited

OTHER PUBLICATIONS

Eloneva et al., "Fixation of CO2 by carbonating calcium derived from blast furnace slag" Energy May 2008 33, pp. 1461-1467.
Elswick, E.R., et al. 2007. Sulfur and carbon isotope geochemistry of coal and derived coal-combustion by-products: An example from an Eastern Kentucky mine and power plant. Applied Geochemistry. 22: 2065-2077.
Eurodia. Bipolar Membrane Electrodialysis. Available online as of 2001.; visited Oct. 6, 2010 at http://www.eurodia.com/html/eb.html.
Fallick, A.E., et al. 1991. A Stable Isotope Study of the Magnesite Deposits Associated with the Alpine-Type Ultramafic Rocks of Yugoslavia. Economic Geology. 86: 847-861.
Faure, et al. 1963. The Isotopic Composition of Strontium in Oceanic and Continental Basalts: Application to the Origin of Igneous Rocks. Journal of Petrology. 4(1): 31-50. (abstract only). Http://petrology.oxfordjournals.org/cgi/content/abstract/4/1/31 (retrieved on Jun. 1, 2010).
Faverjon, F. et al. Aug. 2006. Regeneration of hydrochloric acid and sodium hydroxide from purified sodium chloride by membrane electrolysis using a hydrogen diffusion anode-membrane assembly. Journal of Membrane Science 284 (1-2): 323-330.
Faverjon, F. et al. Jul. (2005). Electrochemical study of a hydrogen diffusion anode-membrane assembly for membrane electrolysis. Electrochimica Acta 51 (3): 386-394.
Filley, T.R. et al. 1997. Application of Isotope-Ratio-Monitoring Gas Chromatography/Mass Spectrometry to Study Carbonization Reactions of FCCU Slurry Oils. Department of Geosciences, Department of Materials Science and Engineering, The Pennsylvania State University, University Park, PA. Abstracts of Papers of the American Chemical Society. 214:65-FUEL Part 1. pp. 938-941.
Fouke, B.W., et al. 2000. Depositional Facies and Aqueous-Solid Geochemistry of Travertine-Depositing Hot Springs (Angel Terrace, Mammoth Hot Springs, Yellowstone National Park, U.S.A.). Journal of Sedimentary Research. 70(3): 565-585.
Gain, E. et al. May (2002) Ammonium nitrate wastewater treatment by coupled membrane electrolysis and electrodialysis. Journal of Applied Electrochemistry 32: 969-975.
Genders, D. 1995. Electrochemical Salt Splitting. http://www.electrosynthesis.com/news/mwatts.html (accessed Feb. 5, 2009).
Gillery et al. Bipolar membrane electrodialysis: the time has finally come! Presented 16th Intl. Forum on Appl. Electrochem; Cleaner Tech.—Challenges and Solutions. Nov. 10-14, 2002. Amelia Island Plantation, FL. 4 pages. Retrieved form the Internet on Aug. 14, 2009. http://www.ameridia.com/html/ebc.html.
Goldberg et al. Jun. 2009. "CO2 Mineral Sequestration Studies in US"; National Energy Technology Laboratory; goldberg@netl.doe.gov; 10pp.
Golden, D.C., et al. 2001. A Simple Inorganic Process for Formation of Carbonates, Magnetite, and Sulfides in Martian Meteorite ALH84001. American Mineralogist. 86: 370-375.
Graff "Just Catch—CO2 Capture Technology" Aker Kvaerner; Pareto Clean Energy Tech Seminar Oct. 11, 2007 25pp.
Green Car Congress "PKU Researchers Carry Out Aqueous Fischer-Tropsch Reaction for First Time"; www.greeencarcongress.com/2007/12/pku-researchers.html; Dec. 12, 2007; 2pp.
Green Car Congress "Researcher Proposes System for Capture of Mobile Source CO2 Emissions Directly from Atmosphere"; www.greeencarcongress.com/2007/10/researcher-prop.html#more; Oct. 8, 2007; 4pp.
Green Car Congress "Researchers Develop New Method for Ocean Sequestration of Carbon Dioxide Through Accelerated Weathering f Volcanic Rocks"; www.greeencarcongress.com/2007/11/researchers-dev.html#more; Nov. 7, 2007; 3pp.
Gregerson, J. Aug. 1999. Conquering Corrosion (in concrete). Building Design & Construction. 40(8): 50.
Groteklaes. "DOLOMIT", Roempp, Fachgebiet: Chemie Unterthema: Mineralogie, Geochimie Feb. 2005, Retrieved from the internet: URL: http://www.roempp.com/prod/ [retrieved on Jun. 19, 2012]—with machine English translation.
Hassan, A.M. et al. 1989. Corrosion Resistant Materials for Seawater RO Plants. Desalination. 74: 157-170.
Haywood et al., "Carbon dioxide sequestration as stable carbonate minerals—environmental barriers"; Environmental Geology Aug. 2001 41:11-16; Springer-Verlag 2001.
Hein, J.R. et al. Feb. 2006. Methanogen c calc te, $^{13}$C-depleted b valve shells, and gas hydrate from a mud volcano offshore southern Cal forn a. Geological Society of America. 34(2): 109-112.
Hill et al. Mar. 18, 2006. "Preliminary Investigation of Carbon Sequestration Potential in Brine from Pennsylvania's Oriskany Sandstone Formation in Indiana County, PA"; The Energy Institute and the Department of Energy & Geo-Environmental Engineering. College of Engineering Research Symposium, Session 3C. 16pp.
Holdgate, G.R., et al. 2009. Eocene-Miocene carbon-isotope and floral record from brown coal seams in the Gippsland Basin of southeast Australia. Global and Planetary Change. 65: 89-103.
Holze, S. et al. Jan. 1994. Hydrogen Consuming Anodes for Energy Saving in Sodium Sulphate Electrolysis. Chem. Eng. Technol. 17: 382-389.
Horii, Y. et al. 2008. Novel evidence for natural formation of dioxins in ball clay. Chemosphere. 70: 1280-1289.
Horkel, K., et al. 2009. Stable isotopic composition of cryptocrystalline magnesite from deposits in Turkey and Austria. Geophysical Research Abstracts. 11. (abstract only).
Horner, G. et al. 2004. Isotope selective analysis of CO2 with tunable diode laser (TDL) spectroscopy in the NIR. The Analyst. 129: 772-778.
Huijgen, W.J.J., et al. Dec. 2005. Carbon dioxide sequestration by mineral carbonation: Literature review update 2003-2004, ECN-C-05-022; Energy Research Centre of the Netherlands: Petten; pp. 1-37.
Huijgen, W.J.J., et al. Feb. 2003. Carbon dioxide sequestration by mineral carbonation. ECN-C-03-016; Energy Research Centre of the Netherlands: Petten; pp. 1-42.
Huijgen, W.J.J., et al. Nov. 2005. Mineral CO2 Sequestration by Steel Slag Carbonation. Environ. Sci. Technol. 39: 9676-9682.
Huijgen, W.J.J., et al. Nov. 2006. Energy Consumption and Net CO2 Sequestration of Aqueous Mineral Carbonation. Ind. Eng. Chem. Res. 45: 9184-9194.
Huntzinger, D.N. Carbon Dioxide Sequestration in Cement Kiln Dust Through Mineral Carbonation. Michigan Technological University, Jul. 2006 [online], [retrieved on Dec. 29, 2009]. <URL: http://www.geo.mtu.edu/~dnhuntzi/DNHuntzingerETD.pdf>.
Huntzinger, D.N. et al. Apr. 2009. A life-cycle assessment of Portland cement manufacturing: comparing the traditional process with alternative technologies. Journal of Cleaner Production. 17: 668-675.
Huntzinger, D.N. et al.,"Carbon Dioxide Sequestration in Cement Kiln Dust through Mineral Carbonation"; Environmental Science & Technology, vol. 43, No. 6 (2009) pp. 1986-1992.
International Search Report dated Jan. 4, 2010 for PCT/US2009/062795.
International Search Report dated Jan. 4, 2011 of EP 09818485.6.
International Search Report dated Jan. 13, 2010 for PCT/US2009/059135.
International Search Report dated Jan. 20, 2009 for PCT/US2007/010032.
International Search Report dated Feb. 2, 2010 of PCT/US2009/059141.
International Search Report dated Feb. 19, 2009 of PCT/US2008/088242.
International Search Report dated Feb. 24, 2010 of PCT/US2009/067764.
International Search Report dated Mar. 3, 2010 of EP 08867440.3.
International Search Report dated Mar. 10, 2010 of PCT/US2010/022935.
International Search Report dated Mar. 11, 2009 of PCT/2008/088246.
International Search Report dated Mar. 11, 2009 of PCT/US2008/088318.
International Search Report dated Mar. 21, 2011 of EP 10739828.1.
International Search Report dated Mar. 25, 2011 of EP10737735.0.
International Search Report dated Mar. 25, 2011 of EP10739829.9.
International Search Report dated Apr. 6, 2011 of EP 10192919.8.

(56) References Cited

OTHER PUBLICATIONS

International Search Report dated Apr. 13, 2011 of PCT/US2010/057821.
International Search Report dated Apr. 19, 2011 of PCT/US2010/059835.
International Search Report dated May 6, 2010 of EP 09716193.9.
International Search Report dated May 18, 2011 of EP 09812407.6.
International Search Report dated May 21, 2010 of PCT/US2009/064117.
International Search Report dated Jun. 22, 2010 of EP 08772151.0.
International Search Report dated Jul. 7, 2010 of PCT/US2010/026880.
International Search Report dated Jul. 9, 2010 of PCT/US2010/025970.
International Search Report dated Jul. 29, 2010 of EP 08873036.1.
International Search Report dated Aug. 5, 2009 of PCT/2009/048511.
International Search Report dated Sep. 8, 2009 of PCT/US2009/045722.
International Search Report dated Sep. 13, 2010 of PCT/US2010/035041.
International Search Report dated Sep. 17, 2008 of PCT/US2008/068564.
International Search Report dated Sep. 17, 2009 of PCT/US2009/050756.
International Search Report dated Sep. 22, 2009 of PCT/US2009/047711.
International Search Report dated Oct. 19, 2009 of PCT/US2009/050223.
International Search Report dated Oct. 30, 2009 of PCT/US2009/056573.
International Search Report dated Dec. 14, 2009 of PCT/US2009/061748.
International Search Report dated Dec. 14, 2010 of EP 09812408.4.
International Search Report dated Mar. 4, 2011 of EP 10737736.8.
Isotopic Signature Wikipedia (2010), http://en.wikipedia.org/wiki/Isotopic_signature, Apr. 14, 2009, 3 pp.
Jensen, P. et al. Jul. 1992. 'Bubbling reefs' in the Kattegat: submarine landscapes of carbonate-cemented rocks support a diverse ecosystem at methane seeps. Marine Ecology Progress Series. 83: 103-112.
Jones. 1996. Principles and Prevention of Corrosion. Second Edition. Lebanon, Indiana: Prentice Hall. pp. 50-52.
Justnes, H. et al. "Pozzolanic, Amorphous Silica Produced from the Mineral Olivine." Proceedings of the Seventh CANMET/ACI International Conference on Fly Ash, Silica Fume, Slag and Natural Pozzolans in Concrete, 2001. SP-199-44. pp. 769-781.
Kohlmann et al., "Carbon Dioxide Emission Control by Mineral Carbonation: The Option for Finland"; INFUB 6th European Conference on Industrial Furnaces and Boilers Estoril Lisbon Portugal, Apr. 2-5, 2002 10pp.
Kostowskyj et al. 2008. Silver nanowire catalysts for alkaline fuel cells. International Journal of Hydrogen Energy. 33: 5773-5778.
Lackner, K. "Carbonate Chemistry for Sequestering Fossil Carbon"; Annual Review Energy Environ. Feb. 2002 27:193-232.
Lackner, K.S. et al. "Carbon Dioxide Disposal in Carbonate Minerals." Energy. Mar. 1995. 20(11): 1153-1170.
Levy, D. "Burnt biomass causes short-term global cooling, long-term warming." http://news-service.stanford.edu/news/2004/august4/biomass-84.html. 3 pages.
Li, et al., "Using Electrolytic Method to Promote CO2 Sequestration in Serpentine by Mineral Carbonation," Journal of China University of Mining and Technology, 36(6), pp. 817-821 Nov. 2007 (in Chinese, with English translation).
Lin, C. et al. Use of Cement Kiln Dust, Fly Ash, and Recycling Technique in Low-Volume Road Rehabilitation. Transportation Research Record, Dec. 1992, No. 1345, pp. 19-27 (abstract) [online], [retrieved on Dec. 31, 2009] <URL: http://pubsindex.trb.org/view.aspx?id=370714>.
Lopez-Capel, E. et al. Aug. 2005. Application of simultaneous thermal analysis mass spectrometry and stable carbon isotope analysis in a carbon sequestration study. Rapid Communications in Mass Spectrometry. 19: 3192-3198.
Mazrou, S., et al. Sep. (1997). Sodium hydroxide and hydrochloric acid generation from sodium chloride and rock salt by electro-electrodialysis. Journal of Applied Electrochemistry 27: 558-567.
McCrea, J.M. 1950. On the Isotopic Chemistry of Carbonates and a Paleotemperature Scale. The Journal of Chemical Physics. 18(6): 849-857.
Melezhik, V.A., et al. 2001. Palaeoproterozoic magnesite: lithological and isotopic evidence for playa/sabkha environments. Sedimentology. 48: 379-397.
Merritt, R.C. 1971. Carbonate Leaching. The Extractive Metallurgy of Uranium: pp. 82-97. Colorado School of Mines Research Institute. Prepared Under Contract with the United States Atomic Energy Commission.
Metz. 2005. IPCC Special Report on Carbon Dioxide Capture and Storage. Cambridge University. p. 324 <http://books.google.com/books?id=HWgRvPUgyvQC&dq=serpentine+olivine+close+by+cement+plant&source=gbs_navlinks_s> viewed Jul. 15, 2011.
Mihalcea, R.M., et al. 1998. Diode-laser absorption measurements of CO2 near 2.0 μm at elevated temperatures. Applied Optics. 37(36): 8341-8347.
Miljevic, N., et al. 2007. Potential Use of Environmental Isotopes in Pollutant Migration Studies. Environmental Isotopes in Pollutant Studies. 58: 251-262.
Montes-Hernandez, G. et al.,"Mineral sequestration of CO2 by aqueous carbonation of coal combustion fly-ash." Journal of Hazardous Materials vol. 161 May 2009. pp. 1347-1354.
Mook, W.G., et al. 1968. Isotopic Equilibrium between Shells and Their Environment. Science. 159(3817): 874-875.
Mook, W.G., et al. 1974. Carbon Isotope Fractionation Between Dissolved Bicarbonate and Gaseous Carbon Dioxide. 22:169-176.
Mottana, A. et al. 1979. Der grosse Mineralienfuhrer, BLV Verlagsgesellschaft mbH, Munchen, XP002577921, p. 194. (In German with English Translation).
Nayak, V.S. "Nonelectrolytic Production of Caustic Soda and Hydrochloric Acid from Sodium Chloride"; Ind. Eng. Chem. Res. Aug. 1996. 35: 3808-3811.
Noda, H., et al. 1990. Electrochemical Reduction of Carbon Dioxide at Various Metal Electrodes in Aqueous Potassium Hydrogen Carbonate Solution. The Chemical Society of Japan. 63: 2459-2462.
O'Connor et al., "Carbon Dioxide Sequestration by Direct Mineral Carbonation: Results From Recent Studies and Current Status"; Albany Research Center, Albany Oregon; Office of Fossil Energy, US Dept. of Energy; 1st Annual DOE Carbon Sequestration Conference, Washington DC, May 2001 12pp.
O'Connor, W.K. et al. "Carbon dioxide sequestration: Aqueous mineral carbonation studies using olivine and serpentine." Aug. 2001. Albany Research Center, National Energy Technology Laboratory: Mineral Carbonation Workshop, Pittsburgh.
O'Neil, J.R., et al. 1971. C13 and O18 compositions in some freshwater carbonates associated with ultramafic rocks and serpentines: western United States. Geochimica et Cosmochimica Acta. 35: 687-697.
Park, A., et al. Mar. 2004. CO2 mineral sequestration: physically activated dissolution of serpentine and pH swing process. Chemical Engineering Science 59 (22-23): 5241-5247.
Perkins, S. Jul. 2004. Sea Change: Carbon Dioxide Imperils Marine Ecosystems. Science News. 166(3): 35.
Philp, R.P. 2007. The emergence of stable isotopes in environmental and forensic geochemistry studies: a review. Environ Chem Lett. 5:57-66.
Portier et al. 2005. Modeling CO2 solubility in pure water and NaCl-type waters from 0 to 300 ° C. and from 1 to 300 bar Application to the Utsira Formation at Sleipner. Chemical Geology. 217: 187-199.
Power, I.M., et al. 2007. Biologically induced mineralization of dypingite by cyanobacteria from an alkaline wetland near Atlin, British Columbia, Canada. Geochemical Transactions. 8: 16 pages.
Quay, P.D., et al. 1992. Oceanic Uptake of Fossil Fuel CO$_2$: Carbon—13 Evidence. Science. 256 (5053): 74-79.

(56) References Cited

OTHER PUBLICATIONS

Rahardianto et al., "High recovery membrane desalting of low-salinity brackish water: Integration of accelerated precipitation softening with membrane RO"; Science Direct; Journal of Membrane Science 289 Nov. 2007 123-137.

Rakib, M. et al. Jan. (1999). Behaviour of Nafion® 350 membrane in sodium sulfate electrochemical splitting: continuous process modelling and pilot scale tests. Journal of Applied Electrochemistry. 29: 1439-1448.

Rau, G. Oct. 2004. Possible use of Fe/CO2 fuel cells for CO2 mitigation plus H2 and electricity production. Energy Conversion and Management. 45: 2143-2152.

Raz et al., "Formation of High-Magnesium Calcites via an Amorphous Precursor Phase: Possible Biological Implications"; Advanced Materials; Adv. Mater. Sep. (2000) vol. 12, No. 1; 5pp.

Rosenthal, E., "Cement Industry is at Center of Climate Change Debate" New York Times; www.nytimes.com/2007/10/26/business/worldbusiness/26cement.html"ref=todayspaper; 4pp.

Saad, N. et al. 2009. Measurement of Isotopic CO2 in Dissolved Inorganic Carbons of Water Samples from Various Origins Using Wavelength-Scanned Cavity Ring-Down Spectrophotometer. Geophysical Research Abstracts. 11. (abstract only).

Sadhwani et al., Nov. 2005. "Case Studies on environmental impact of seawater desalination" Science Direct; http://www.sciencedirect.com/science?_ob=ArticleURL&_udi=B6TFX-4HMX97J-3&_u . . . 3pp.

Sakata, M. 1987. Movement and Neutralization of Alkaline Leachate at Coal Ash Disposal Sites. Environ. Sci. Technol. 21(8): 771-777.

Sample, J.C. et al. Mar. 1995. Isotope Geochemistry of Syntectonic Carbonate Cements and Veins from the Oregon Margin: Implications for the Hydrogelogic Evolution of the Accretionary Wedge. Proceedings of the Ocean Drilling Program, Scientific Results. 146: 137-148.

Sasakawa, M., et al. Carbonic Isotopic Characterization for the Origin of Excess Methane in Subsurface Seawater. Journal of Geophysical Research, vol. 113 (abstract) [online], Mar. 11, 2008 [retrieved on Jan. 1, 2010] <URL: http://www.agu.org/pubs/crossref/2008/2007JC004217.shtml>.

Schouten, S., et al. 2004. Stable Carbon Isotopic Fractionations Associated with Inorganic Carbon Fixation by Anaerobic Ammonium-Oxidizing Bacteria. Applied and Environmental Microbiology. 70(6): 3785-3788.

Schroll, E. 2002. Genesis of magnesite deposits in the view of isotope geochemistry. Boletim Paranaense de Geociencias. 50: 59-68.

Schwab, E. 2004. Calciumhydroxid, XP-002577920. Retrieved from the Internet: <URL:http://www.roempp.com/prod/indexl.html> (In German with English Translation).

Serizawa et al., "Cell-compatible properties of calcium carbonates and hydroxyapatite deposited on ultrathin poly (vinyl alcohol)-coated polyethylene films"; J. Biomater. Sci. Polymer Edn., vol. 14, No. 7 Apr. 2003 pp. 653-663.

Sethi, S. et al. 2006. Existing & Emerging Concentrate Minimization & Disposal Practices for Membrane Systems. Florida Water Resources Journal. pp. 38, 40, 42, 44, 46, 48.

Shaffer, R. Aug. 2008 A Devlish Green Angel. Fast Company. N127: 92-97.

Shell Global Solutions, 2003. "ADIP-X and Sulfinol-X—new regenerable acid-gas removal processes"; Shell Global Solutions International; OG 130210370903-En(A); www.shellglobalsoultions.com 2 pp (presented at the 12th International Oil, Gas, and Petrochemicals Congress, Tehran, Iran Feb. 24-26, 2003).

Sheppard, S.M.F., et al. 1970. Fractionation of Carbon and Oxygen Isotopes and Magnesium between Coexisting Metamorphic Calcite and Dolomite. Contr. Mineral. and Petrol. 26. 161-198.

Sial, A.N., et al. 2000. Carbon isotope fluctuations in Precambrian carbonate sequences of several localities in Brazil. An. Acad. Bras. Ci. 72(4): 539-558.

Skrzypek, G. et al. Jul. 2006. $\delta^{13}C$ analyses of calcium carbonate: comparison between the GasBench and elemental analyzer techniques. Rapid Communications in Mass Spectrometry. 20: 2915-2920.

Socolow, R. Sep. 1997 Fuels Decarbonization and Carbon Sequestration: Report of a Workshop. Center for Energy and Environmental Studies School of Engineering and Applied Science. Princeton University, Princeton, NJ.

Soong, Y. et al. 2004. Experimental and simulation studies on mineral trapping of CO2 with brine. Energy Conversion and Management. 45: 1845-1859.

Stanley, S.M., et al. Sep. 2002. Low-magnesium calcite produced by coralline algae in seawater of Late Cretaceous composition. PNAS. 99(24): 15323-15326.

Tececo Pty Ltd, "Eco-Cement"; www.tececo.com/simple.eco-cement.php; Dec. 29, 2008; 6pp.

Technology for Commercialization of Slag. Feb. 1995. New Technology Japan. ISSN: 0385-6542. p. 35.

Turner, J.A. Jul. (1999). "A Realizable Renewable Energy Future." Science. 285 (5428): 687-689.

Uibu, M. et al. "CO2 mineral sequestration in oil-shale wastes from Estonian power production." Journal of Environmental Management vol. 90 Sep. 2009. pp. 1253-1260.

Uibu, M. et al.,"Mineral trapping of CO2 via oil shale ash aqueous carbonation: controlling mechanism of process rate and development of continuous-flow reactor system." Oil Shale. vol. 26, No. 1 (2009) pp. 40-58.

Uliasz-Bochenczyk, A. et al. "Utilization of Carbon Dioxide in Fly Ash and Water Mixtures." Chemical Engineering Research and Design. Apr. 2006. 84(A9): 843-846.

Vagin, S.P., et al. Jul. 1979. Measurement of the Temperature of Gas Media Containing Carbon Dioxide by the Laser-Probing Method. Plenum.

Various authors. 2001. "Calcium Carbonate: From the Cretaceous Period Into the 21st Century." Birkhauser Verlag, pp. 1-54. <http://books.google.com/books?id=pbkKGa19k5QC&Ipg=PA15&ots=gjUUiWmGIR&dq=vaterite%20limestone&pg=PA54#v=twopage&q&f=true> viewed Jul. 14, 2011.

Wang, W., et al. Jan. 2005. Effects of biodegradation on the carbon isotopic composition of natural gas—A case study in the bamianhe oil field of the Jiyang Depression, Eastern China. Geochemical Journal. 39(4): 301-309. (abstract) [online] [retrieved on Dec. 29, 2009] <URL: http://www/jstage.jst.go.jp/article/geochemj/39/4/39_301/_article> ab.

Webber, M.E., et al. Feb. 2001. In situ combustion measurements of CO2 by use of a distributed-feedback diode-laser sensor near 2.0 µm. Applied Optics. 40(6): 821-828.

Wen-Zhi et al., "Using Electrolytic Method to Promote CO2 Sequestration in Serpentine by Mineral Carbonation"; Journal of China University of Mining and Technology; vol. 36, No, 6; Nov. 2007 (Publication and English Translation).

Wilson, S.A., et al. Dec. 2009. Carbon Dioxide Fixation within Mine Wastes of Ultramafic-Hosted Ore Deposits: Examples from the Clinton Creek and Cassiar Chrysotile Deposits, Canada. Society of Economic Geologists, Inc. 104: 95-112.

Winschel, R.A., et al. Stable Carbon Isotope Analysis of Coal/Petroleum Coprocessing Products. Preprints of Papers, American Chemical Society, Division of Fuel Chemistry, Jan. 1, 1988, vol. 33, No. 1, pp. 114-121 [online], [retrieved on Dec. 29, 2009] <URL: http://www.anl.gov/PCS/acsfuel/preprint%20archive/Files/33_1_TORONTO_06-88_0114.PDF>.

Wright, L.L., et al. Mar. 1993. "U.S. Carbon Offset Potential Using Biomass Energy Systems." Water, Air, and Soil Pollution. 70: 483-497.

Zedef, V., et al. Aug. 2000. Genesis of Vein Stockwork and Sedimentary Magnesite and Hydromagnesite Deposits in the Ultramafic Terranes of Southwestern Turkey: A Stable Isotope Study. 95: 429-446.

Zhang, C.L. et al. 2001. Temperature-dependent oxygen and carbon isotope fractionations of biogenic siderite. Geochimica et Cosmochimica Acta. 65(14): 2257-2271.

Monteiro, et al. Incorporating carbon sequestration materials in civil infrastructure: A micro and nano-structural analysis. Cement and Concrete Composites. 2013; 40:14-20.

Calera. "Investors." Vinod Khosla. Calera.com website, available online at least as of Feb. 16, 2012. http://calera.com/index.php/about_us/our_team/investors/.

(56) References Cited

OTHER PUBLICATIONS

Combes, et al Preparation, physical-chemical characterisation and cytocompatibility of calcium carbonate cements Biomaterials. Mar. 2006; 27(9):1945-1954.

Donnet, et al. Use of seeds to control precipitation of calcium carbonate and determination of seed nature. Langmuir. Jan. 4, 2005;21(1):100-8.

European search report and opinion dated Aug. 4, 2014 for EP Application No. 09810860.8.

European search report and opinion dated Dec. 20, 2011 for EP Application No. 09767687.8.

Gomez-Morales, et al. Nucleation of calcium carbonate at different initial pH conditions. Journal of Crystal Growth. 1996; 169(2):331-338.

Hong, et al. Treatment of Strongly Oxidized Water by Three-cell Electrodialysis Stack. Modern Food Science and Technology. 2005; 21(2):88-90.

International search report and written opinion dated May 28, 2013 for PCT/US2011/023730.

Matilla, et al. Production of precipitated calcium carbonate from steel converter slag and other calcium-containing industrial wastes and residues. Advances in inorganic chemistry. 2014; vol. 66, Ch. 10. 347-384.

Matilla, et al. Reduced Limestone Consumption in Steel Manufacturing Using a pseudo-catalytic calcium lixiviant. Energy Fuels. 2014; 28:4068-4074.

Miller. "Mixing in Some Carbon." NY Times, Mar. 21, 2010. Viewed on Feb. 16, 2012 at http://www.nytimes.com/201 0/03/22/business/energy-environment/22cement.html.

Mufson. "Khosla, Gates put up $100 million for Kior." Washington Post, p. A 12, 10/22/13.

Rau, et al. Capturing and sequestering flue-gas CO2 using a wet limestone scrubber. 2nd National Conference on Carbon Sequestration Washington D.C., May 5-8, 2003. http://www.netl.doe.gov/publications/proceedings/03/carbon-seq/pdfs/167.pdf.

Shaffer. "The King of Green Investing." Fast Company, Jul. 1, 2008. Viewed on Feb. 16, 2012 at http://www.fastcompany.com/magazine/127/a-devilish-green-angel.html.

St. John. "Vinod Khosla: Carbon-Capturing Cement Worth as Much as GE's Power Plant Business." Greentechmedia, Sep. 15, 2009. Viewed on Feb. 16, 2012 at http://www.greentechmedia.com/greenlight/post/vinod-khosla-carbon-capturing-cement-worthas-much-as-ges-power-plant-busin/.

Stepkowska, et al. Calcite, Vaterite and Aragonite forming on cement hydration from liquid and gaseous phase. Journal of Thermal Analysis and Calorimetry. 2003; 73:247-269.

Tari, et al. Colloidal processing of calcium carbonate. Ceramics International. 1998; 24:527-532.

Tsuni, et al. Effects of Trace Lanthanum ion on the Stability of Vaterite and Transformation from Vaterite to Calcite in an Aquatic System. Bulletin of The Chemical Society of Japan. 2001; 74(3):479-486.

Verdoes, et al. Determination of nucleation and growth rates from induction times in seeded and unseeded precipitation of calcium carbonate. Journal of Crystal Growth. 1992; 118:401-413.

Wei, et al. High Surface Area Calcium Carbonate: Pore Structural Properties and Sulfation Characteristics, Industrial & Engineering Chemistry Research. 1997; 36(6):2141-2148.

* cited by examiner

METHODS AND SYSTEMS FOR UTILIZING WASTE SOURCES OF METAL OXIDES

CROSS-REFERENCE

This application is a Continuation application of U.S. application Ser. No. 12/788,735, filed 27 May 27 2010 which application: is a continuation-in-part application of U.S. patent application Ser. No. 12/344,019, filed 24 Dec. 2008, issued as U.S. Pat. No. 7,887,694; is a divisional of U.S. patent application Ser. No. 12/486,692, filed 17 Jun. 2009, issued as U.S. Pat. No. 7,754,169; and claims the benefit of U.S. Provisional Patent Application Nos. 61/073,319, filed 17 Jun. 2008 and 61/079,790, filed 10 Jul. 2008, all of which applications are incorporated herein by reference in their entireties. The U.S. patent application Ser. No. 12/486,692, filed 17 Jun. 2009, issued as U.S. Pat. No. 7,754,169 is a continuation-in-part application of U.S. patent application Ser. No. 12/344,019, filed 24 Dec. 2008, issued as U.S. Pat. No. 7,887,694; is a continuation-in-part application of International Patent Application Serial No. PCT/US08/88246, filed, 23 Dec. 2008; is a continuation-in-part application of International Patent Application Serial No. PCT/US08/88242, filed 23 Dec. 2008; and claims the benefit of U.S. Provisional Patent Application Nos. 61/121,872, filed 11 Dec. 2008, 61/101,626, filed 30 Sep. 2008, 61/088,347, filed 13 Aug. 2008, 61/088,340, filed 12 Aug. 2008, 61/082,766, filed 22 Jul. 2008, 61/073,319, filed 17 Jun. 2008, 61/079,790, filed 10 Jul. 2008, 61/057,173, filed 29 May 2008, and 61/017,405, filed 28 Dec. 2007, all of which are incorporated herein by reference in their entireties.

BACKGROUND

Carbon dioxide (CO2) emissions have been identified as a major contributor to the phenomenon of global warming CO2 is a by-product of combustion and it creates operational, economic, and environmental problems. It is expected that elevated atmospheric concentrations of CO2 and other greenhouse gases will facilitate greater storage of heat within the atmosphere leading to enhanced surface temperatures and rapid climate change. In addition, elevated levels of CO2 in the atmosphere are also expected to further acidify the world's oceans due to the dissolution of CO2 and formation of carbonic acid. The impact of climate change and ocean acidification will likely be economically expensive and environmentally hazardous if not timely handled. Reducing potential risks of climate change will require sequestration and avoidance of CO2 from various anthropogenic processes.

SUMMARY

Provided is a method comprising contacting an aqueous solution with a source of metal oxides from an industrial process; charging the aqueous solution with carbon dioxide from a source of carbon dioxide from an industrial process; and subjecting the aqueous solution to precipitation conditions under atmospheric pressure to produce a carbonate-containing precipitation material. In some embodiments, the source of metal oxides and the source of carbon dioxide are from the same industrial process. In some embodiments, contacting the aqueous solution with the source of metal oxides occurs prior to charging the aqueous solution with a source of carbon dioxide. In some embodiments, contacting the aqueous solution with the source of metal oxides occurs at the same time as charging the aqueous solution with a source of carbon dioxide. In some embodiments, contacting the aqueous solution with the source of metal oxides, charging the aqueous solution with a source of carbon dioxide, and subjecting the aqueous solution to precipitation conditions occurs at the same time. In some embodiments, the source of metal oxides and the source of carbon dioxide are sourced from the same waste stream. In some embodiments, the waste stream is flue gas from a coal-fired power plant. In some embodiments, the coal-fired power plant is a brown coal-fired power plant. In some embodiments, the waste stream is kiln exhaust from a cement plant. In some embodiments, the source of metal oxides is fly ash. In some embodiments, the source of metal oxides is cement kiln dust. In some embodiments, the waste stream further comprises SOx, NOx, mercury, or any combination thereof. In some embodiments, the source of metal oxides further provides divalent cations for producing the precipitation material. In some embodiments, the source of metal oxides and the aqueous solution both comprise divalent cations for producing the precipitation material. In some embodiments, the source of metal oxides is fly ash or cement kiln dust. In some embodiments, the aqueous solution comprises brine, seawater, or freshwater. In some embodiments, the divalent cations comprises $Ca^{2+}$, $Mg^{2+}$, or a combination thereof. In some embodiments, the source of metal oxides provides proton-removing agents for producing the precipitation material. In some embodiments, the source of metal oxides provides proton-removing agents upon hydration of CaO, MgO, or a combination thereof in the aqueous solution. In some embodiments, the source of metal oxides further provides silica. In some embodiments, the source of metal oxides further provides alumina. In some embodiments, the source of metal oxides further provides ferric oxide. In some embodiments, red or brown mud from bauxite processing also provides proton-removing agents. In some embodiments, electrochemical methods effecting proton removal also provide for producing precipitation material.

In some embodiments, the method further comprises separating the precipitation material from the aqueous solution from which the precipitation material was produced. In some embodiments, the precipitation material comprises CaCO3. In some embodiments, CaCO3 comprises calcite, aragonite, vaterite, or a combination thereof. In some embodiments, the precipitation material further comprises MgCO3. In some embodiments, the CaCO3 comprises aragonite and the MgCO3 comprises nesquehonite. In some embodiments, the method further comprises processing the precipitation material to form a building material. In some embodiments, the building material is a hydraulic cement. In some embodiments, the building material is a pozzolanic cement. In some embodiments, the building material is aggregate.

Also provided is a method comprising contacting an aqueous solution with a waste stream comprising carbon dioxide and a source comprising metal oxides and subjecting the aqueous solution to precipitation conditions to produce a carbonate-containing precipitation material. In some embodiments, the waste stream is flue gas from a coal-fired power plant. In some embodiments, the coal-fired power plant is a brown coal-fired power plant. In some embodiments, the source of metal oxides is fly ash. In some embodiments, the waste stream is kiln exhaust from a cement plant. In some embodiments, the source of metal oxides is cement kiln dust. In some embodiments, the waste stream further comprises SOx, NOx, mercury, or any combination thereof. In some embodiments, divalent cations for producing the precipitation material are provided by the source of metal oxides, the aqueous solution, or a combination thereof. In some embodiments, the aqueous solution comprises brine, seawater, or freshwater. In some embodiments, the divalent cations comprise $Ca^{2+}$, $Mg^{2+}$, or a combination thereof. In some embodiments, the source of metal oxides further provides proton-removing agents for producing the precipitation material. In some embodiments, the source of metal oxides provides proton-removing agents upon hydration of CaO, MgO, or combinations thereof in the aqueous solution. In some embodiments, the source of metal oxides further provides silica. In some embodiments, the source of metal oxides further provides alumina. In some embodiments, the source of metal oxides further provides ferric oxide. In some embodiments, red or brown mud from bauxite processing also provides proton-removing agents. In some embodiments, electrochemical methods effecting proton removal also provide for producing precipitation material. In some embodiments, the precipitation material comprises CaCO3. In some embodiments, CaCO3 comprises calcite, aragonite, vaterite, or a combination thereof. In some embodiments, the method further comprises separating the precipitation material from the aqueous solution from which the precipitation material was produced. In some embodiments, the method further comprises processing the precipitation material to form a building material. In some embodiments, the building material is a hydraulic cement. In some embodiments, the building material is a pozzolanic cement. In some embodiments, the building material is aggregate.

Also provided is a siliceous composition comprising a synthetic calcium carbonate, wherein the calcium carbonate is present in at least two forms selected from calcite, aragonite, and vaterite. In some embodiments, the at least two forms of calcium carbonate are calcite and aragonite. In some embodiments, calcite and aragonite are present in a ratio of 20:1. In some embodiments, calcium carbonate and silica are present in a ratio of at least 1:2, carbonate to silica. In some embodiments, 75% of the silica is amorphous silica less than 45 microns in particle size. In some embodiments, silica particles are wholly or partially encapsulated by the synthetic calcium carbonate or synthetic magnesium carbonate.

Also provided is a siliceous composition comprising synthetic calcium carbonate and synthetic magnesium carbonate, wherein the calcium carbonate is present in at least a form selected from calcite, aragonite, and vaterite, and wherein magnesium carbonate is present in at least a form selected from nesquehonite, magnesite, and hydromagnesite. In some embodiments, the calcium carbonate is present as aragonite and the magnesium carbonate is present as nesquehonite. In some embodiments, silica is 20% or less of the siliceous composition. In some embodiments, silica is 10% or less of the siliceous composition. In some embodiments, silica particles are wholly or partially encapsulated by the synthetic calcium carbonate or synthetic magnesium carbonate.

Also provided is a system comprising a slaker adapted to slake a waste source of metal oxides, a precipitation reactor; and a liquid-solid separator, wherein the precipitation reactor is operably connected to both the slaker and the liquid-solid separator, and further wherein the system is configured to produce carbonate-containing precipitation material in excess of 1 ton per day. In some embodiments, the system is configured to produce carbonate-containing precipitation material in excess of 10 tons per day. In some embodiments, the system is configured to produce carbonate-containing precipitation material in excess of 100 ton per day. In some embodiments, the system is configured to produce carbonate-containing precipitation material in excess of 1000 tons per day. In some embodiments, the system is configured to produce carbonate-containing precipitation material in excess of 10,000 tons per day. In some embodiments, the slaker is selected from a slurry detention slaker, a paste slaker, and a ball mill slaker. In some embodiments, the system further comprises a source of carbon dioxide. In some embodiments, the source of carbon dioxide is from a coal-fired power plant or cement plant. In some embodiments, the system further comprises a source of proton-removing agents. In some embodiments, the system further comprises a source of divalent cations. In some embodiments, the system further comprising a building-materials production unit configured to produce a building material from solid product of the liquid-solid separator.

DRAWINGS

The novel features of the invention are set forth with particularity in the appended claims. A better understanding of the features and advantages of the invention will be obtained by reference to the following detailed description that sets forth illustrative embodiments, in which the principles of the invention are utilized, and the accompanying drawings of which:

FIG. 1 provides a schematic overview of an example power plant flue gas treatment process that uses ESP and FGD.

Figure 2:
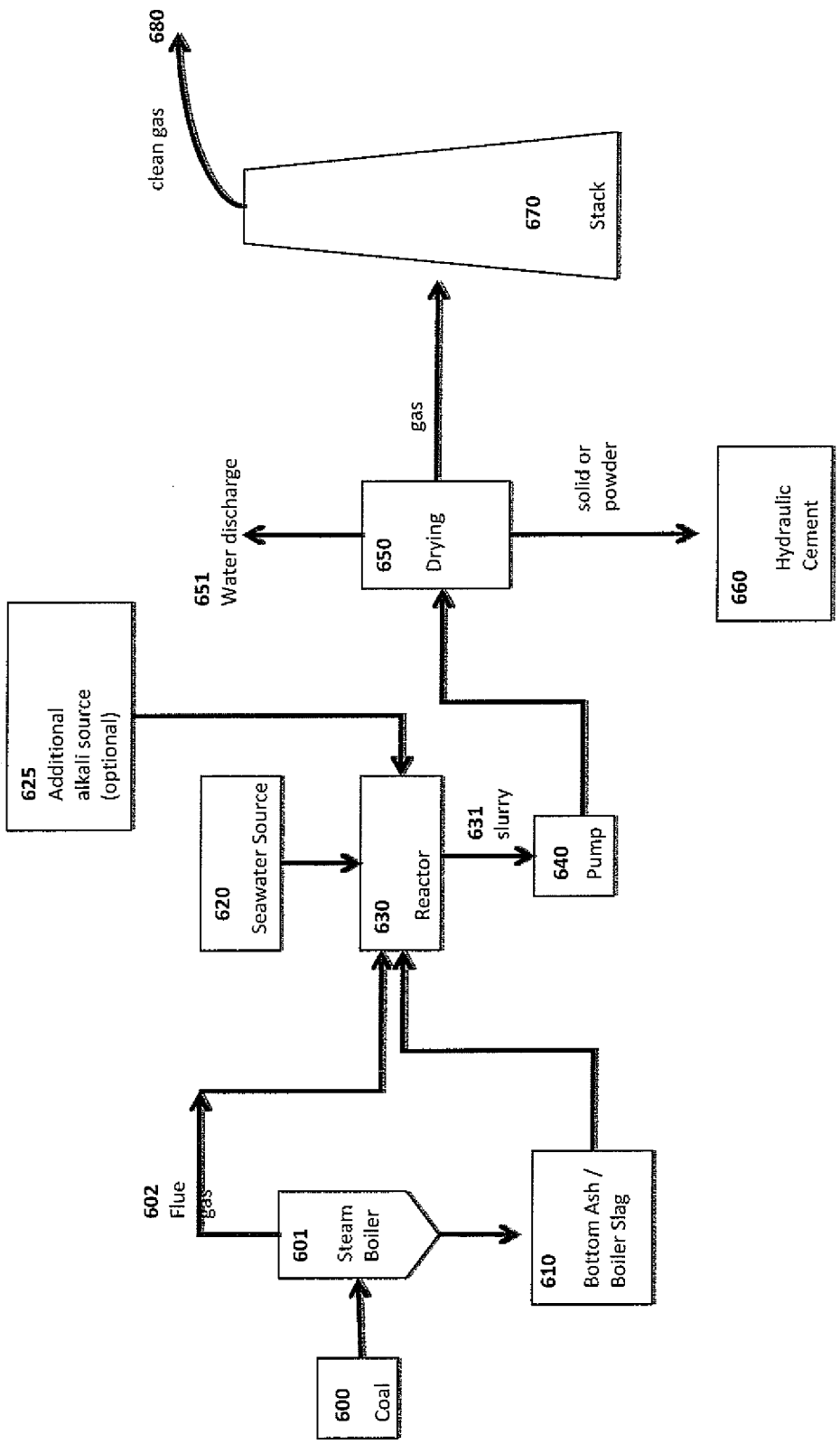

FIG. 2 provides a schematic overview of an example power plant flue gas treatment process utilizing embodiments of the invention.

Figure 3:
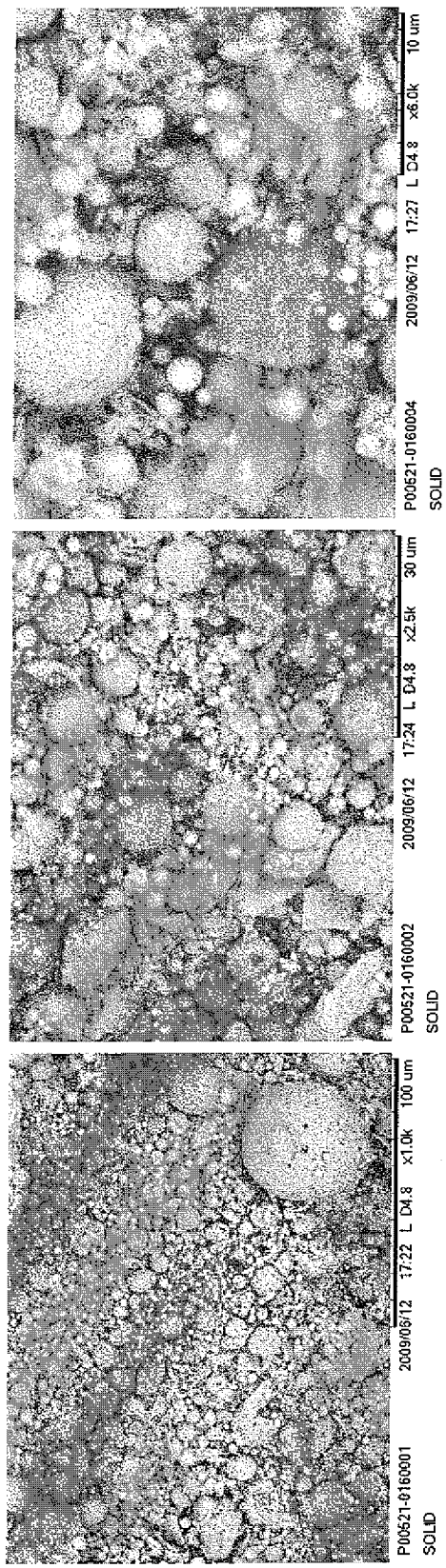

FIG. 3 provides SEM images of the precipitation material of Example 2 at 1000, 2500×, and 6000× magnification.

Figure 4:
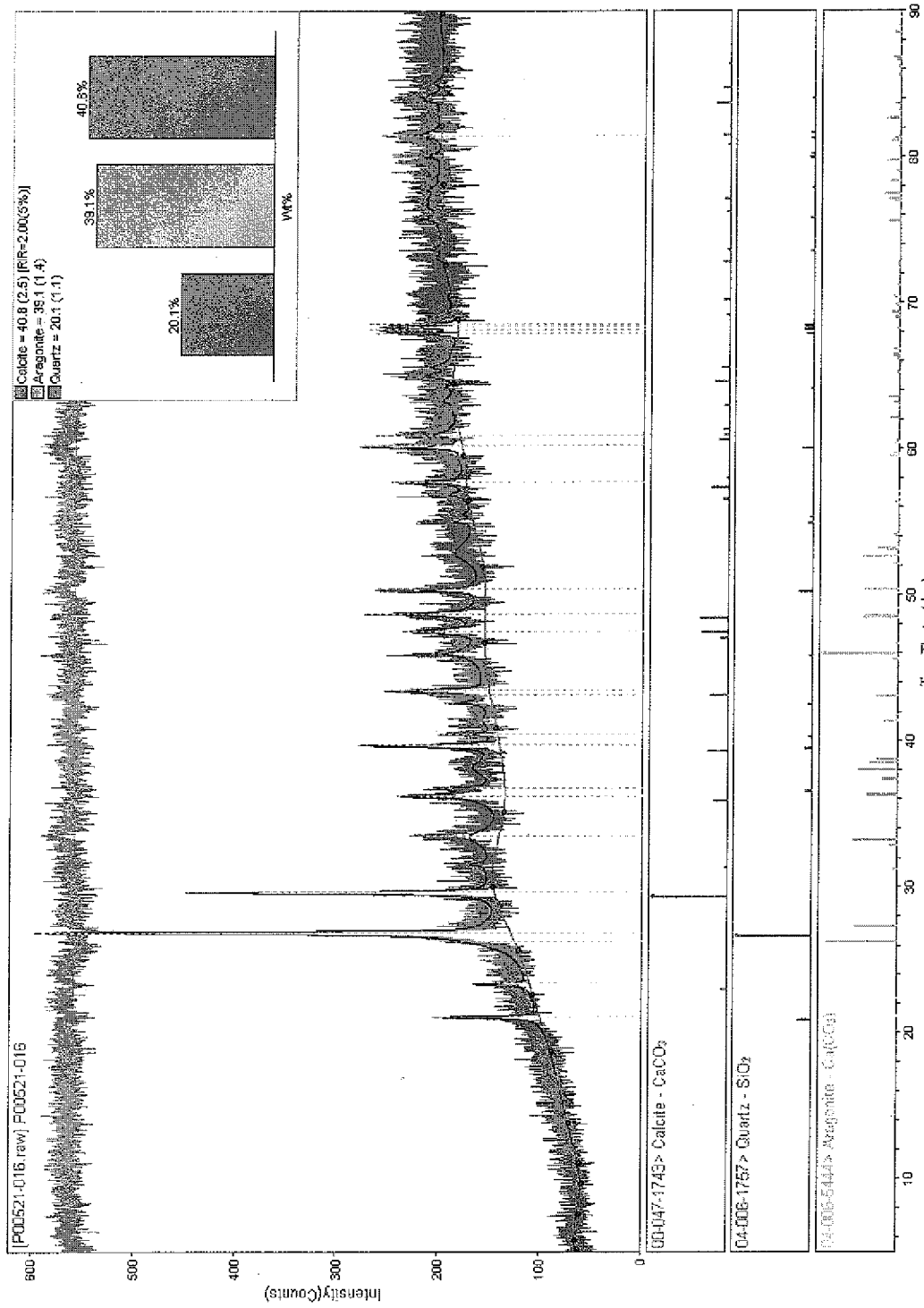

FIG. 4 provides an XRD for the precipitation material of Example 2.

Figure 5:
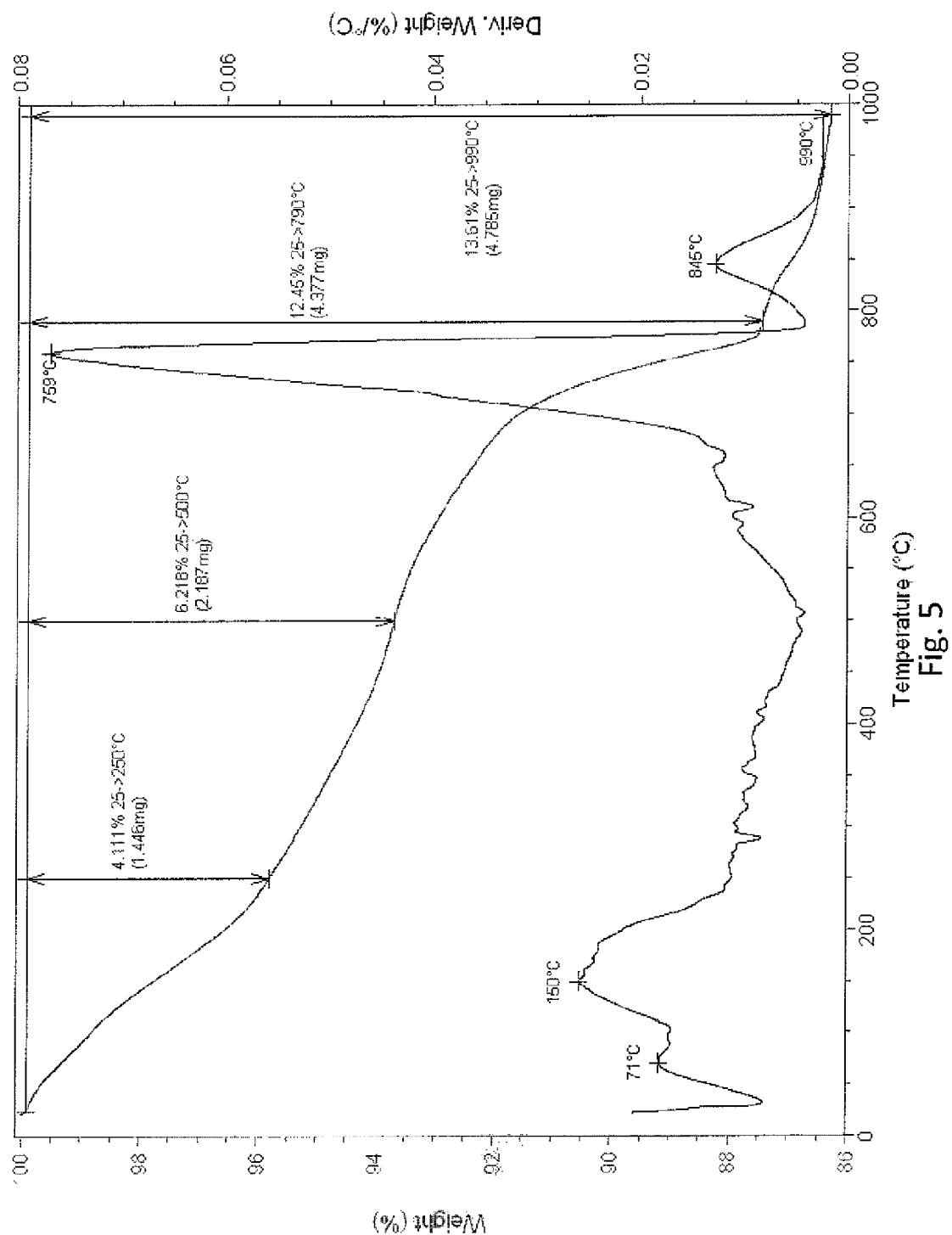

FIG. 5 provides a TGA for the precipitation material of Example 2.

Figure 6:
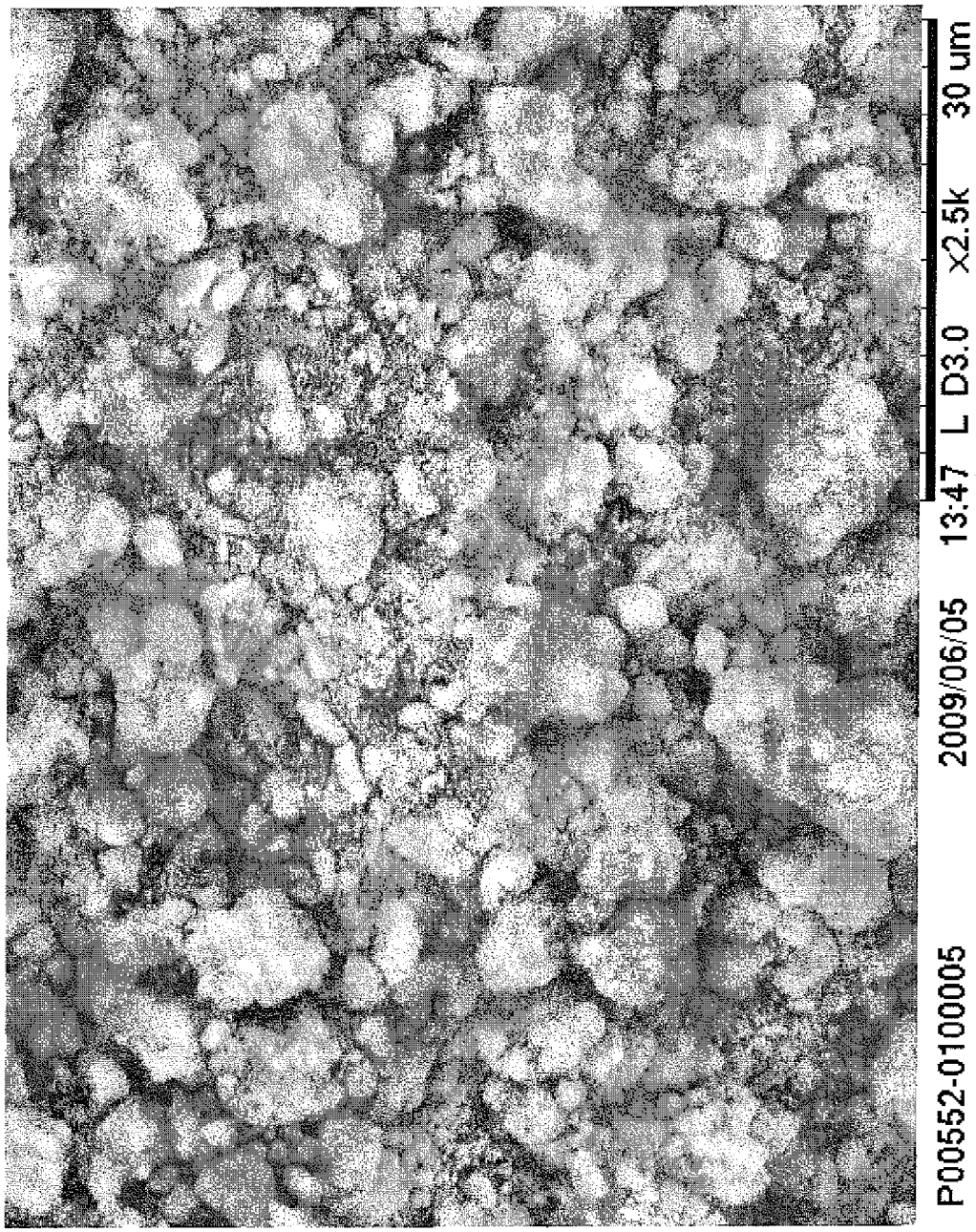

FIG. 6 provides an SEM image of the precipitation material of Example 3 at 2,500× magnification.

Figure 7:
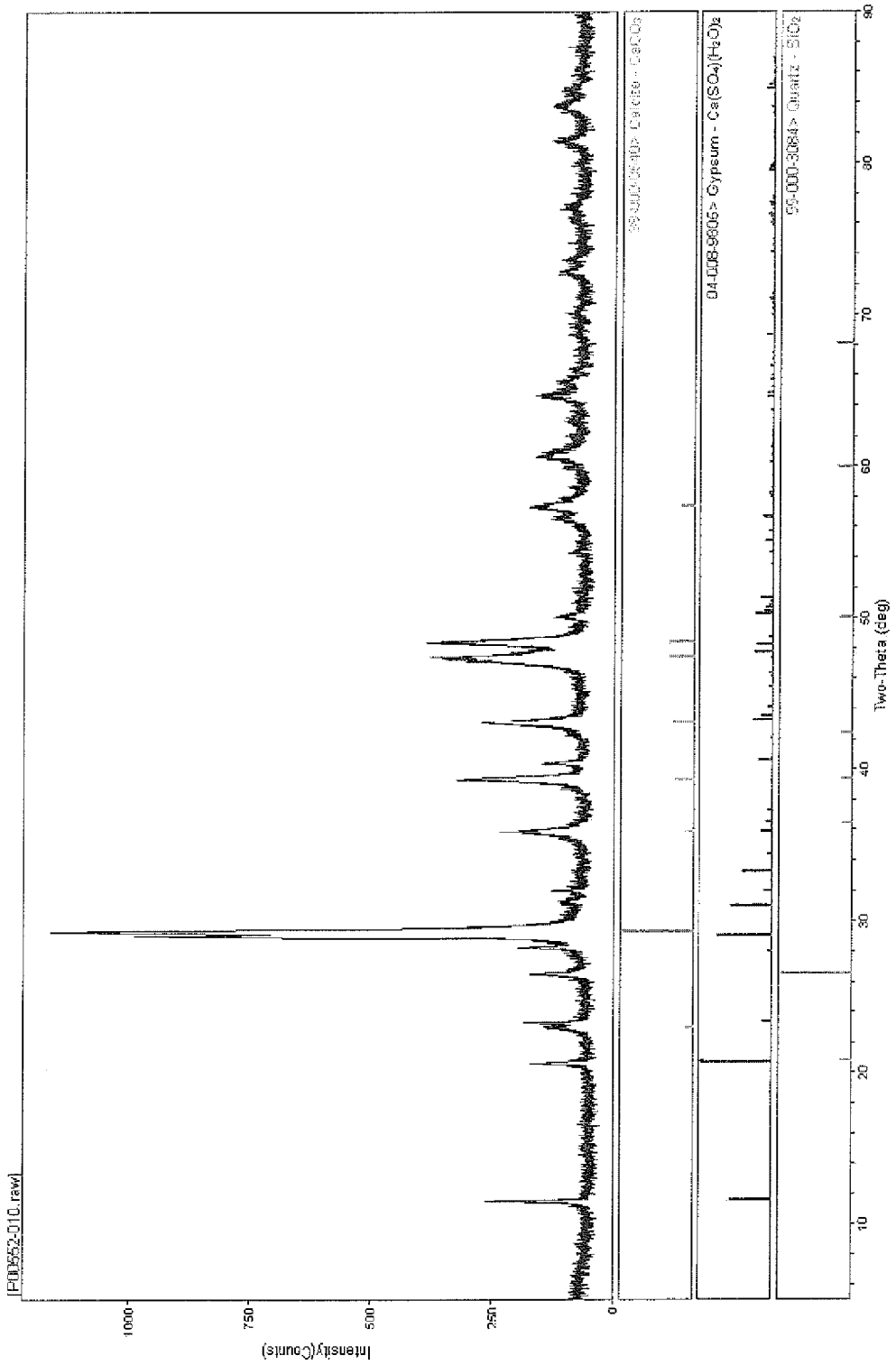

FIG. 7 provides an XRD of the precipitation material of Example 3.

Figure 8:
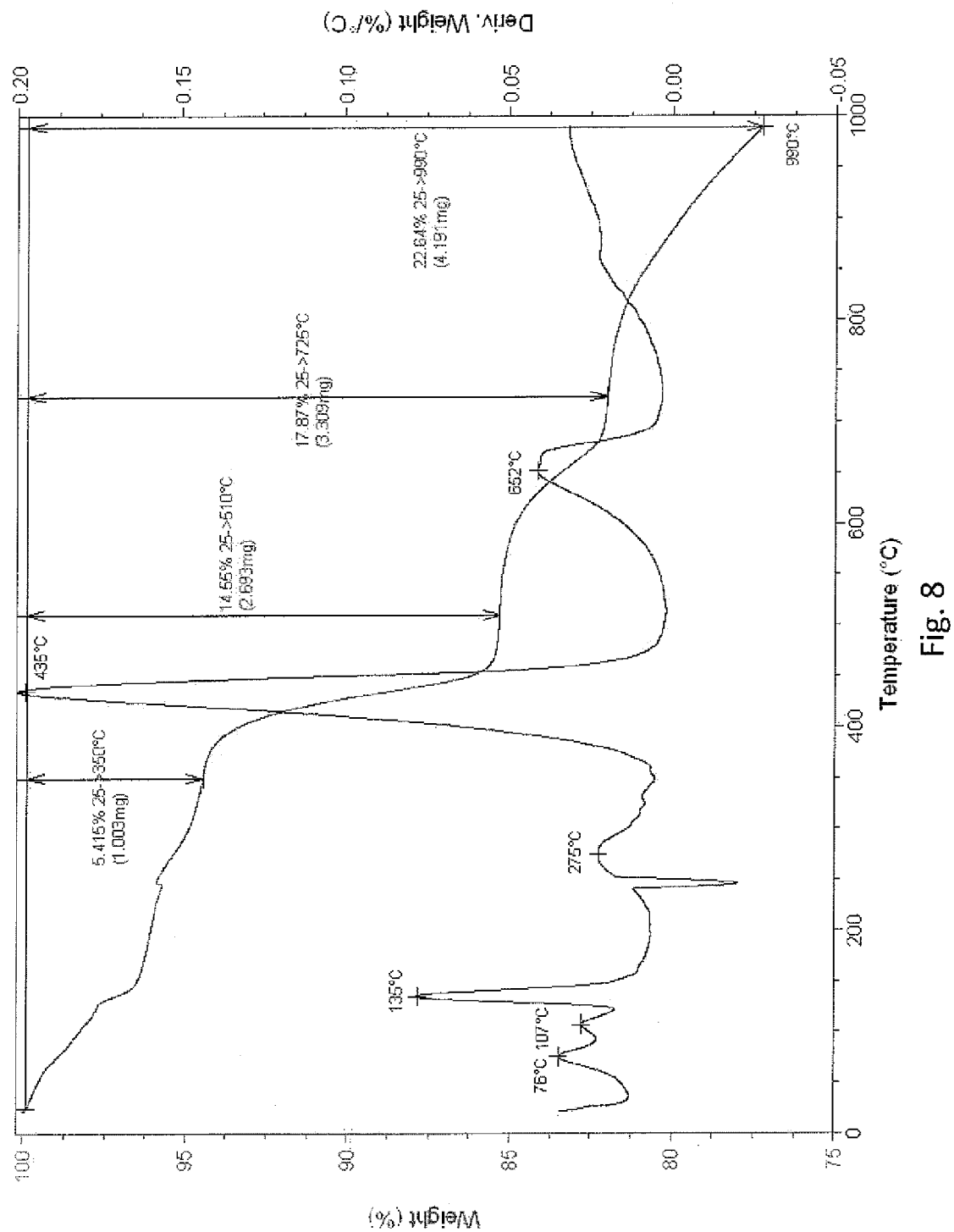

FIG. 8 provides a TGA of the precipitation material of Example 3.

Figure 9:
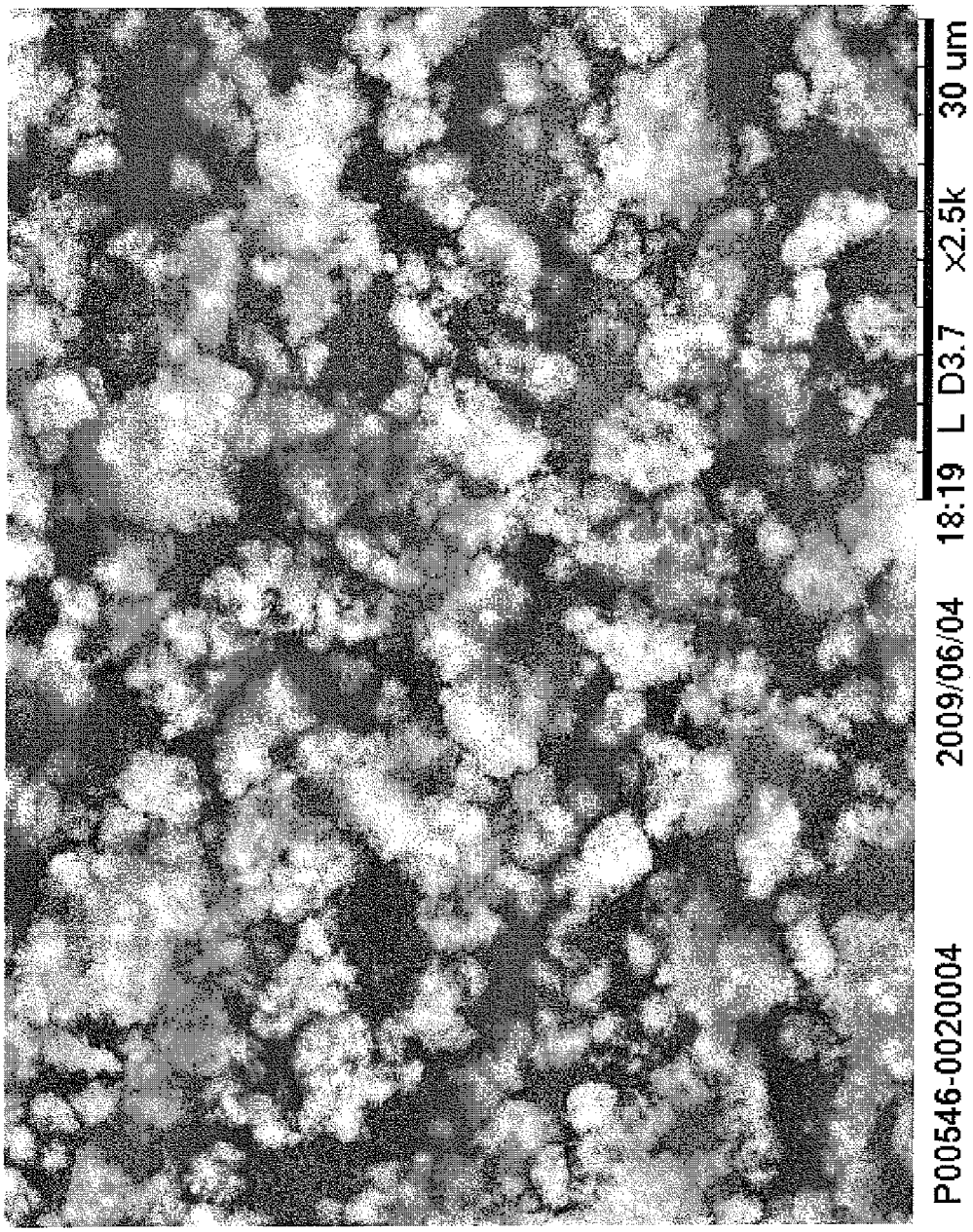

FIG. 9 provides an SEM image of oven-dried precipitation material of Example 4 at 2,500× magnification.

Figure 10:
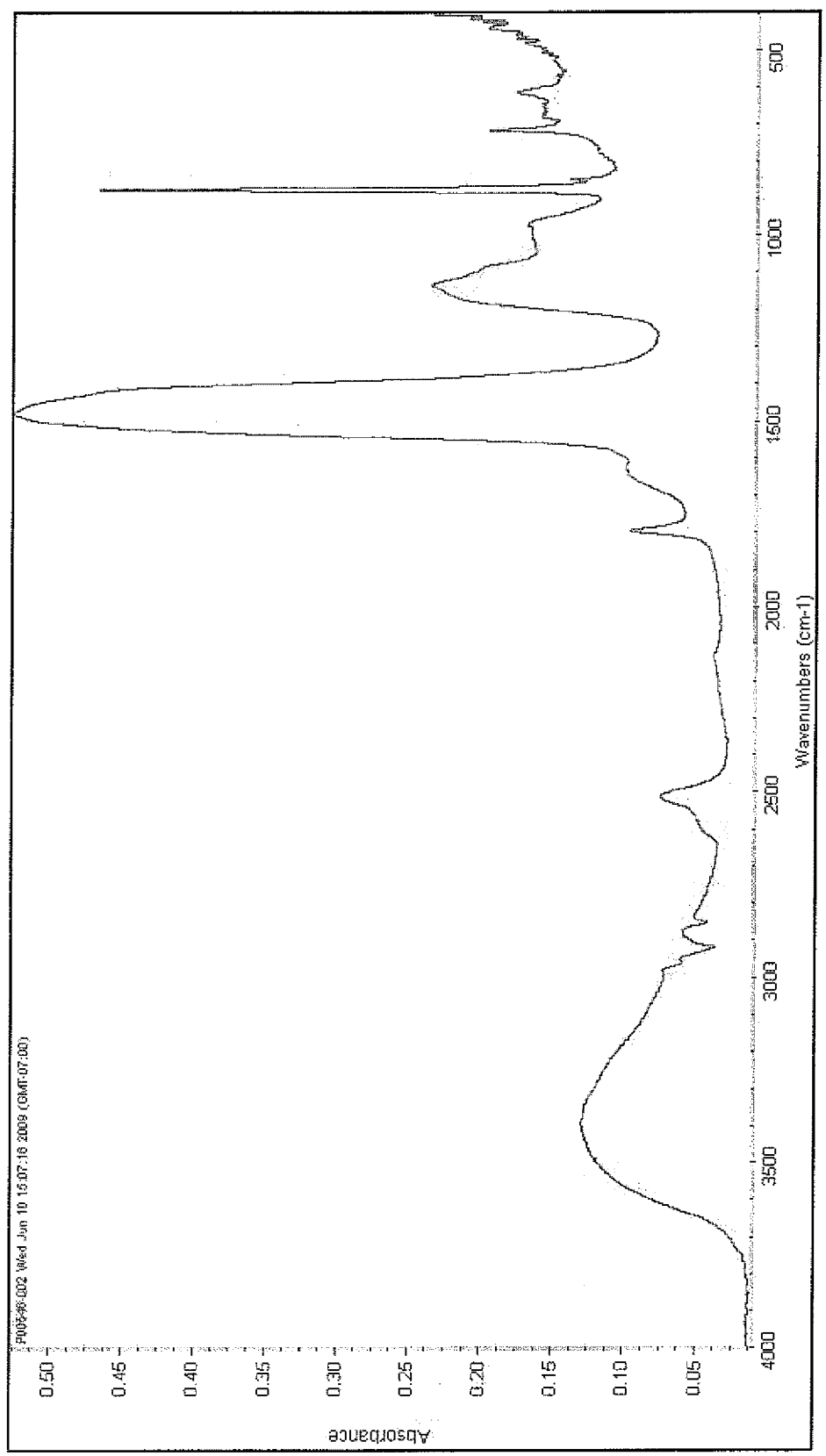

FIG. 10 provides an FT-IR of the oven-dried precipitation material of Example 4.

DESCRIPTION

Before the invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrequited number may be a number, which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the invention, representative illustrative methods and materials are now described.

All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided may be different from the actual publication dates, which may need to be independently confirmed.

It is noted that, as used herein and in the appended claims, the singular forms "a", "an", and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method can be carried out in the order of events recited or in any other order, which is logically possible.

Materials

As described in further detail below, the invention utilizes a source of $CO_2$, a source of proton-removing agents (and/or methods of effecting proton removal), and a source of divalent cations. Waste sources of metal oxides (e.g., combustion ash such as fly ash, bottom ash, boiler slag; cement kiln dust; and slag such as iron slag and phosphorous slag) may provide, in whole or in part, the source of proton-removing agents and/or the source of divalent cations. As such, waste sources of metal oxides such as combustion ash (e.g., fly ash, bottom ash, boiler slag), cement kiln dust, and slag (e.g. iron slag, phosphorous slag) may be the sole source of divalent metal cations and proton-removing agents for preparation of the compositions described herein. Waste sources such as ash, cement kiln dust, slag (e.g. iron slag, phosphorous slag) may also be used in combination with supplemental sources of divalent cations or proton-removing agents. Carbon dioxide sources, supplemental divalent cation sources, and supplemental proton-removing sources (and methods of effecting proton removal) will first be described to give context to waste sources of metal oxides as sources of divalent cations and proton-removing agents. Waste sources of metal oxides will then be described, for example, combustion ash, cement kiln dust, and slag (e.g. iron slag, phosphorous slag) followed by methods in which these waste sources of metal oxides are used to produce compositions comprising carbonates.

Carbon Dioxide

Methods of the invention include contacting a volume of an aqueous solution of divalent cations with a source of $CO_2$, then subjecting the resultant solution to precipitation conditions. There may be sufficient carbon dioxide in the divalent cation-containing solution to precipitate significant amounts of carbonate-containing precipitation material (e.g., from seawater); however, additional carbon dioxide is generally used. The source of $CO_2$ may be any convenient $CO_2$ source. The $CO_2$ source may be a gas, a liquid, a solid (e.g., dry ice), a supercritical fluid, or $CO_2$ dissolved in a liquid. In some embodiments, the $CO_2$ source is a gaseous $CO_2$ source. The gaseous stream may be substantially pure $CO_2$ or comprise multiple components that include $CO_2$ and one or more additional gases and/or other substances such as ash and other particulates. In some embodiments, the gaseous $CO_2$ source is a waste feed (i.e., a by-product of an active process of the industrial plant) such as exhaust from an industrial plant. The nature of the industrial plant may vary, the industrial plants of interest including, but not limited to, power plants, chemical processing plants, mechanical processing plants, refineries, cement plants, steel plants, and other industrial plants that produce $CO_2$ as a by-product of fuel combustion or another processing step (such as calcination by a cement plant).

Waste gas streams comprising $CO_2$ include both reducing (e.g., syngas, shifted syngas, natural gas, hydrogen and the like) and oxidizing condition streams (e.g., flue gases from combustion). Particular waste gas streams that may be convenient for the invention include oxygen-containing combustion industrial plant flue gas (e.g., from coal or another carbon-based fuel with little or no pretreatment of the flue gas), turbo charged boiler product gas, coal gasification product gas, shifted coal gasification product gas, anaerobic digester product gas, wellhead natural gas stream, reformed natural gas or methane hydrates, and the like. Combustion gas from any convenient source may be used in methods and systems of the invention. In some embodiments, combustion gases in post-combustion effluent stacks of industrial plants such as power plants, cement plants, and coal processing plants is used.

Thus, the waste streams may be produced from a variety of different types of industrial plants. Suitable waste streams for the invention include waste streams produced by industrial plants that combust fossil fuels (e.g., coal, oil, natural gas) and anthropogenic fuel products of naturally occurring organic fuel deposits (e.g., tar sands, heavy oil, oil shale, etc.). In some embodiments, waste streams suitable for systems and methods of the invention are sourced from a coal-fired power plant, such as a pulverized coal power plant, a supercritical coal power plant, a mass burn coal power plant, a fluidized bed coal power plant; in some embodiments the waste stream is sourced from gas or oil-fired boiler and steam turbine power plants, gas or oil-fired boiler simple cycle gas turbine power plants, or gas or oil-fired boiler combined cycle gas turbine power plants. In some embodiments, waste streams produced by power plants that combust syngas (i.e., gas that is produced by the gasification of organic matter, for example, coal, biomass, etc.) are used. In some embodiments, waste streams from integrated gasification combined cycle (IGCC) plants are used. In some embodiments, waste streams produced by Heat Recovery Steam Generator (HRSG) plants are used to produce aggregate in accordance with systems and methods of the invention.

Waste streams produced by cement plants are also suitable for systems and methods of the invention. Cement plant waste streams include waste streams from both wet process and dry process plants, which plants may employ shaft kilns or rotary kilns, and may include pre-calciners. These industrial plants may each burn a single fuel, or may burn two or more fuels sequentially or simultaneously.

Industrial waste gas streams may contain carbon dioxide as the primary non-air derived component, or may, especially in the case of coal-fired power plants, contain additional components such as nitrogen oxides (NOx), sulfur oxides (SOx), and one or more additional gases. Additional gases and other components may include CO, mercury and other heavy metals, and dust particles (e.g., from calcining and combustion processes). Additional components in the gas stream may also include halides such as hydrogen chloride and hydrogen fluoride; particulate matter such as fly ash, dusts, and metals including arsenic, beryllium, boron, cadmium, chromium, chromium VI, cobalt, lead, manganese, mercury, molybdenum, selenium, strontium, thallium, and vanadium; and organics such as hydrocarbons, dioxins, and PAH compounds. Suitable gaseous waste streams that may be treated have, in some embodiments, CO2 present in amounts of 200 ppm to 1,000,000 ppm, such as 200,000 ppm to 1000 ppm, including 200,000 ppm to 2000 ppm, for example 180,000 ppm to 2000 ppm, or 180,000 ppm to 5000 ppm, also including 180,000 ppm to 10,000 ppm. The waste streams, particularly various waste streams of combustion gas, may include one or more additional components, for example, water, NOx (mononitrogen oxides: NO and NO2), SOx (monosulfur oxides: SO, SO2 and SO3), VOC (volatile organic compounds), heavy metals such as mercury, and particulate matter (particles of solid or liquid suspended in a gas). Flue gas temperature may also vary. In some embodiments, the temperature of the flue gas is from 0° C. to 2000° C., such as from 60° C. to 700° C., and including 100° C. to 400° C.

In various embodiments, one or more additional components are precipitated in precipitation material formed by contacting the waste gas stream comprising these additional components with an aqueous solution comprising divalent cations (e.g., alkaline earth metal ions such as $Ca^{2+}$ and $Mg^{2+}$). Sulfates and/or sulfites of calcium and magnesium may be precipitated in precipitation material (further comprising calcium and/or magnesium carbonates) produced from waste gas streams comprising SOx (e.g., $SO_2$). Magnesium and calcium may react to form CaSO4, MgSO4, as well as other calcium- and magnesium-containing compounds (e.g., sulfites), effectively removing sulfur from the flue gas stream without a desulfurization step such as flue gas desulfurization ("FGD"). In addition, CaCO3, MgCO3, and related compounds may be formed without additional release of CO2. In instances where the aqueous solution of divalent cations contains high levels of sulfur compounds (e.g., sulfate), the aqueous solution may be enriched with calcium and magnesium so that calcium and magnesium are available to form carbonate compounds after, or in addition to, formation of CaSO4, MgSO4, and related compounds. In some embodiments, a desulfurization step may be staged to coincide with precipitation of carbonate-containing precipitation material, or the desulfurization step may be staged to occur before precipitation. In some embodiments, multiple reaction products (e.g., carbonate-containing precipitation material, CaSO4, etc.) are collected at different stages, while in other embodiments a single reaction product (e.g., precipitation material comprising carbonates, sulfates, etc.) is collected. In step with these embodiments, other components, such as heavy metals (e.g., mercury, mercury salts, mercury-containing compounds), may be trapped in the carbonate-containing precipitation material or may precipitate separately.

A portion of the gaseous waste stream (i.e., not the entire gaseous waste stream) from an industrial plant may be used to produce precipitation material. In these embodiments, the portion of the gaseous waste stream that is employed in precipitation of precipitation material may be 75% or less, such as 60% or less, and including 50% and less of the gaseous waste stream. In yet other embodiments, substantially (e.g., 80% or more) the entire gaseous waste stream produced by the industrial plant is employed in precipitation of precipitation material. In these embodiments, 80% or more, such as 90% or more, including 95% or more, up to 100% of the gaseous waste stream (e.g., flue gas) generated by the source may be employed for precipitation of precipitation material.

Although industrial waste gas offers a relatively concentrated source of combustion gases, methods and systems of the invention are also applicable to removing combustion gas components from less concentrated sources (e.g., atmospheric air), which contains a much lower concentration of pollutants than, for example, flue gas. Thus, in some embodiments, methods and systems encompass decreasing the concentration of pollutants in atmospheric air by producing a stable precipitation material. In these cases, the concentration of pollutants, e.g., CO2, in a portion of atmospheric air may be decreased by 10% or more, 20% or more, 30% or more, 40% or more, 50% or more, 60% or more, 70% or more, 80% or more, 90% or more, 95% or more, 99% or more, 99.9% or more, or 99.99%. Such decreases in atmospheric pollutants may be accomplished with yields as described herein, or with higher or lower yields, and may be accomplished in one precipitation step or in a series of precipitation steps.

Divalent Cations

As disclosed above, waste sources of metal oxides such as combustion ash (e.g., fly ash, bottom ash, boiler slag), cement kiln dust, and slag (e.g. iron slag, phosphorous slag), each of which is described in more detail in a respective section below, may be the sole source of divalent metal cations for preparation of the compositions described herein; however, waste sources such as ash, cement kiln dust, slag (e.g. iron slag, phosphorous slag) may also be used in combination with supplemental sources of divalent cations as described in this section.

Methods of the invention include contacting a volume of an aqueous solution of divalent cations with a source of CO2 and subjecting the resultant solution to precipitation conditions. In addition to waste sources of divalent cations, divalent cations may come from any of a number of different divalent cation sources depending upon availability at a particular location. Such sources include industrial wastes, seawater, brines, hard waters, minerals, and any other suitable source.

In some locations, industrial waste streams from various industrial processes provide for convenient sources of divalent cations (as well as in some cases other materials useful in the process, e.g., metal hydroxide). Such waste streams include, but are not limited to, mining wastes; fossil fuel burning ash (e.g., fly ash, as described in further detail herein); slag (e.g. iron slag, phosphorous slag); cement kiln waste (described in further detail herein); oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge.

In some locations, a convenient source of divalent cations for use in systems and methods of the invention is water (e.g., an aqueous solution comprising divalent cations such as seawater or surface brine), which may vary depending upon the particular location at which the invention is practiced. Suitable aqueous solutions of divalent cations that may be used include solutions comprising one or more divalent cations, e.g., alkaline earth metal cations such as $Ca^{2+}$ and $Mg^{2+}$. In some embodiments, the aqueous source of divalent cations comprises alkaline earth metal cations. In some embodiments, the alkaline earth metal cations include calcium, magnesium, or a mixture thereof. In some embodiments, the aqueous solution of divalent cations comprises calcium in amounts ranging from 50 to 50,000 ppm, 50 to 40,000 ppm, 50 to 20,000 ppm, 100 to 10,000 ppm, 200 to 5000 ppm, or 400 to 1000 ppm. In some embodiments, the aqueous solution of divalent cations comprises magnesium in amounts ranging from 50 to 40,000 ppm, 50 to 20,000 ppm, 100 to 10,000 ppm, 200 to 10,000 ppm, 500 to 5000 ppm, or 500 to 2500 ppm. In some embodiments, where $Ca^{2+}$ and $Mg^{2+}$ are both present, the ratio of $Ca^{2+}$ to $Mg^{2+}$ (i.e., $Ca^{2+}:Mg^{2+}$) in the aqueous solution of divalent cations is 1:1 to 1:2.5; 1:2.5 to 1:5; 1:5 to 1:10; 1:10 to 1:25; 1:25 to 1:50; 1:50 to 1:100; 1:100 to 1:150; 1:150 to 1:200; 1:200 to 1:250; 1:250 to 1:500; or 1:500 to 1:1000. In some embodiments, the ratio of $Mg^{2+}$ to $Ca^{2+}$ (i.e., $Mg^{2+}:Ca^{2+}$) in the aqueous solution of divalent cations is 1:1 to 1:2.5; 1:2.5 to 1:5; 1:5 to 1:10; 1:10 to 1:25; 1:25 to 1:50; 1:50 to 1:100; 1:100 to 1:150; 1:150 to 1:200; 1:200 to 1:250; 1:250 to 1:500; or 1:500 to 1:1000.

The aqueous solution of divalent cations may comprise divalent cations derived from freshwater, brackish water, seawater, or brine (e.g., naturally occurring brines or anthropogenic brines such as geothermal plant wastewaters, desalination plant waste waters), as well as other salines having a salinity that is greater than that of freshwater, any of which may be naturally occurring or anthropogenic. Brackish water is water that is saltier than freshwater, but not as salty as seawater. Brackish water has a salinity ranging from about 0.5 to about 35 ppt (parts per thousand). Seawater is water from a sea, an ocean, or any other saline body of water that has a salinity ranging from about 35 to about 50 ppt. Brine is water saturated or nearly saturated with salt. Brine has a salinity that is about 50 ppt or greater. In some embodiments, the saltwater source from which divalent cations are derived is a naturally occurring source selected from a sea, an ocean, a lake, a swamp, an estuary, a lagoon, a surface brine, a deep brine, an alkaline lake, an inland sea, or the like. In some embodiments, the saltwater source from which the divalent cations are derived is an anthropogenic brine selected from a geothermal plant wastewater or a desalination wastewater.

Freshwater is often a convenient source of divalent cations (e.g., cations of alkaline earth metals such as $Ca^{2+}$ and $Mg^{2+}$). Any of a number of suitable freshwater sources may be used, including freshwater sources ranging from sources relatively free of minerals to sources relatively rich in minerals. Mineral-rich freshwater sources may be naturally occurring, including any of a number of hard water sources, lakes, or inland seas. Some mineral-rich freshwater sources such as alkaline lakes or inland seas (e.g., Lake Van in Turkey) also provide a source of pH-modifying agents. Mineral-rich freshwater sources may also be anthropogenic. For example, a mineral-poor (soft) water may be contacted with a source of divalent cations such as alkaline earth metal cations (e.g., $Ca^{2+}$, $Mg^{2+}$, etc.) to produce a mineral-rich water that is suitable for methods and systems described herein. Divalent cations or precursors thereof (e.g. salts, minerals) may be added to freshwater (or any other type of water described herein) using any convenient protocol (e.g., addition of solids, suspensions, or solutions). In some embodiments, divalent cations selected from $Ca^{2+}$ and $Mg^{2+}$ are added to freshwater. In some embodiments, monovalent cations selected from $Na^+$ and $K^+$ are added to freshwater. In some embodiments, freshwater comprising $Ca^{2+}$ is combined with magnesium silicates (e.g., olivine or serpentine), or products or processed forms thereof, yielding a solution comprising calcium and magnesium cations.

Many minerals provide sources of divalent cations and, in addition, some minerals are sources of base. Mafic and ultramafic minerals such as olivine, serpentine, and any other suitable mineral may be dissolved using any convenient protocol. Other minerals such as wollastonite may also be used. Dissolution may be accelerated by increasing surface area, such as by milling by conventional means or by, for example, jet milling, as well as by use of, for example, ultrasonic techniques. In addition, mineral dissolution may be accelerated by exposure to acid or base. Metal silicates (e.g., magnesium silicates) and other minerals comprising cations of interest may be dissolved, for example, in acid such as HCl (optionally from an electrochemical process) to produce, for example, magnesium and other metal cations for use in precipitation material. In some embodiments, magnesium silicates and other minerals may be digested or dissolved in an aqueous solution that has become acidic due to the addition of carbon dioxide and other components of waste gas (e.g., combustion gas). Alternatively, other metal species such as metal hydroxide (e.g., Mg(OH)2, Ca(OH)2) may be made available for use by dissolution of one or more metal silicates (e.g., olivine and serpentine) with aqueous alkali hydroxide (e.g., NaOH) or any other suitable caustic material. Any suitable concentration of aqueous alkali hydroxide or other caustic material may be used to decompose metal silicates, including highly concentrated and very dilute solutions. The concentration (by weight) of an alkali hydroxide (e.g., NaOH) in solution may be, for example, from 30% to 80% and from 70% to 20% water. Advantageously, metal silicates and the like digested with aqueous alkali hydroxide may be used directly to produce precipitation material. In addition, base value from the precipitation reaction mixture may be recovered and reused to digest additional metal silicates and the like.

In some embodiments, an aqueous solution of divalent cations may be obtained from an industrial plant that is also providing a combustion gas stream. For example, in water-cooled industrial plants, such as seawater-cooled industrial plants, water that has been used by an industrial plant for cooling may then be used as water for producing precipitation material. If desired, the water may be cooled prior to entering the precipitation system. Such approaches may be employed, for example, with once-through cooling systems. For example, a city or agricultural water supply may be employed as a once-through cooling system for an industrial plant. Water from the industrial plant may then be employed for producing precipitation material, wherein output water has a reduced hardness and greater purity. If desired, such systems may be modified to include security measures (e.g., to detect tampering such as addition of poisons) and coordinated with governmental agencies (e.g., Homeland Security or other agencies). Additional tampering or attack safeguards may be employed in such embodiments.

Proton-Removing Agents and Methods

As disclosed above, waste sources of metal oxides such as combustion ash (e.g., fly ash, bottom ash, boiler slag), cement kiln dust, and slag (e.g. iron slag, phosphorous slag), each of which is described in more detail in a respective section below, may be the sole source of proton-removing agents for preparation of the compositions described herein; however, waste sources such as ash, cement kiln dust, slag (e.g. iron slag, phosphorous slag) may also be used in combination with supplemental sources of proton-removing agents (and methods for effecting proton removal) as described in this section.

Methods of the invention include contacting a volume of an aqueous solution of divalent cations with a source of CO2 (to dissolve CO2) and subjecting the resultant solution to precipitation conditions. The dissolution of CO2 into the aqueous solution of divalent cations produces carbonic acid, a species in equilibrium with both bicarbonate and carbonate. In order to produce carbonate-containing precipitation material, protons are removed from various species (e.g. carbonic acid, bicarbonate, hydronium, etc.) in the divalent cation-containing solution to shift the equilibrium toward carbonate. As protons are removed, more CO2 goes into solution. In some embodiments, proton-removing agents and/or methods are used while contacting a divalent cation-containing aqueous solution with CO2 to increase CO2 absorption in one phase of the precipitation reaction, where the pH may remain constant, increase, or even decrease, followed by a rapid removal of protons (e.g., by addition of a base) to cause rapid precipitation of carbonate-containing precipitation material. Protons may be removed from the various species (e.g. carbonic acid, bicarbonate, hydronium, etc.) by any convenient approach, including, but not limited to use of naturally occurring proton-removing agents, use of microorganisms and fungi, use of synthetic chemical proton-removing agents, recovery of man-made waste streams, and using electrochemical means.

Naturally occurring proton-removing agents encompass any proton-removing agents that can be found in the wider environment that may create or have a basic local environment. Some embodiments provide for naturally occurring proton-removing agents including minerals that create basic environments upon addition to solution (i.e., dissolution). Such minerals include, but are not limited to lime (CaO); periclase (MgO); volcanic ash; ultramafic rocks and minerals such as serpentine; and iron hydroxide minerals (e.g., goethite and limonite). Methods of dissolution of such rocks and minerals are provided herein. Some embodiments provide for using naturally alkaline bodies of water as naturally occurring proton-removing agents. Examples of naturally alkaline bodies of water include, but are not limited to surface water sources (e.g. alkaline lakes such as Mono Lake in California) and ground water sources (e.g. basic aquifers). Other embodiments provide for use of deposits from dried alkaline bodies of water such as the crust along Lake Natron in Africa's Great Rift Valley. In some embodiments, organisms that excrete basic molecules or solutions in their normal metabolism are used as proton-removing agents. Examples of such organisms are fungi that produce alkaline protease (e.g., the deep-sea fungus *Aspergillus ustus* with an optimal pH of 9) and bacteria that create alkaline molecules (e.g., cyanobacteria such as *Lyngbya* sp. from the Atlin wetland in British Columbia, which increases pH from a byproduct of photosynthesis). In some embodiments, organisms are used to produce proton-removing agents, wherein the organisms (e.g., *Bacillus* pasteurizing, which hydrolyzes urea to ammonia) metabolize a contaminant (e.g. urea) to produce proton-removing agents or solutions comprising proton-removing agents (e.g., ammonia, ammonium hydroxide). In some embodiments, organisms are cultured separately from the precipitation reaction mixture, wherein proton-removing agents or solution comprising proton-removing agents are used for addition to the precipitation reaction mixture. In some embodiments, carbonic anhydrase is used as a naturally occurring proton-removing agent for removing protons to invoke precipitation of precipitation material. Carbonic anhydrase, which is an enzyme produced by plants and animals, accelerates transformation of carbonic acid to bicarbonate in aqueous solution.

Chemical agents for effecting proton removal generally refer to synthetic chemical agents that are produced in large quantities and are commercially available. For example, chemical agents for removing protons include, but are not limited to, hydroxides, organic bases, super bases, oxides, ammonia, and carbonates. Hydroxides include chemical species that provide hydroxide anions in solution, including, for example, sodium hydroxide (NaOH), potassium hydroxide (KOH), calcium hydroxide (Ca(OH)2), or magnesium hydroxide (Mg(OH)2). Organic bases are carbon-containing molecules that are generally nitrogenous bases including primary amines such as methyl amine, secondary amines such as diisopropylamine, tertiary such as diisopropylethylamine, aromatic amines such as aniline, heteroaromatics such as pyridine, imidazole, and benzimidazole, and various forms thereof. In some embodiments, an organic base selected from pyridine, methylamine, imidazole, benzimidazole, histidine, and a phosphazene is used to remove protons from various species (e.g., carbonic acid, bicarbonate, hydronium, etc.) for precipitation of precipitation material. In some embodiments, ammonia is used to raise pH to a level sufficient to precipitate precipitation material from a solution of divalent cations and an industrial waste stream. Super bases suitable for use as proton-removing agents include sodium ethoxide, sodium amide (NaNH2), sodium hydride (NaH), butyl lithium, lithium diisopropylamide, lithium diethylamide, and lithium bis(trimethylsilyl)amide. Oxides including, for example, calcium oxide (CaO), magnesium oxide (MgO), strontium oxide (SrO), beryllium oxide (BeO), and barium oxide (BaO) are also suitable proton-removing agents that may be used. Carbonates for use in the invention include, but are not limited to, sodium carbonate.

In addition to comprising cations of interest and other suitable metal forms, waste streams from various industrial processes may provide proton-removing agents. Such waste streams include, but are not limited to, mining wastes; fossil fuel burning ash (e.g., fly ash, as described in further detail herein); slag (e.g. iron slag, phosphorous slag); cement kiln waste; oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge. Mining wastes include any wastes from the extraction of metal or another precious or useful mineral from the earth. In some embodiments, wastes from mining are used to modify pH, wherein the waste is selected from red mud from the Bayer aluminum extraction process; waste from magnesium extraction from sea water (e.g., Mg(OH)2 such as that found in Moss Landing, Calif.); and wastes from mining processes involving leaching. For example, red mud may be used to modify pH as described in U.S. Provisional Patent Application 61/161,369, filed 18 Mar. 2009, which is hereby incorporated by reference in its entirety. Agricultural waste, either through animal waste or excessive fertilizer use, may contain potassium hydroxide (KOH) or ammonia (NH3) or both. As such, agricultural waste may be used in some embodiments of the invention as a proton-removing agent. This agricultural waste is often collected in ponds, but it may also percolate down into aquifers, where it can be accessed and used.

Electrochemical methods are another means to remove protons from various species in a solution, either by removing protons from solute (e.g., deprotonation of carbonic acid or bicarbonate) or from solvent (e.g., deprotonation of hydronium or water). Deprotonation of solvent may result, for example, if proton production from CO2 dissolution matches or exceeds electrochemical proton removal from solute molecules. Alternatively, electrochemical methods may be used to produce caustic molecules (e.g., hydroxide) through, for example, the chlor-alkali process, or modification thereof. Electrodes (i.e., cathodes and anodes) may be present in the apparatus containing the divalent cation-containing aqueous solution or gaseous waste stream-charged (e.g., CO2-charged) solution, and a selective barrier, such as a membrane, may separate the electrodes. Electrochemical systems and methods for removing protons may produce by-products (e.g., hydrogen) that may be harvested and used for other purposes. Additional electrochemical approaches that may be used in systems and methods of the invention include, but are not limited to, those described in U.S. 61/081,299 and U.S. 61/091,729, the disclosures of which are herein incorporated by reference.

In some embodiments, low-voltage electrochemical methods are used to remove protons, for example, as CO2 is dissolved in the precipitation reaction mixture or a precursor solution to the precipitation reaction mixture. A precursor solution to the precipitation mixture, for example, may or may not contain divalent cations. In some embodiments, CO2 dissolved in an aqueous solution that does not contain divalent cations is treated by a low-voltage electrochemical method to remove protons from carbonic acid, bicarbonate, hydronium, or any species or combination thereof resulting from the dissolution of CO2. A low-voltage electrochemical method operates at an average voltage of 2, 1.9, 1.8, 1.7, or 1.6 V or less, such as 1.5, 1.4, 1.3, 1.2, 1.1 V or less, such as 1 V or less, such as 0.9 V or less, 0.8 V or less, 0.7 V or less, 0.6 V or less, 0.5 V or less, 0.4 V or less, 0.3 V or less, 0.2 V or less, or 0.1 V or less. Low-voltage electrochemical methods that do not generate chlorine gas are convenient for use in systems and methods of the invention. Low-voltage electrochemical methods to remove protons that do not generate oxygen gas are also convenient for use in systems and methods of the invention. In some embodiments, low-voltage electrochemical methods generate hydrogen gas at the cathode and transport it to the anode where the hydrogen gas is converted to protons. Electrochemical methods that do not generate hydrogen gas may also be convenient. In some instances, electrochemical methods to remove protons do not generate any gaseous by-byproduct. See, for example, U.S. patent application Ser. No. 12/344,019, filed Dec. 24, 2008, U.S. patent application Ser. No. 12/375,632, filed Dec. 23, 2008, PCT Application No. PCT/US08/088,242, filed Dec. 23, 2008, and PCT Application No. PCT/US09/32301, filed Jan. 28, 2009, all of which are hereby incorporated by reference in their entirety.

Combustion Ash, Cement Kiln Dust, and Slag

A waste source of metal oxides (e.g., combustion ashes such as fly ash, cement kiln dust, etc.) may be the sole sources of proton-removing agents for preparation of compositions described herein. In other words, a waste source of metal oxides such as combustion ash, cement kiln dust, or the like may provide the sole source of proton-removing agents used to modify the pH of the reaction mixture from which compositions of the invention are produced. As such, in some embodiments, the sole source of proton-removing agents is a combustion ash selected from fly ash, bottom ash, and boiler slag. In some embodiments, the sole source of proton-removing agent is cement kiln dust. In some embodiments, the sole source of proton-removing agent is slag (e.g. iron slag, phosphorous slag). Likewise, a waste source of metal oxides (e.g., combustion ashes such as fly ash, cement kiln dust, etc.) may be the sole source of divalent metal cations for preparation of compositions described herein. In other words, a waste source of metal oxides such as combustion ash, cement kiln dust, or the like may provide the sole source of divalent cations from which compositions of the invention are produced. As such, in some embodiments, the sole source of divalent cations is a combustion ash selected from fly ash, bottom ash, and boiler slag. In some embodiments, the sole source of divalent cations is cement kiln dust. In some embodiments, the sole source of divalent cations is slag (e.g. iron slag, phosphorous slag). A waste source of metal oxides (e.g., combustion ash such as fly ash, cement kiln dust, etc.), in some embodiments, provides the sole source of divalent cations and proton-removing agents for precipitation of precipitation material in accordance with the invention. For example, fly ash may provide both divalent cations and proton-removing agents for precipitation of precipitation material. In addition, combinations of waste sources of metal oxides and other sources of either divalent cations and/or proton-removing agent are discussed in further detail herein.

Carbon-based fuels such as coal generate combustion ash waste products such as fly ash, bottom ash, and boiler slag which are often land filled, or utilized in low-value applications as a means of disposal. These waste products often contain leachable pollutants, which can contaminate the groundwater when land filled. The American Coal Ash Association reports that more than 56% of the 165,000,000 tons of coal combustion products generated in the United States annually are simply sent to a landfill at substantial costs to coal-burning entities. Combustion ash resulting from burning fossil fuels (e.g., coal in coal-fired power plants) is often rich in CaO or other metal oxides that create a basic environment and provide divalent cations in solution. Combustion products from coal, wood, and other sources, including volcanic ash released in volcano eruptions, each of which is generally considered a combustion ash, may also contain various oxides such as silica (SiO2), alumina (Al2O3), and oxides of calcium, magnesium, iron, and the like, which may enhance certain chemical reactions and resultant cements. Coal ash (i.e., combustion ash resulting from burning coal) as employed in this invention refers to ash materials produced in power plant boilers or coal burning furnaces (e.g., chain grate boilers, dry-bottom pulverized coal boilers, slag-tap boilers, cyclone boilers, and fluidized bed boilers) from burning pulverized anthracite, lignite, bituminous, sub-bituminous, or brown coal. Such coal ash includes fly ash, which is the finely divided coal ash carried from the furnace by exhaust or flue gases; bottom ash, which collects at the base of the furnace as agglomerates (e.g., in a dry-bottom boiler); and boiler slag, which collects in the ash hopper of a wet-bottom boiler.

High-sulfur coals, which are abundant and relatively lower in cost than low-sulfur coals, generally require Flue Gas Desulfurization (FGD) to remove sulfur oxides ("SOx") from flue gas emissions. This process generally further releases CO2 into the atmosphere by utilizing limestone as a reactant to produce CaSO4 (gypsum). This process produces high calcium fly ash due to the calcium released from the limestone in the process, where the calcium is in the form of calcium oxide (CaO). Pretreatment of flue gas prior to atmospheric release in normal power plants or industrial coal-burning facilities may include processes such as electrostatic precipitation ("ESP"), wet or dry scrubbing, and a flue gas desulfurization ("FGD"). In many FGD processes, the flue gas, after undergoing ESP, is brought into an FGD absorber tank, where it is reacted with a limestone slurry to form CaSO4 and remove sulfur from the flue gas. Each molecule of CaSO4 formed in this manner releases a molecule of CO2, further exacerbating the high release of CO2 associated with burning of fossil fuels such as coal.

Fly ashes are generally highly heterogeneous, and include of a mixture of glassy particles with various identifiable crystalline phases such as quartz, mullite, hematite, magnetite, and various iron oxides in addition. Fly ashes of interest include Type F and Type C fly ash. The Type F and Type C fly ashes referred to above are defined by CSA Standard A23.5 and ASTM C618. The chief difference between these classes is the amount of calcium, silica, alumina, and iron content in the ash. The chemical properties of the fly ash are largely influenced by the chemical content of the coal burned (e.g., anthracite, bituminous, sub-bituminous, lignite, brown). The properties of the fly ash may also depend upon temperature history, the type of burner used, post-burn treatment, scrubber effects, and impounding time and conditions. Fly ashes of interest include substantial amounts of silica (silicon dioxide, $SiO_2$) (both amorphous and crystalline) and lime (calcium oxide, CaO, magnesium oxide, MgO). The outer surface of fly ash is generally rich in CaO and MgO with concentrations of CaO and MgO decreasing from the outer surface of fly ash toward the center. With the decrease in CaO and MgO, there is a concomitant increase in the concentration of $SiO_2$. High shear mixing and wet milling, which are used in some embodiments described below, allow for greater access to the entire CaO and MgO stock present in fly ash. Table 1 below provides the chemical makeup of various types of fly ash that find use in embodiments of the invention.

TABLE 1

Coal types and composition.

| Component | Bituminous | Sub-bituminous | Lignite | Brown |
| --- | --- | --- | --- | --- |
| $SiO_2$ (%) | 20-60 | 40-60 | 15-45 | 5-30 |
| $Al_2O_3$ (%) | 5-35 | 20-30 | 20-25 | 1-20 |
| $Fe_2O_3$ (%) | 10-40 | 4-10 | 4-15 | 5-50 |
| CaO (%) | 1-12 | 5-30 | 15-40 | 5-30 |
| MgO (%) | 1-5 | 1-10 | 1-10 | 5-30 |

The burning of harder, older anthracite and bituminous coal typically produces Class F fly ash. Class F fly ash is pozzolanic in nature (i.e., in the presence of moisture, finely divided silica or aluminosilicates react with $Ca(OH)_2$ to form compounds having cementitious properties, wherein the silica or aluminosilicates alone have little to no cementitious properties), and contains less than 10% lime (CaO). Fly ash produced from the burning of younger lignite or sub-bituminous coal, in addition to having pozzolanic properties, also has some self-cementing properties. In the presence of water, Class C fly ash will harden and gain strength over time. Class C fly ash generally contains more than 20% lime (CaO). Alkali and sulfate (SO4) contents are generally higher in Class C fly ashes.

Fly ash material solidifies while suspended in exhaust gases and is collected using various approaches, for example, by electrostatic precipitators or filter bags. Since the particles solidify while suspended in the exhaust gases, fly ash particles are generally spherical in shape and range in size from 0.5 µm to 100 µm. Fly ashes of interest include those in which at least about 80%, by weight comprises particles of less than 45 microns.

Also of interest in certain embodiments of the invention is the use of highly alkaline fluidized bed combustor (FBC) fly ash.

Also of interest in embodiments of the invention is the use of bottom ash. Bottom ash is formed as agglomerates in coal combustion boilers from the combustion of coal. The agglomerates have a size in which 90% of the agglomerates fall within the particle size range of 0.1 mm to 20 mm, and where the bottom ash agglomerates have a wide distribution of agglomerate size within this range. Combustion boilers may be wet bottom boilers or dry bottom boilers. When produced in a wet-bottom boiler, the bottom ash is quenched with water producing boiler slag. The main chemical components of a bottom ash are silica and alumina with lesser amounts of oxides of Fe, Ca, Mg, Mn, Na and K, as well as sulfur and carbon.

Also of interest in certain embodiments is the use of volcanic ash as the ash. Volcanic ash is made up of small tephra, (i.e., bits of pulverized rock and glass created by volcanic eruptions) less than 2 millimeters (0.079 in) in diameter.

Cement kiln dust is also useful as a waste source of metal oxides, providing, for example, CaO and MgO that may be used as both a divalent cation source and as a proton-removing agent source.

Cement kiln dust, which is a fine by-product of cement production captured in a dust collection system (e.g., cyclones, electrostatic precipitators, bughouses, etc.), may be classified into one of four categories, each of which is suitable for use as a waste source of metal oxides for the invention. The four categories are based upon two different cement kiln processes and two different dust collection processes. With this in mind, cement kiln dust from wet-process kiln processes, which accept feed materials in a slurry form, and dry-process kiln processes, which accept feed materials in a dry, ground form are suitable for use in the invention. In each type of kiln, the dust may be collected in two ways: a portion of the dust may be separated and returned to the kiln from the dust collection system (e.g., cyclone) closest to the kiln, or the total quantity of dust produced may be recycled or discarded. Cement kiln dust obtained from either type of collection system is suitable for use in the invention.

The chemical and physical characteristics of cement kiln dust greatly depend upon the dust collection method employed at the cement production facility. Chemically, cement kiln dust has a composition similar to conventional Portland cement. The principal constituents of cement kiln dust are compounds of lime, iron, silica, and alumina. The concentration of free lime in cement kiln dust is highest in coarser particles captured closest to the kiln. As such, coarser particles with higher concentrations of free lime are particularly suited for methods and systems of the invention; however, finer particles of cement kiln dust, which tend to exhibit a higher concentration of sulfates and/or alkalis are also suited for the invention as finer particles also contain useful concentrations of, for example, CaO. In systems in which coarser particles of cement kiln dust are not separated out and returned to the kiln, the total dust will be higher in free lime (since it will contain some coarse particles). This cement kiln dust may also be used as a waste source of metal oxides, providing divalent cations and proton-removing agents. As evidenced by Table 2 (Collins, R. J. and J. J. Emery. Kiln Dust-Fly Ash Systems for Highway Bases and Subbases. Federal Highway Administration, Report No. FHWA/RD-82/167, Washington, D.C., September, 1983.), which lists typical compositions for fresh and stockpiled cement kiln dust, there is very little, if any, free lime or free magnesia content in cement kiln dust that has been stockpiled and exposed to the environment for long periods. As such, cement kiln dust that is fresh is preferred over cement kiln dust that has been stockpiled for any significant length of time in the environment.

TABLE 2

Typical chemical compositions of cement kiln dust.

| Chemical Species | Fresh (%) | Stockpiled (%) | |
|---|---|---|---|
| | | Sample 1 | Sample 2 |
| CaO | 40.5 | 31.4 | 44.2 |
| Free Lime | 4.4 | 0.0 | 0.0 |
| SiO2 | 14.5 | 11.7 | 11.9 |
| Al2O3 | 4.10 | 3.18 | 3.24 |
| MgO | 1.55 | 0.97 | 1.73 |
| Na2O | 0.44 | 0.13 | 0.27 |
| K2O | 4.66 | 1.65 | 2.92 |
| Fe2O3 | 2.00 | 2.16 | 1.45 |
| SO$_3$ | 6.50 | 8.24 | 2.40 |
| Loss On Ignition, 105° C. | 22.9 | 40.4 | 30.2 |

Slag may also be employed as a proton-removing agent (as well as a source divalent cations) to increase the pH of, for example, precipitation reaction mixture charged with CO2. Slag may be used as a sole proton-removing agent or in conjunction with one or more additional proton-removing agents (e.g., other waste sources of metal oxides, supplemental proton-removing agents described above, etc). Likewise, slag may be used as a sole source of divalent cations or in conjunction with one or more additional sources of divalent cations (e.g., other waste sources of metal oxides, supplemental sources of divalent cations described above, etc). Slag is generated from the processing of metal ore (i.e., smelting metal ors to purify metals), and may contain calcium and magnesium oxides as well as iron, silicon, and aluminum compounds. In some embodiments, the use of slag as a proton-removing agent or divalent cation source provides additional benefits through the introduction of reactive silicon and alumina to the precipitated product. Slags that may be suitable for the invention include, but are not limited to, blast furnace slag from iron smelting, slag from electric-arc or blast furnace processing of steel, copper slag, nickel slag, and phosphorus slag.

Additives

Additives other than proton-removing agents may be added to the precipitation reaction mixture in order to influence the nature of the precipitation material that is produced. As such, in some embodiments, an additive is provided to the precipitation reaction mixture before or during the time when the precipitation reaction mixture is subjected to the precipitation conditions. Certain calcium carbonate polymorphs are favored by trace amounts of certain additives. For example, vaterite, a highly unstable polymorph of CaCO3, which precipitates in a variety of different morphologies and rapidly converts to calcite, may be obtained in very high yields by including trace amounts of lanthanum as, for example, lanthanum chloride. Other transition metals and the like may be added to produce calcium carbonate polymorphs. For instance, the addition of ferrous or ferric iron is known to favor the formation of disordered dolomite (protodolomite).

Methods

Methods and systems of the invention provide carbonate-containing compositions that may be prepared from an aqueous solution comprising dissolved carbon dioxide (e.g., form an industrial waste stream comprising CO2), divalent cations (e.g., $Ca^{2+}$, $Mg^{2+}$), and proton-removing agents (or methods of effecting proton removal) as described in more detail below.

A waste source of metal oxides such as combustion ash (e.g., fly ash, bottom ash, boiler slag), cement kiln dust, or slag (e.g. iron slag, phosphorous slag) may be the sole source of divalent metal cations for preparation of the compositions described herein. As such, in some embodiments, the sole source of divalent metal cations is a combustion ash selected from fly ash, bottom ash, and boiler slag. In some embodiments, the sole source of divalent metal cations is cement kiln dust. In some embodiments, the sole source of divalent metal cations is slag (e.g. iron slag, phosphorous slag). A waste source of metal oxides such as combustion ash (e.g., fly ash, bottom ash, boiler slag), cement kiln dust, or slag (e.g. iron slag, phosphorous slag) may also be the sole source of proton-removing agents for preparation of the compositions described herein. As such, in some embodiments, the sole source of proton-removing agents is a combustion ash selected from fly ash, bottom ash, and boiler slag. In some embodiments the sole source of proton-removing agents is cement kiln dust. In some embodiments, the sole source of proton-removing agents is slag (e.g. iron slag, phosphorous slag). In some embodiments, mineral content in water is achieved by enriching the water source with divalent cations by adding a waste source of metal oxides such as combustion ash (e.g., fly ash, bottom ash, boiler slag), cement kiln dust, or slag (e.g. iron slag, phosphorous slag) to fresh or distilled water, wherein the fresh or distilled water have low or no mineral content. In these embodiments, the waste source of metal oxides provides not only divalent cations, but also a source proton-removing agents.

In some embodiments, a waste source of metal oxides provides a portion of the proton-removing agents, such as 10% or less, 20% or less, 40% or less, 60% or less, 80% or less, with the remaining portion of proton-removing agents (or methods of effecting proton removal) provided as described herein.

Water may be contacted with a waste source of metal oxides such as combustion ash (e.g., fly ash) or cement kiln dust to achieve a desired pH (by means of proton-removing agent addition) or divalent cation concentration using any convenient protocol. In some embodiments, flue gas from a coal-fired power plant is passed directly into a precipitation reactor without prior removal of the fly ash, obviating the use of electrostatic precipitators and the like. In some embodiments, cement kiln dust is provided to a precipitation reactor directly from the cement kiln. In some embodiments, previously collected fly ash may be placed in a precipitation reactor holding water, wherein the amount of fly ash added is sufficient to raise the pH to a desired level (e.g., a pH that induces precipitation of carbonate-containing precipitation material) such as pH 7-14, pH 8-14, pH 9-14, pH 10-14, pH 11-14, pH 12-14, or pH 13-14. The pH of fly ash-water mixtures, for example, may be about pH 12.2-12.4. The pH of cement kiln dust-water mixtures may be about pH 12 as well. In some embodiments, the waste source of metal oxides is immobilized in a column or bed. In such embodiments, water is passed through or over an amount of the ash sufficient to raise the pH of the water to a desired pH or to a particular divalent cation concentration. Immobilized waste sources of metal oxides (e.g., fly ash) are useful in mitigating passivation of fly ash (i.e., encapsulation of fly ash by, for example, CaCO3 as CaCO3 forms under precipitation conditions); however, in some embodiments, passivation of fly ash is desirable as precipitation material comprising passivated fly ash has a reduced pozzolanic reactivity (i.e., reaction of silica and/or aluminosilica with Ca(OH)2), which may allow for additional uses in which less reactivity is desired. As both cement kiln dust and combustion ashes such as fly ash comprise significant base value, they are considered to be fairly caustic. Additional base and or divalent cation value may be obtained from waste source-water mixtures by removing the base and/or divalent cation value. For example, the waste source-water mixture may be contacted with a CO2 source (which forms carbonic acid in solution) to form precipitation material comprising calcium carbonates, the formation of which allows for additional conversion of CaO into Ca(OH)2 and additional divalent cations. Likewise, the waste source-water mixture may be contacted with aqueous acids such as, but not limited to, HNO3, HCl, and HF. Acid digestion of fly ash with acids such as HNO3 and HCl allows greater access (70% or more) to CaO and MgO present in the fly ash. Acid digestion with aqueous HF allows for greater access to CaO and MgO through reaction with silica and dissolution of the resultant species. Reaction time and acid strength may be varied to increase or decrease the amount of CaO and/or MgO is leached from fly ash.

A waste source of metal oxides such as fly ash or cement kiln dust may also be slaked (i.e., conversion of CaO to Ca(OH)2, MgO to Mg(OH)2, etc.) in some embodiments. Any convenient system or method may be used to effect slaking of combustion ashes (e.g., fly ash, bottom ash) or cement kiln dust. Slaking waste sources of metal oxides may be achieved with, for example, a slurry detention slacker, a paste slaker, a ball mill slaker, or any combinations or variations thereof, the choice of slaking apparatus depending upon the waste source of metal oxides to be slaked, availability of water, space requirements, etc. For example, if space is limited and water for slaking is in limited supply, a compact paste slaker may be convenient for use in systems and methods of the invention. In some embodiments, a ball mill slaker is used. Slaking efficiency, depending on the waste source of metal oxides, may be affected by factors including the type of limestone used for calcination, the particular calcination process (e.g., temperature history, type of burner used, post-burn treatment, scrubber effects, impounding time and conditions, etc.), the slaking temperature, the waste source to water ratio, the degree of agitation during slaking, the slurry viscosity, the slaking time, and the water temperature (prior to mixing with the waste source of metal oxide). The type of water may also have an effect on slaking efficiency. For example, freshwater, which generally has a lower concentration of divalent cations than in seawater, may be far more efficient at extracting CaO and MgO from fly ash; however, the type of water will generally depend on availability at the precipitation plant location. As such, methods of the invention include modification of these factors for timely slaking (i.e., slaking on a timescale which allows for an efficient industrial process). Slaking temperature, for example, may be modified. In some embodiments, the slaking temperature ranges from room temperature (about 70° F.) to about 220° F. In some embodiments, the slaking temperature is 70-100° F., 100-220° F., 120-220° F., 140-220° F., 160-220° F., 160-200° F., or 160-185° F. Should auxiliary heat be needed to increase slaking temperature (beyond that resulting from the exothermic conversion of CaO to Ca(OH)2), waste heat from, for example, flue gas may be used. Other external sources of heat (e.g., heated water) may be used as well. Should slaking temperature need to be decreased due to highly reactive waste sources of metal oxides (i.e., fly ash or cement kiln dust comprising high concentrations, for example, CaO), the heat may be used to, for example, heat an air stream for use in drying precipitation material. Slaking pressure, for example, may be modified. In some embodiments, the slaking pressure is normal atmospheric pressure (about 1 bar) to about 50 bar. In some embodiments, the slaking pressure is 1-2.5 bar, 1-5 bar, 1-10 bar, 10-50 bar, 20-50 bar, 30-50 bar, or 40-50 bar. In some embodiments, slaking is performed under ambient conditions (i.e., normal atmospheric temperature and pressure). Water to waste source ratio may be modified. In some embodiments, the ratio of water to the waste source of metal oxides is 1:1 to 1:1.5; 1:1.5 to 1:2; 1:2 to 1:2.5; 1:2.5 to 1:3; 1:3 to 1:3.5; 1:3.5 to 1:4; 1:4 to 1:4.5; 1:4.5 to 1:5; 1:5 to 1:6; 1:6 to 1:8; 1:8 to 1:10; 1:10 to 1:25; 1:25 to 1:50; or 1:50 to 1:100. Waste source to water ratio may also be modified. In some embodiments, the ratio of the waste source of metal oxides to water is 1:1 to 1:1.5; 1:1.5 to 1:2; 1:2 to 1:2.5; 1:2.5 to 1:3; 1:3 to 1:3.5; 1:3.5 to 1:4; 1:4 to 1:4.5; 1:4.5 to 1:5; 1:5 to 1:6; 1:6 to 1:8; 1:8 to 1:10; 1:10 to 1:25; 1:25 to 1:50; or 1:50 to 1:100. In some embodiments, where a waste source of metal oxides such as fly ash is directly provided to a precipitation reactor, the waste source to water ratio may be quite low. In such embodiments, additional waste source (e.g., fly ash) may be added to the precipitation reactor to increase the waste source to water ratio or slaking may be performed with the low ratio of waste source to water. Slaking time may also be modified as it has an effect on slaking efficiency. In some embodiments, the slaking time required to complete hydration (e.g., formation of Ca(OH)2 from CaO) is between 12 and 20 hours, between 20 and 30 hours, between 30 and 40 hours, between 40 and 60 hours, between 60 and 100 hours, between 100 and 160, between 100 and 180, and between 180 and 200 hours. In some embodiments, the slaking time required to complete hydration is less than 12 hours, between 6 and 12 hours, between 3 and 6 hours, between 1 and 3 hours, or less than 1 hour. In some embodiments, the slaking time required to complete hydration is between 30 minutes and 1 hour. In some embodiments, the slaking time is between 15 and 30 minutes, 15 and 25 minutes, and 15 and 20 minutes. In some embodiments, the slaking time is between 5 and 30 minutes, 5 and 20 minutes, 5 and 15 minutes, and 5 and 10 minutes. In some embodiments, the slaking time is between 1 and 5 minutes, 1 and 3 minutes, and 2 and 3 minutes. Agitation may also be used to effect slaking efficiency, for example, by eliminating hot and cold spots. In addition, pretreatment of the waste source of metal oxides may be used to effect slaking efficiency. For example, fly ash may be jet milled or ball milled before slaking. It will be recognized that changing any one of the described slaking factors may change additional slaking factors such that each slaking procedure, depending upon available materials, will be different. As such, slaking in accordance with the invention may result in more than 10%, more than 20%, more than 30%, more than 40%, more than 50%, more than 60%, more than 70%, more than 80%, more than 90%, more than 95%, more than 97%, more than 98%, more than 99%, or more than 99.9% conversion of CaO present in the waste source to Ca(OH)2. Likewise, slaking in accordance with the invention may result in more than 10%, more than 20%, more than 30%, more than 40%, more than 50%, more than 60%, more than 70%, more than 80%, more than 90%, more than 95%, more than 97%, more than 98%, more than 99%, or more than 99.9% conversion of MgO present in the waste source to Mg(OH)2. The higher the conversion, the higher the efficiency of the slaking process.

A waste source of metal oxides such as combustion ash, cement kiln dust, or slag (e.g. iron slag, phosphorous slag), may also be used in combination with supplemental sources of divalent cations, including mixtures of combustion ash, cement kiln dust, or slag (e.g. iron slag, phosphorous slag). As such, in some embodiments, the source of divalent cations is a combination of a divalent cation source and a combustion ash selected from fly ash, bottom, ash, and boiler slag. For example, the source of divalent cations may be a combination of fly ash and seawater. When a combination (e.g., combustion ash in combination with another source of divalent cations) is used, the combustion ash may be used in any order. For example, a basic solution may already contain divalent cations (e.g., seawater) before adding a combustion ash, or a source of divalent cations may be added to a slurry of fly ash in water. In any of these embodiments, as described in further detail below, CO2 is added before or after combustion ash.

A waste source such as combustion ash, cement kiln dust, or slag (e.g. iron slag, phosphorous slag), may be used in combination with supplemental sources of proton-removing agents, including mixtures of combustion ash, cement kiln dust, or slag (e.g. iron slag, phosphorous slag). As such, in some embodiments, the source of proton-removing agents is a combination of a proton-removing agent and a combustion ash selected from fly ash, bottom ash, and boiler slag. Examples of proton-removing agents that may be used include oxides (e.g., CaO), hydroxides (e.g., KOH, NaOH, brucite (Mg(OH)2, etc.), carbonates (e.g., Na2CO3), serpentine, and the like. Serpentine, which also releases silica and magnesium into the reaction mixture, ultimately leads to compositions comprising carbonates and silica (in addition to that found in combustion ashes). The amount of supplemental proton-removing agent that is used depends upon the particular nature of the supplemental proton-removing agent and the volume of water to which the supplemental proton-removing agent is being added. An alternative to supplemental proton-removing agents is use of electrochemical methods such as those described above to effect proton removal. Electrolysis may also be employed. Different electrolysis processes may be used, including the Castner-Kellner process, the diaphragm cell process, and the membrane cell process. By-products of the hydrolysis product (e.g., H2, sodium metal) may be collected and employed for other purposes. When a combination of proton removing agents (e.g., combustion ash in combination with another proton-removing agent source) is used, the combustion ash may be used in any order. For example, a divalent cation-containing solution may already be basic (e.g., seawater) before adding a combustion ash, or a slurry of fly ash in water may be further basicified through addition of an additional proton-removing agent. In any of these embodiments, as described in more detail below, CO2 is added before or after combustion ash.

As described above, waste sources of metal oxides such as combustion ash, cement kiln ash, and slag (e.g. iron slag, phosphorous slag) may be used in various combinations, both with and without supplemental proton-removing agents. When supplemental proton-removing agents (and methods effecting proton removal) are used, the supplemental proton-removing agents too may be used in any suitable combination. Some embodiments of the invention provide for combinations including use of anthropogenic waste (e.g., red mud or brown mud from bauxite processing) in combination with commercially available base (e.g., NaOH); anthropogenic waste in combination with electrochemical methods (i.e., deprotonation of carbonic acid, bicarbonate, hydronium, etc.) and naturally occurring proton-removing agents (e.g. serpentine minerals); or anthropogenic waste in combination with commercially available base and naturally occurring proton-removing, followed by a transition to serpentine minerals combined with electrochemical methods. The proportion of the various methods for effecting proton removal may be adjusted according to conditions and availability, for example, anthropogenic waste may be used in combination with commercially available base and naturally occurring proton-removing agents for the first five years of a precipitation plant's life-time, followed by a transition to serpentine minerals combined with electrochemical methods for removing protons as these become more available.

In some embodiments, proton-removing agents (and methods for effecting proton removal) are combined such that 1-30% of the proton-removing agent is sourced from fly ash, 20-80% of the proton-removing agent is sourced from waste (e.g. red mud), minerals such as serpentine, or a combination thereof, and 10-50% of proton removal is effected through electrochemical methods. For example, some embodiments provide for a combination of proton-removing agents and electrochemical methods such that 10% of the proton-removing agent is sourced from fly ash, 60% of the proton-removing agent is sourced from waste from a mining process (e.g. red mud), and 30% of the proton removal is effected by electrochemical methods. Some embodiments provide for a combination of proton-removing agents and electrochemical methods such that 10% of the proton-removing agent is sourced from fly ash, 60% of the proton-removing agent is from sourced from naturally occurring mineral sources (e.g. dissolved serpentine), and 30% of the proton removal is effected by electrochemical methods. Some embodiments provide for a combination of proton-removing agents and electrochemical methods such that 30% of the proton-removing agent is sourced from fly ash and 70% of the proton-removing agent is sourced from waste from a mining process (e.g. red mud) for the first five years of a precipitations plant's life-time, and from the beginning of the sixth year onward, such that 10% of the proton-removing agent is sourced from fly ash, 60% of the proton-removing agent is the result of the dissolution of a naturally occurring mineral source (e.g. serpentine), and 30% of proton removal is effected by electrochemical methods.

An aqueous solution comprising divalent cations (e.g., alkaline earth metal cations such as $Ca^{2+}$ and $Mg^{2+}$) may be contacted with a source of CO2 at any time before, during, or after the divalent-cation containing solution is subjected to precipitation conditions (i.e., conditions allowing for precipitation of one or more materials based on, for example, pH). Accordingly, in some embodiments, an aqueous solution of divalent cations is contacted with a source of CO2 prior to subjecting the aqueous solution to precipitation conditions that favor formation of carbonate and/or bicarbonate compounds. In some embodiments, an aqueous solution of divalent cations is contacted with a source of CO2 while the aqueous solution is being subjected to precipitation conditions that favor formation of carbonate and/or bicarbonate compounds. In some embodiments, an aqueous solution of divalent cations is contacted with a source of a CO2 prior to and while subjecting the aqueous solution to precipitation conditions that favor formation carbonate and/or bicarbonate compounds. In some embodiments, an aqueous solution of divalent cations is contacted with a source of CO2 after subjecting the aqueous solution to precipitation conditions that favor formation of carbonate and/or bicarbonate compounds. In some embodiments, an aqueous solution of divalent cations is contacted with a source of CO2 before, while, and after subjecting the aqueous solution to precipitation conditions that favor formation of carbonate and/or bicarbonate compounds. In some embodiments, a divalent cation-containing aqueous solution may be cycled more than once, wherein a first cycle of precipitation removes primarily calcium carbonate and magnesium carbonate minerals and leaves an alkaline solution to which additional divalent cations may be added. Carbon dioxide, when contacted with the recycled solution of divalent cations, allows for the precipitation of more carbonate and/or bicarbonate compounds. It will be appreciated that, in these embodiments, the aqueous solution following the first cycle of precipitation may be contacted with the CO2 source before, during, and/or after divalent cations have been added. In some embodiments, an aqueous solution having no divalent cations or a low concentration of divalent cations is contacted with CO2. In these embodiments, the water may be recycled or newly introduced. As such, the order of addition of CO2 and waste sources of metal oxides may vary. For example, a waste source of metal oxides such as fly ash, cement kiln dust, or slag, each of which provides divalent cations, proton-removing agents, or both, may be added to, for example, brine, seawater, or freshwater, followed by the addition of CO2. In another example, CO2 may be added to, for example, brine, seawater, or freshwater, followed by the addition of fly ash, cement kiln dust, or slag.

A divalent cation-containing aqueous solution may be contacted with a CO2 source using any convenient protocol. Where the CO2 is a gas, contact protocols of interest include, but are not limited to direct contacting protocols (e.g., bubbling the CO2 gas through the aqueous solution), concurrent contacting means (i.e., contact between unidirectional flowing gaseous and liquid phase streams), countercurrent means (i.e., contact between oppositely flowing gaseous and liquid phase streams), and the like. As such, contact may be accomplished through use of infusers, bubblers, fluidic Venturi reactors, spargers, gas filters, sprays, trays, or packed column reactors, and the like, as may be convenient. In some embodiments, gas-liquid contact is accomplished by forming a liquid sheet of solution with a flat jet nozzle, wherein the CO2 gas and the liquid sheet move in countercurrent, co-current, or crosscurrent directions, or in any other suitable manner. See, for example, U.S. Patent Application No. 61/158,992, filed 10 Mar. 2009, which is hereby incorporated by reference in its entirety. In some embodiments, gas-liquid contact is accomplished by contacting liquid droplets of solution having an average diameter of 500 micrometers or less, such as 100 micrometers or less, with a CO2 gas source. In some embodiments, a catalyst is used to accelerate the dissolution of carbon dioxide into solution by accelerating the reaction toward equilibrium; the catalyst may be an inorganic substance such as zinc dichloride or cadmium, or an organic substance such as an enzyme (e.g., carbonic anhydrase).

In methods of the invention, a volume of CO2 charged water produced as described above is subjected to carbonate compound precipitation conditions sufficient to produce a carbonate-containing precipitation material and a supernatant (i.e., the part of the precipitation reaction mixture that is left over after precipitation of the precipitation material). Any convenient precipitation conditions may be employed, which conditions result in production of a carbonate-containing precipitation material from the CO2-charged precipitation reaction mixture. Precipitation conditions include those that modulate the physical environment of the CO2 charged precipitation reaction mixture to produce the desired precipitation material. For example, the temperature of the CO2-charged precipitation reaction mixture may be raised to a point at which an amount suitable for precipitation of the desired carbonate-containing precipitation material occurs. In such embodiments, the temperature of the CO2 charged precipitation reaction mixture may be raised to a value from 5° C. to 70° C., such as from 20° C. to 50° C., and including from 25° C. to 45° C. While a given set of precipitation conditions may have a temperature ranging from 0° C. to 100° C., the temperature may be raised in certain embodiments to produce the desired precipitation material. In certain embodiments, the temperature of the precipitation reaction mixture is raised using energy generated from low or zero carbon dioxide emission sources (e.g., solar energy source, wind energy source, hydroelectric energy source, waste heat from the flue gases of the carbon emitter, etc). In some embodiments, the temperature of the precipitation reaction mixture may be raised utilizing heat from flue gases from coal or other fuel combustion. The pH of the CO2-charged precipitation reaction mixture may also be raised to an amount suitable for precipitation of the desired carbonate-containing precipitation material. In such embodiments, the pH of the CO2-charged precipitation reaction mixture is raised to alkaline levels for precipitation, wherein carbonate is favored over bicarbonate. The pH may be raised to pH 9 or higher, such as pH 10 or higher, including pH 11 or higher. For example, when fly ash is used to raise the pH of the precipitation reaction mixture or precursor of the precipitation reaction mixture, the pH may be about pH 12.5 or higher.

Accordingly, a set of precipitation conditions to produce a desired precipitation material from a precipitation reaction mixture may include, as above, the temperature and pH, as well as, in some instances, the concentrations of additives and ionic species in the water. Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare carbonate-containing precipitation material according to the invention (from start [e.g., fly ash slaking] to finish [e.g., drying precipitation material or forming precipitation material into aggregate]) may be batch, semi-batch, or continuous protocols. It will be appreciated that precipitation conditions may be different to produce a given precipitation material in a continuous flow system compared to a semi-batch or batch system.

Carbonate-containing precipitation material, following production from a precipitation reaction mixture, is separated from the reaction mixture to produce separated precipitation material (e.g., wet cake) and a supernatant as illustrated in FIG. 1. The precipitation material may be stored in the supernatant for a period of time following precipitation and prior to separation (e.g., by drying). For example, the precipitation material may be stored in the supernatant for a period of time ranging from 1 to 1000 days or longer, such as 1 to 10 days or longer, at a temperature ranging from 1° C. to 40° C., such as 20° C. to 25° C. Separation of the precipitation material from the precipitation reaction mixture is achieved using any of a number of convenient approaches, including draining (e.g., gravitational sedimentation of the precipitation material followed by draining), decanting, filtering (e.g., gravity filtration, vacuum filtration, filtration using forced air), centrifuging, pressing, or any combination thereof. Separation of bulk water from the precipitation material produces a wet cake of precipitation material, or a dewatered precipitation material. As detailed in U.S. 61/170,086, filed Apr. 16, 2009, which is herein incorporate by reference, a liquid-solid separators such as Epuramat's Extrem-Separator ("ExSep") liquid-solid separator, Xerox PARC's spiral concentrator, or a modification of either of Epuramat's ExSep or Xerox PARC's spiral concentrator, is useful for separation of the precipitation material from the precipitation reaction mixture.

In some embodiments, the resultant dewatered precipitation material is then dried to produce a product (e.g., a cement, a pozzolanic cement, an aggregate, or an non-reactive, storage-stable CO2-sequestering product). Drying may be achieved by air-drying the precipitation material. Where the precipitation material is air dried, air-drying may be at a temperature ranging from −70° C. to 120° C. In certain embodiments, drying is achieved by freeze-drying (i.e., lyophilization), wherein the precipitation material is frozen, the surrounding pressure is reduced, and enough heat is added to allow the frozen water in the precipitation material to sublime directly into gas. In yet another embodiment, the precipitation material is spray-dried to dry the precipitation material, wherein the liquid containing the precipitation material is dried by feeding it through a hot gas (such as the gaseous waste stream from the power plant), and wherein the liquid feed is pumped through an atomizer into a main drying chamber and a hot gas is passed as a co-current or counter-current to the atomizer direction. Depending on the particular drying protocol of the system, the drying station (described in more detail below) may include a filtration element, freeze-drying structure, spray-drying structure, etc. In certain embodiments, waste heat from a power plant or similar operation may be used to perform the drying step when appropriate. For example, in some embodiments, an aggregate is produced by the use of elevated temperature (e.g., from power plant waste heat), pressure, or a combination thereof.

Following separation of the precipitation material from the supernatant, the separated precipitation material may be further processed as desired; however, the precipitation material may simply be transported to a location for long-term storage, effectively sequestering CO2. For example, the carbonate-containing precipitation material may be transported and placed at long-term storage site, for example, above ground (as a storage-stable CO2-sequestering material), below ground, in the deep ocean, etc.

The resultant supernatant of the precipitation process, or a slurry of precipitation material may also be processed as desired. For example, the supernatant or slurry may be returned to the source of the divalent cation-containing aqueous solution (e.g., ocean) or to another location. In some embodiments, the supernatant may be contacted with a source of CO2, as described above, to sequester additional CO2. For example, in embodiments in which the supernatant is to be returned to the ocean, the supernatant may be contacted with a gaseous waste source of CO2 in a manner sufficient to increase the concentration of carbonate ion present in the supernatant. As described above, contact may be conducted using any convenient protocol. In some embodiments, the supernatant has an alkaline pH, and contact with the CO2 source is carried out in a manner sufficient to reduce the pH to a range between pH 5 and 9, pH 6 and 8.5, or pH 7.5 to 8.2.

The methods of the invention may be carried out at land (e.g., at a location where a suitable divalent cation-containing source is present, or is easily and economically transported in), at sea, in the ocean, or another body comprising divalent cations, bit that body naturally occurring or manmade. In some embodiments, a system is employed to perform the above methods, where such systems include those described below in greater detail.

In some embodiments of the invention, fly ash is used as the sole or primary source of divalent cations and/or proton-removing agents for precipitation of carbonate-containing precipitation material. In such embodiments, fly ash may be slaked with water (e.g., freshwater, seawater, brine) to produce a slaked fly ash mixture, wherein the pH of the slaked fly ash mixture may be pH 7-14, pH 8-14, pH 9-14, pH 10-14, pH 11-14, pH 12-14, or pH 13-14. In such slaked fly ash mixtures, the concentration of fly ash in water may be between 1 and 10 g/L, 10 and 20 g/L, 20 and 30 g/L, 30 and 40 g/L, 40 and 80 g/L, 80 and 160 g/L, 160 and 320 g/L, 320 and 640 g/L, or 640 and 1280 g/L, and the slaking temperature may be room temperature (about 70° F.) to about 220° F., 70-100° F., 100-220° F., 120-220° F., 140-220° F., 160-220° F., 160-200° F., or 160-185° F. To optimize the extraction and conversion of CaO to Ca(OH)2, high shear mixing, wet milling, and/or sonication may be used to break open spheres of fly ash to access trapped CaO. High shear mixing, wet milling, and/or sonication, in addition to providing access to CaO trapped in the fly ash matrix (e.g., SiO2 matrix), provides for stronger cements, pozzolanic cements, and related end products. After high shear mixing and/or wet milling, the slaked fly ash mixture is contacted with a source of carbon dioxide (with or without dilution of the fly ash mixture) such as flue gas from a coal-fired power plant or exhaust from a cement kiln. Any of a number of the gas-liquid contacting protocols described above may be utilized. Gas-liquid contact is continued until the pH of the precipitation reaction mixture is constant, after which the precipitation reaction mixture is allowed to stir overnight. The rate at which the pH drops may be controlled by addition of supplemental fly ash during gas-liquid contact. In addition, supplemental fly ash may be added after sparging to raise the pH back to basic levels for precipitation of a portion or all of the precipitation material. In any case, precipitation material may be formed upon removing protons from certain species (e.g., carbonic acid, bicarbonate, hydronium) in the precipitation reaction mixture. A precipitation material comprising carbonates and siliceous compounds may then be separated and, optionally, further processed.

As above, in some embodiments of the invention, fly ash is used as the sole or primary source of divalent cations and/or proton-removing agents for precipitation of carbonate-containing precipitation material. In such embodiments, fly ash may slaked with water (e.g., freshwater, seawater, brine) to produce a slaked fly ash mixture, wherein the pH of the slaked fly ash mixture may be pH 7-14, pH 8-14, pH 9-14, pH 10-14, pH 11-14, pH 12-14, or pH 13-14. In such slaked fly ash mixtures, the concentration of fly ash in water may be between 1 and 10 g/L, 10 and 20 g/L, 20 and 30 g/L, 30 and 40 g/L, 40 and 80 g/L, 80 and 160 g/L, 160 and 320 g/L, 320 and 640 g/L, or 640 and 1280 g/L, and the slaking temperature may be room temperature (about 70° F.) to about 220° F., 70-100° F., 100-220° F., 120-220° F., 140-220° F., 160-220° F., 160-200° F., or 160-185° F. As above, extraction and conversion of CaO to Ca(OH)2 may be optimized with high shear mixing and/or wet milling; however, after any additional processing, the fly ash may be separated from the slaked fly ash mixture to produce a fly ash sludge, which may be dried and used as a pozzolan (as below), and a supernatant comprising divalent cations and proton-removing agents for precipitation of carbonate-containing precipitation material. The supernatant may then be contacted with a source of carbon dioxide (with or without dilution of the fly ash mixture) such as flue gas from a coal-fired power plant or exhaust from a cement kiln. Gas-liquid contact is continued until the pH is constant, after which the precipitation reaction mixture is allowed to stir overnight. The rate at which the pH drops may be controlled by addition of supplemental fly ash during gas-liquid contact. In addition, supplemental fly ash may be added after gas-liquid contact to raise the pH back to basic levels for precipitation of a portion or all of the precipitation material. In any case, precipitation material may be formed upon removing protons from certain species (e.g., carbonic acid, bicarbonate, hydronium) in the precipitation reaction mixture. A precipitation material comprising carbonates may then be separated and, optionally, further processed. For example, the carbonate-containing precipitation material comprising little or no siliceous material may be dried and used in end products. The carbonate-comprising precipitation material may instead be recombined with the separated fly ash sludge, wherein the precipitation material and the fly ash sludge are mixed wet, dry, or in a combination thereof, to produce a siliceous composition comprising carbonates. Such a material may have pozzolanic properties derived from the addition of wet (i.e., fly ash sludge) or dry (i.e., dried fly ash sludge) fly ash-based pozzolan.

In some embodiments of the invention, fly ash is used in combination with other sources of divalent cations and/or proton-removing agents for precipitation of carbonate-containing precipitation material. In such embodiments, fly ash may be slaked with water (e.g., freshwater, seawater, brine) to produce a slaked fly ash mixture. Supplemental proton-removing agents may then be added to the slaked fly ash mixture producing a high-pH slaked fly ash mixture, wherein the pH of the high-pH slaked fly ash mixture may be pH 7-14, pH 8-14, pH 9-14, pH 10-14, pH 11-14, pH 12-14, or pH 13-14, and the fly ash may be completely dissolved or dissolved to some variable extent. For example, 75% of the fly ash may be dissolved owing to the addition of supplemental proton-removing agents. In such slaked fly ash mixtures, the concentration of fly ash in water may be between 1 and 10 g/L, 10 and 20 g/L, 20 and 30 g/L, 30 and 40 g/L, 40 and 80 g/L, 80 and 160 g/L, 160 and 320 g/L, 320 and 640 g/L, or 640 and 1280 g/L, and the slaking temperature may be room temperature (about 70° F.) to about 220° F., 70-100° F., 100-220° F., 120-220° F., 140-220° F., 160-220° F., 160-200° F., or 160-185° F. To facilitate dissolution of any undissolved fly ash, high shear mixing and/or wet milling may be used to break open spheres of fly ash to provide for smaller fly ash particles. After high shear mixing and/or wet milling, the slaked fly ash mixture may be contacted with a source of carbon dioxide (with or without dilution of the fly ash mixture) such as flue gas from a coal-fired power plant or exhaust from a cement kiln. Any of a number of gas-liquid contacting protocols described above may be utilized. Gas-liquid contact is continued until the pH is constant, after which the precipitation reaction mixture may be allowed to stir overnight. The rate at which the pH drops may be controlled by addition of supplemental fly ash or another supplemental proton-removing agent during gas-liquid contact. In addition, supplemental fly ash may be added after gas-liquid contact to raise the pH back to basic levels for precipitation of a portion or all of the precipitation material. In any case, precipitation material may be formed upon removing protons from certain species (e.g., carbonic acid, bicarbonate, hydronium) in the precipitation reaction mixture. A precipitation material comprising carbonates and siliceous compounds may then be separated and, optionally, further processed.

As such, provided is a method comprising contacting an aqueous solution with a source of metal oxides from an industrial process; charging the aqueous solution with carbon dioxide from a source of carbon dioxide from an industrial process; and subjecting the aqueous solution to precipitation conditions under atmospheric pressure to produce a carbonate-containing precipitation material. In some embodiments, the source of metal oxides and the source of carbon dioxide are from the same industrial process. In some embodiments, contacting the aqueous solution with the source of metal oxides occurs prior to charging the aqueous solution with a source of carbon dioxide. In some embodiments, contacting the aqueous solution with the source of metal oxides occurs at the same time as charging the aqueous solution with a source of carbon dioxide. In some embodiments, contacting the aqueous solution with the source of metal oxides, charging the aqueous solution with a source of carbon dioxide, and subjecting the aqueous solution to precipitation conditions occurs at the same time. In some embodiments, the source of metal oxides and the source of carbon dioxide are sourced from the same waste stream. In some embodiments, the waste stream is flue gas from a coal-fired power plant. In some embodiments, the coal-fired power plant is a brown coal-fired power plant. In some embodiments, the waste stream is kiln exhaust from a cement plant. In some embodiments, the source of metal oxides is fly ash. In some embodiments, the source of metal oxides is cement kiln dust. In some embodiments, the waste stream further comprises SOx, NOx, mercury, or any combination thereof. In some embodiments, the source of metal oxides further provides divalent cations for producing the precipitation material. In some embodiments, the source of metal oxides and the aqueous solution both comprise divalent cations for producing the precipitation material. In some embodiments, the source of metal oxides is fly ash or cement kiln dust. In some embodiments, the aqueous solution comprises brine, seawater, or freshwater. In some embodiments, the divalent cations comprises $Ca^{2+}$, $Mg^{2+}$, or a combination thereof. In some embodiments, the source of metal oxides provides proton-removing agents for producing the precipitation material. In some embodiments, the source of metal oxides provides proton-removing agents upon hydration of CaO, MgO, or a combination thereof in the aqueous solution. In some embodiments, the source of metal oxides further provides silica. In some embodiments, the source of metal oxides further provides alumina. In some embodiments, the source of metal oxides further provides ferric oxide. In some embodiments, red or brown mud from bauxite processing also provides proton-removing agents. In some embodiments, electrochemical methods effecting proton removal also provide for producing precipitation material.

In some embodiments, the method further comprises separating the precipitation material from the aqueous solution from which the precipitation material was produced. In some embodiments, the precipitation material comprises CaCO3. In some embodiments, CaCO3 comprises calcite, aragonite, vaterite, or a combination thereof. In some embodiments, the precipitation material further comprises MgCO3. In some embodiments, the CaCO3 comprises aragonite and the MgCO3 comprises nesquehonite. In some embodiments, the method further comprises processing the precipitation material to form a building material. In some embodiments, the building material is a hydraulic cement. In some embodiments, the building material is a pozzolanic cement. In some embodiments, the building material is aggregate.

Also provided is a method comprising contacting an aqueous solution with a waste stream comprising carbon dioxide and a source comprising metal oxides and subjecting the aqueous solution to precipitation conditions to produce a carbonate-containing precipitation material. In some embodiments, the waste stream is flue gas from a coal-fired power plant. In some embodiments, the coal-fired power plant is a brown coal-fired power plant. In some embodiments, the source of metal oxides is fly ash. In some embodiments, the waste stream is kiln exhaust from a cement plant. In some embodiments, the source of metal oxides is cement kiln dust. In some embodiments, the waste stream further comprises SOx, NOx, mercury, or any combination thereof. In some embodiments, divalent cations for producing the precipitation material are provided by the source of metal oxides, the aqueous solution, or a combination thereof. In some embodiments, the aqueous solution comprises brine, seawater, or freshwater. In some embodiments, the divalent cations comprise $Ca^{2+}$, $Mg^{2+}$, or a combination thereof. In some embodiments, the source of metal oxides further provides proton-removing agents for producing the precipitation material. In some embodiments, the source of metal oxides provides proton-removing agents upon hydration of CaO, MgO, or combinations thereof in the aqueous solution. In some embodiments, the source of metal oxides further provides silica. In some embodiments, the source of metal oxides further provides alumina. In some embodiments, the source of metal oxides further provides ferric oxide. In some embodiments, red or brown mud from bauxite processing also provides proton-removing agents. In some embodiments, electrochemical methods effecting proton removal also provide for producing precipitation material. In some embodiments, the precipitation material comprises CaCO3. In some embodiments, CaCO3 comprises calcite, aragonite, vaterite, or a combination thereof. In some embodiments, the method further comprises separating the precipitation material from the aqueous solution from which the precipitation material was produced. In some embodiments, the method further comprises processing the precipitation material to form a building material. In some embodiments, the building material is a hydraulic cement. In some embodiments, the building material is a pozzolanic cement. In some embodiments, the building material is aggregate.

Compositions and Other Products

The invention provides methods and systems for utilizing waste sources of metal oxides to produce carbonate-containing compositions from CO2, wherein the CO2 may be from a variety of different sources (e.g., an industrial waste by-product such as a gaseous waste stream produced by a power plant during the combustion of carbon-based fuel). As such, the invention provides for removing or separating CO2 from a gaseous waste source of CO2, and fixing the CO2 into a non-gaseous, storage-stable form (e.g., materials for the construction of structures such as buildings and infrastructure, as well as the structures themselves) such that the CO2 cannot escape into the atmosphere. Furthermore, the invention provides for an effective method for sequestering CO2 as well as long-term storage of that CO2 in useable products.

Precipitation material in a storage-stable form (which may simply be dried precipitation material) may be stored above ground under exposed conditions (i.e., open to the atmosphere) without significant, if any, degradation for extended durations, e.g., 1 year or longer, 5 years or longer, 10 years or longer, 25 years or longer, 50 years or longer, 100 years or longer, 250 years or longer, 1000 years or longer, 10,000 years or longer, 1,000,000 years or longer, or even 100,000,000 years or longer. As the storage-stable form of the precipitation material undergoes little if any degradation while stored above ground under normal rain water pH, the amount of degradation if any as measured in terms of CO2 gas release from the product will not exceed 5%/year, and in certain embodiments will not exceed 1%/year. The aboveground storage-stable forms of the precipitation material are stable under a variety of different environment conditions, e.g., from temperatures ranging from −100° C. to 600° C. and humidity ranging from 0 to 100% where the conditions may be calm, windy or stormy. In some embodiments, the precipitation material produced by methods of the invention is employed as a building material (e.g., a construction material for some type of man-made structure such as buildings, roads, bridges, dams, and the like), such that CO2 is effectively sequestered in the built environment. Any man made structure, such as foundations, parking structures, houses, office buildings, commercial offices, governmental buildings, infrastructures (e.g., pavements; roads; bridges; overpasses; walls; footings for gates, fences and poles; and the like) is considered a part of the built environment. Mortars of the invention find use in binding construction blocks (e.g., bricks) together and filling gaps between construction blocks. Mortars can also be used to fix existing structure (e.g., to replace sections where the original mortar has become compromised or eroded), among other uses.

In certain embodiments, the carbonate-containing composition is employed as a component of a hydraulic cement, which sets and hardens after combining with water. Setting and hardening of the product produced by combining the precipitation material with cement and water results from the production of hydrates that are formed from the cement upon reaction with water, wherein the hydrates are essentially insoluble in water. Such carbonate compound hydraulic cements, methods for their manufacture, and use are described in U.S. patent application Ser. No. 12/126,776 titled "Hydraulic Cements Comprising Carbonate Compounds Compositions" and filed on May 23, 2008; the disclosure of which application is herein incorporated by reference.

Adjusting major ion ratios during precipitation may influence the nature of the precipitation material. Major ion ratios have considerable influence on polymorph formation. For example, as the magnesium:calcium ratio in the water increases, aragonite becomes the major polymorph of calcium carbonate in the precipitation material over low-magnesium calcite. At low magnesium:calcium ratios, low-magnesium calcite becomes the major polymorph. In some embodiments, where $Ca^{2+}$ and $Mg^{2+}$ are both present, the ratio of $Ca^{2+}$ to $Mg^{2+}$ (i.e., $Ca^{2+}:Mg^{2+}$) in the precipitation material is 1:1 to 1:2.5; 1:2.5 to 1:5; 1:5 to 1:10; 1:10 to 1:25; 1:25 to 1:50; 1:50 to 1:100; 1:100 to 1:150; 1:150 to 1:200; 1:200 to 1:250; 1:250 to 1:500; or 1:500 to 1:1000. In some embodiments, the ratio of $Mg^{2+}$ to $Ca^{2+}$ (i.e., $Mg^{2+}:Ca^{2+}$) in the precipitation material is 1:1 to 1:2.5; 1:2.5 to 1:5; 1:5 to 1:10; 1:10 to 1:25; 1:25 to 1:50; 1:50 to 1:100; 1:100 to 1:150; 1:150 to 1:200; 1:200 to 1:250; 1:250 to 1:500; or 1:500 to 1:1000.

Precipitation rate may also have a large effect on compound phase formation, with the most rapid precipitation rate achieved by seeding the solution with a desired phase. Without seeding, rapid precipitation may be achieved by rapidly increasing the pH of the precipitation reaction mixture, which results in more amorphous constituents. The more rapid the reaction rate, the more silica is incorporated with the carbonate-containing precipitation material, provided silica is present in the precipitation reaction mixture. Furthermore, the higher the pH, the more rapid the precipitation, which results in a more amorphous precipitation material.

In addition to magnesium- and calcium-containing products of the precipitation reaction, compounds and materials comprising silicon, aluminum, iron, and others may also be prepared with methods and systems of the invention. Precipitation of such compounds may be desired to alter the reactivity of cements comprising the precipitated material resulting from the process, or to change the properties of cured cements and concretes made from them. In some embodiments, combustion ash such as fly ash is added to the precipitation reaction mixture as one source of these components, to produce carbonate-containing precipitation material which contains one or more components, such as amorphous silica, amorphous alumino-silicates, crystalline silica, calcium silicates, calcium alumina silicates, etc. In some embodiments, the precipitation material comprises carbonates (e.g., calcium carbonate, magnesium carbonate) and silica in a carbonate:silica ratio of 1:1 to 1:1.5; 1:1.5 to 1:2; 1:2 to 1:2.5; 1:2.5 to 1:3; 1:3 to 1:3.5; 1:3.5 to 1:4; 1:4 to 1:4.5; 1:4.5 to 1:5; 1:5 to 1:7.5; 1:7.5 to 1:10; 1:10 to 1:15; or 1:15 to 1:20. In some embodiments, the precipitation material comprises silica and carbonates (e.g., calcium carbonate, magnesium carbonate)

in a silica:carbonate ratio of 1:1 to 1:1.5; 1:1.5 to 1:2; 1:2 to 1:2.5; 1:2.5 to 1:3; 1:3 to 1:3.5; 1:3.5 to 1:4; 1:4 to 1:4.5; 1:4.5 to 1:5; 1:5 to 1:7.5; 1:7.5 to 1:10; 1:10 to 1:15; or 1:15 to 1:20.

Precipitation material comprising silica and aluminosilicates may be readily employed in the cement and concrete industry as pozzolanic cement by virtue of the presence of the finely divided siliceous and/or alumino-siliceous material. The siliceous and/or aluminosiliceous precipitation material may be used with Portland cement to produce a blended cement or as a direct mineral admixture in a concrete mixture. In some embodiments, pozzolanic material, which may be precipitation material alone or mixed with additional fly ash and/or wet or dried fly ash sludge, comprises calcium and magnesium in a ratio (as above) that perfects setting time, stiffening, and long-term stability of resultant hydration products. Crystallinity of carbonates, concentration of chlorides, alkalis, etc. in the precipitation material may also be controlled to better interact with Portland cement. In some embodiments, siliceous precipitation material comprises silica in which 10-20%, 20-30%, 30-40%, 40-50%, 50-60%, 60-70%, 70-80%, 80-90%, 90-95%, 95-98%, 98-99%, 99-99.9% of the silica has a particle size less than 45 microns (e.g., in the biggest dimension). In some embodiments, siliceous precipitation material comprises aluminosilica in which 10-20%, 20-30%, 30-40%, 40-50%, 50-60%, 60-70%, 70-80%, 80-90%, 90-95%, 95-98%, 98-99%, 99-99.9% of the aluminosilica has a particle size less than 45 microns. In some embodiments, siliceous precipitation material comprises a mixture of silica and aluminosilica in which 10-20%, 20-30%, 30-40%, 40-50%, 50-60%, 60-70%, 70-80%, 80-90%, 90-95%, 95-98%, 98-99%, 99-99.9% of the mixture has a particle size less than 45 microns (e.g., in the biggest dimension).

As such, provided is a siliceous composition comprising a synthetic calcium carbonate, wherein the calcium carbonate is present in at least two forms selected from calcite, aragonite, and vaterite. In some embodiments, the at least two forms of calcium carbonate are calcite and aragonite. In some embodiments, calcite and aragonite are present in a ratio of 20:1. In some embodiments, calcium carbonate and silica are present in a ratio of at least 1:2, carbonate to silica. In some embodiments, 75% of the silica is amorphous silica less than 45 microns in particle size. In some embodiments, silica particles are wholly or partially encapsulated by the synthetic calcium carbonate or synthetic magnesium carbonate.

Also provided is a siliceous composition comprising synthetic calcium carbonate and synthetic magnesium carbonate, wherein the calcium carbonate is present in at least a form selected from calcite, aragonite, and vaterite, and wherein magnesium carbonate is present in at least a form selected from nesquehonite, magnesite, and hydromagnesite. In some embodiments, the calcium carbonate is present as aragonite and the magnesium carbonate is present as nesquehonite. In some embodiments, silica is 20% or less of the siliceous composition. In some embodiments, silica is 10% or less of the siliceous composition. In some embodiments, silica particles are wholly or partially encapsulated by the synthetic calcium carbonate or synthetic magnesium carbonate.

In some embodiments, an aggregate is produced from the resultant precipitation material. In such embodiments, where the drying process produces particles of the desired size, little if any additional processing is required to produce the aggregate. In yet other embodiments, further processing of the precipitation material is performed in order to produce the desired aggregate. For example, the precipitation material may be combined with fresh water in a manner sufficient to cause the precipitate to form a solid product, where the metastable carbonate compounds present in the precipitate have converted to a form that is stable in fresh water. By controlling the water content of the wet material, the porosity, and eventual strength and density of the final aggregate may be controlled. Typically a wet cake will be 40-60 volume % water. For denser aggregates, the wet cake will be <50% water, for less dense cakes, the wet cake will be >50% water. After hardening, the resultant solid product may then be mechanically processed, e.g., crushed or otherwise broken up and sorted to produce aggregate of the desired characteristics, e.g., size, particular shape, etc. In these processes the setting and mechanical processing steps may be performed in a substantially continuous fashion or at separate times. In certain embodiments, large volumes of precipitate may be stored in the open environment where the precipitate is exposed to the atmosphere. For the setting step, the precipitate may be irrigated in a convenient fashion with fresh water, or allowed to be rained on naturally or order to produce the set product. The set product may then be mechanically processed as described above. Following production of the precipitate, the precipitate is processed to produce the desired aggregate. In some embodiment the precipitate may be left outdoors, where rainwater can be used as the freshwater source, to cause the meteoric water stabilization reaction to occur, hardening the precipitate to form aggregate.

In an example of one embodiment of the invention, the precipitate is mechanically spread in a uniform manner using a belt conveyor and highway grader onto a compacted earth surface to a depth of interest, e.g., up to twelve inches, such as 1 to 12 inches, including 6 to 12 inches. The spread material is then irrigated with fresh water at a convenient rate, e.g., of one/half gallon of water per cubic foot of precipitate. The material is then compacted using multiple passes with a steel roller, such as those used in compacting asphalt. The surface is re-irrigated on a weekly basis until the material exhibits the desired chemical and mechanical properties, at which point the material is mechanically processed into aggregate by crushing.

In an example of an additional embodiment of the invention, the carbonate-containing precipitation material, once separated from the precipitation reaction mixture, is washed with fresh water, then placed into a filter press to produce a filter cake with 30-60% solids. This filter cake is then mechanically pressed in a mold, using any convenient means, e.g., a hydraulic press, at adequate pressures, e.g., ranging from 5 to 5000 psi, such as 1000 to 5000 psi, to produce a formed solid, e.g., a rectangular brick. These resultant solids are then cured, e.g., by placing outside and storing, by placing in a chamber wherein they are subjected to high levels of humidity and heat, etc. These resultant cured solids are then used as building materials themselves or crushed to produce aggregate. Methods of producing such aggregate are further described in U.S. patent application Ser. No. 12/475,378, filed 29 May 2009, the disclosure of which is herein incorporated by reference.

In processes involving the use of temperature and pressure, the dewatered water precipitate cake is generally first dried. The cake is then exposed to a combination of rewatering, and elevated temperature and/or pressure for a certain time. The combination of the amount of water added back, the temperature, the pressure, and the time of exposure, as well as the thickness of the cake, can be varied according to composition of the starting material and the desired results. A number of different ways of exposing the material to temperature and pressure are described herein; it will be appreciated that any convenient method may be used. An exemplary drying protocol is exposure to 40° C. for 24-48 hours, but greater or lesser temperatures and times may be used as convenient, e.g., 20-60° C. for 3-96 hours or even longer. Water is added back to the desired percentage, e.g., to 1%-50%, e.g., 1% to 10%, such as 1, 2, 3, 4, 5, 6, 7, 8, 9, or 10% w/w, such as 5% w/w, or 4-6% w/w, or 3-7% w/w. In some cases an exact percentage of water added back is not important, as in materials that are stored outdoors and exposed to meteoric precipitation. Thickness and size of the cake may be adjusted as desired; the thickness can vary in some embodiment from 0.05 inch to 5 inches, e.g. 0.1-2 inches, or 0.3-1 inch. In some embodiments the cake may be 0.5 inch to 6 feet or even thicker. The cake is then exposed to elevated temperature and/or pressure for a given time, by any convenient method, for example, in a platen press using heated platens. The heat to elevate the temperature, e.g., for the platens, may be provided, e.g., by heat from an industrial waste gas stream such as a flue gas stream. The temperature may be any suitable temperature; in general, for a thicker cake a higher temperature is desired; examples of temperature ranges are 40-150° C., e.g., 60-120° C., such as 70-110° C., or 80-100° C. Similarly, the pressure may be any suitable pressure to produce the desired results; exemplary pressures include 1000-100,000 pounds per square inch (psi), including 2000-50,000 psi, or 2000-25,000 psi, or 2000-20,000 psi, or 3000-5000 psi. Finally, the time that the cake is pressed may be any suitable time, e.g., 1-100 seconds, or 1-100 minute, or 1-50 minutes, or 2-25 minutes, or 1-10,000 days. The resultant hard tablet may optionally then cured, e.g., by placing outside and storing, by placing in a chamber wherein they are subjected to high levels of humidity and heat, etc. These hard tablets, optionally cured, are then used as building materials themselves or crushed to produce aggregate.

One method of providing temperature and pressure is to stack dewatered and dried slabs. For example, in such a method a dewatered precipitate may be dried, e.g., with flue gas, in a slab, e.g., 1 inch to 10 feet thick, or 1 foot to 10 feet thick. Pressure is supplied by placing slabs on top of each other; greater pressure is achieved by greater thicknesses of slab layers, e.g., 10-1000 feet or even greater, such as 100-5000 feet. At an appropriate time, which may be days, weeks, months, or even years, depending on the desired result, citified slabs from a given level of the layers, e.g., from the bottom, is removed, e.g., by quarrying, and treated as desired to produce an aggregate or other rock material.

Another method of providing temperature and pressure is the use of a press, as described more fully in U.S. patent application Ser. No. 12/475,378, filed 29 May 2009. A suitable press, e.g., a platen press, may be used to provide pressure at the desired temperature (using heat supplied, e.g., by a flue gas or by other steps of the process to produce a precipitate, e.g., from an electrochemical process) for a desired time. A set of rollers may be used in similar fashion.

Another way to expose the cake to elevated temperature and pressure is by means of an extruder, e.g., a screw-type extruder, also described further in U.S. patent application Ser. No. 12/475,378, filed 29 May 2009. The barrel of the extruder can be outfitted to achieve an elevated temperature, e.g., by jacketing; this elevated temperature can be supplied by, e.g., flue gases or the like. Extrusion may be used as a means of pre-heating and drying the feedstock prior to a pressing operation. Such pressing can be performed by means of a compression mold, via rollers, via rollers with shaped indentations (which can provide virtually any shape of aggregate desired), between a belt which provides compression as it travels, or any other convenient method. Alternatively, the extruder may be used to extrude material through a die, exposing the material to pressure as it is forced through the die, and giving any desired shape. In some embodiments, the carbonate mineral precipitate is mixed with fresh water and then placed into the feed section of a rotating screw extruder. The extruder and/or the exit die may be heated to further assist in the process. The turning of the screw conveys the material along its length and compresses it as the flite depth of the screw decreases. The screw and barrel of the extruder may further include vents in the barrel with decompression zones in the screw coincident with the barrel vent openings. Particularly in the case of a heated extruder, these vented areas allow for the release of steam from the conveyed mass, removing water from the material.

The screw conveyed material is then forced through a die section which further compresses the material and shapes it. Typical openings in the die can be circular, oval, square, rectangular, trapezoidal, etc., although any shape which the final aggregate is desired in could be made by adjusting the shape of the opening. The material exiting the die may be cut to any convenient length by any convenient method, such as by a fly knife. A typical length can be from 0.05 inches to 6 inches, although lengths outside those ranges are possible. Typical diameters can be 0.05 inches to 1.0 inches, though diameters outside of these ranges are possible.

Use of a heated die section may further assist in the formation of the aggregate by accelerating the transition of the carbonate mineral to a hard, stable form. Heated dies may also be used in the case of binders to harden or set the binder. Temperatures of 100° C. to 600° C. are commonly used in the heated die section. Heat for the heated die may come in whole or in part from the flue gas or other industrial gas used in the process of producing the precipitate, where the flue gas is first routed to the die to transfer heat from the hot flue gas to the die.

In yet other embodiments, the precipitate may be employed for in situ or form-in-place structure fabrication. For example, roads, paved areas, or other structures may be fabricated from the precipitate by applying a layer of precipitate, e.g., as described above, to a substrate, e.g., ground, roadbed, etc., and then hydrating the precipitate, e.g., by allowing it to be exposed to naturally applied water, such as in the form of rain, or by irrigation. Hydration solidifies the precipitate into a desired in situ or form-in-place structure, e.g., road, paved over area, etc. The process may be repeated, e.g., where thicker layers of in-situ formed structures are desired.

Systems

Aspects of the invention further include systems, e.g., processing plants or factories, for practicing the methods as described above. Systems of the invention may have any configuration that enables practice of the particular production method of interest. In some embodiments, the system is configured to produce carbonate-containing precipitation material in excess of 1 ton per day. In some embodiments, the system is configured to produce carbonate-containing precipitation material in excess of 10 tons per day. In some embodiments, the system is configured to produce carbonate-containing precipitation material in excess of 100 tons per day. In some embodiments, the system is configured to produce carbonate-containing precipitation material in excess of 1000 tons per day. In some embodiments, the system is configured to produce carbonate-containing precipitation material in excess of 10,000 tons per day.

In certain embodiments, the systems include a source of divalent cation-containing aqueous solution such as a structure having an input for the aqueous solution. For example, the systems may include a pipeline or analogous feed of divalent cation-containing aqueous solution, wherein the divalent cation-containing aqueous solution is brine, seawater, or freshwater. In some embodiments, the system comprises a structure having an input for water comprising no divalent cations or a low concentration of divalent cations. In some embodiments, the structure and input is configured to provide water (with divalent cations or not) sufficient to produce precipitation material in excess of 1, 10, 100, 1,000, or 10,000 tons per day.

In addition, the systems will include a precipitation reactor that subjects the water introduced to the precipitation reactor to carbonate compound precipitation conditions (as described above) and produces precipitation material and supernatant. In some embodiments, the precipitation reactor is configured to provide water (with divalent cations or not) sufficient to produce precipitation material in excess of 1, 10, 100, 1,000, or 10,000 tons per day. The precipitation reactor may also be configured to include any of a number of different elements such as temperature modulation elements (e.g., configured to heat the water to a desired temperature), chemical additive elements (e.g., configured for introducing divalent cations, proton-removing agents, etc. into the precipitation reaction mixture), electrolysis elements (e.g., cathodes, anodes, etc.), and the like.

The system further includes a source of $CO_2$ and a waste source of metal oxides, as well as components for combining these sources with water (optionally a divalent-cation containing aqueous solution such as brine or seawater) at some point before the precipitation reactor or in the precipitation reactor. As such, the precipitation system may include a separate source of $CO_2$, for example, wherein the system is configured to be employed in embodiments where the aqueous solution of divalent cations and/or supernatant is contacted with a carbon dioxide source at some time during the process. This source may be any of those described above (e.g., a waste feed from an industrial power plant), gas contact being effected by, for example, a gas-liquid contactor such as that described in U.S. Provisional Patent Application 61/178,475, filed 14 May 2009, which is hereby incorporated by reference in its entirety. In some embodiments, the gas-liquid contactor is configured to contact enough $CO_2$ to produce precipitation material in excess of 1, 10, 100, 1,000, or 10,000 tons per day.

A gaseous waste stream may be provided from an industrial plant to the site of precipitation in any convenient manner that conveys the gaseous waste stream from the industrial plant to the precipitation plant. In some embodiments, the gaseous waste stream is provided with a gas conveyer (e.g., a duct) that runs from a site of the industrial plant (e.g., an industrial plant flue) to one or more locations of the precipitation site. The source of the gaseous waste stream may be a distal location relative to the site of precipitation such that the source of the gaseous waste stream is a location that is 1 mile or more, such as 10 miles or more, including 100 miles or more, from the precipitation location. For example, the gaseous waste stream may have been transported to the site of precipitation from a remote industrial plant via a $CO_2$ gas conveyance system (e.g., a pipeline). The industrial plant generated $CO_2$ containing gas may or may not be processed (e.g., remove other components) before it reaches the precipitation site (i.e., the site in which precipitation and/or production of aggregate takes place). In yet other instances, the gaseous waste stream source is proximal to the precipitation site. For example, the precipitation site is integrated with the gaseous waste stream source, such as a power plant that integrates a precipitation reactor for precipitation of precipitation material that may be used to produce aggregate.

As indicated above, the gaseous waste stream may be one that is obtained from a flue or analogous structure of an industrial plant. In these embodiments, a line (e.g., duct) is connected to the flue so that gas leaves the flue through the line and is conveyed to the appropriate location(s) of a precipitation system. Depending upon the particular configuration of the precipitation system at the point at which the gaseous waste stream is employed, the location of the source from which the gaseous waste stream is obtained may vary (e.g., to provide a waste stream that has the appropriate or desired temperature). As such, in certain embodiments, where a gaseous waste stream having a temperature ranging for 0° C. to 1800° C., such as 60° C. to 700° C., is desired, the flue gas may be obtained at the exit point of the boiler or gas turbine, the kiln, or at any point of the power plant or stack, that provides the desired temperature. Where desired, the flue gas is maintained at a temperature above the dew point (e.g., 125° C.) in order to avoid condensation and related complications. If it is not possible to maintain the temperature above the dew point, steps may be taken to reduce the adverse impact of condensation (e.g., employing ducting that is stainless steel, fluorocarbon (such as poly(tetrafluoroethylene)) lined, diluted with water, and pH controlled, etc.) so the duct does not rapidly deteriorate.

Where the saltwater source that is processed by the system to produce the carbonate compound composition is seawater, the input is in fluid communication with a source of sea water, e.g., such as where the input is a pipeline or feed from ocean water to a land based system or a inlet port in the hull of ship, e.g., where the system is part of a ship, e.g., in an ocean based system.

The system further includes a liquid-separator separator for separating carbonate-containing precipitation material from the reaction mixture from which it was produced. As detailed in U.S. Provisional Patent Application 61/170,086, filed 16 Apr. 2009, which is herein incorporate by reference, liquid-solid separators such as Epuramat's Extrem-Separator ("ExSep") liquid-solid separator, Xerox PARC's spiral concentrator, or a modification of either of Epuramat's ExSep or Xerox PARC's spiral concentrator, is useful for separation of the precipitation material from the precipitation reaction mixture. In certain embodiments, the separator is a drying station for drying the precipitated carbonate mineral composition produced by the carbonate mineral precipitation station. Depending on the particular drying protocol of the system, the drying station may include a filtration element, freeze drying structure, spray drying structure, etc., as described more fully below.

In certain embodiments, the system will further include a station for preparing a building material, such as cement or aggregate, from the precipitate. See e.g., U.S. patent application Ser. No. 12/126,776 titled "Hydraulic Cements Comprising Carbonate Compounds Compositions" and filed on May 23, 2008 and U.S. Provisional Patent Application Ser. No. 61/056,972 titled "CO2 Sequestering Aggregate, and Methods of Making and Using the Same," filed on May 23, 2008, the disclosures of which applications are herein incorporated by reference.

As indicated above, the system may be present on land or sea. For example, the system may be land-based system that is in a coastal region, e.g., close to a source of seawater, or even an interior location, where water is piped into the system from a salt-water source, e.g., ocean. Alternatively, the system bay a water based system, i.e., a system that is present on or in water. Such a system may be present on a boat, ocean based platform etc., as desired.

FIG. 1 depicts a typical power plant process for burning coal and removing wastes such as ash and sulfur. Coal 500 is burned in steam boiler 501, which produces steam to power a turbine generator and produce electricity. The burning of the coal produces flue gas 502, which contains CO2, SOx, NOx, Hg, etc. as well as fly ash. The burning of the coal also produces bottom ash 510, which may be sent to a landfill or used as a low-value aggregate. The flue gas 502 is run through a separation device 520, generally an electrostatic precipitator, which results in removal of fly ash 530 from the flue gas 502. Depending on the manner of combustion and the type of coal, fly ash 530 may find beneficial use in concrete, but is more generally land filled.

A fan 540 directs the sulfur containing flue gas 521 to FGD tank 550, where it is treated by exposure to a lime slurry 553 prepared from water 551 and calcined lime 552. The calcination of lime releases CO2 into the atmosphere, so for every mole of lime used one mole of CO2 is released in producing the lime. The lime 552 combines with SOx from the flue gas 521 t in FGD tank 550 to produce gypsum (CaSO4). Thus for every molecule of sulfur removed from the flue gas, one molecule of CO2 has been released into the atmosphere from calcination of the lime.

Sulfur-free flue gas 556 is piped from FGD tank 550 to stack 560, where it may be further treated to remove NOx, Hg, etc. before being released into the atmosphere as gas 580. Note that gas 580, which is released to the atmosphere, still contains most if not all of the CO2, which was generated by burning of the coal 500.

The reaction of calcined lime slurry 553 with sulfur-containing flue gas 521 in FGD tank 550 produces a gypsum slurry 554 which is moved to hydrocyclone 570 by means of pump 555. Hydrocyclone 570 removes water 571 from slurry 554, producing a more concentrated gypsum slurry 579, which is sent to filter 580 for further dewatering. The water removed in hydrocyclone 570 and filter 580 is sent to reclaim water tank 572, where excess solids are settled out and sent to landfill 511. Wastewater 574 is discharged and some reclaim water 573 is sent back to FGD tank 550. The filter cake 581, which is removed from filter 580, is sent to dryer 583, where water is removed to produce dry gypsum powder 590. Gypsum powder 590 way be sent to landfill 511, or may be used to produce building materials such as wallboard.

FIG. 2 represents an example of one embodiment of the invention in which CO2, fly ash, NOx, SOx, Hg and other pollutants are utilized as reactants in a carbonate compound precipitation process to remove these moieties and sequester them into the built environment, e.g., via their use in a hydraulic cement. In this example, the fly ash and bottom ash are utilized as reactants to both lower pH and to provide beneficial co-reacting cations, such as silicon and aluminum.

Coal 600 is burned in steam boiler 601, which produces steam to power a turbine generator and produce electricity. The burning of the coal produces flue gas 602, which contains CO2, SOx, NOx, Hg, etc. as well as fly ash. In this embodiment, the coal utilized is a high-sulfur sub-bituminous coal, which is inexpensive to obtain but which produces larger quantities of SOx and other pollutants. Flue gas 602, bottom ash 610, seawater 620 and in some embodiments additional alkali source 625 are charged into reactor 630, wherein a carbonate mineral precipitation process takes place, producing slurry 631.

Slurry 631 is pumped via pump 640 to drying system 650, which in some embodiments includes a filtration step followed by spray drying. The water 651 separated from the drying system 650 is discharged, along with clean gas 680, which can be released to the atmosphere. The resultant solid or powder 660 from drying system 650 is utilized as a hydraulic cement to produce building materials, effectively sequestering the CO2, SOx, and, in some embodiments, other pollutants such as mercury and/or NOx into the built environment.

As such, provided is a system comprising a slaker adapted to slake a waste source of metal oxides, a precipitation reactor; and a liquid-solid separator, wherein the precipitation reactor is operably connected to both the slaker and the liquid-solid separator, and further wherein the system is configured to produce carbonate-containing precipitation material in excess of 1 ton per day. In some embodiments, the system is configured to produce carbonate-containing precipitation material in excess of 10 tons per day. In some embodiments, the system is configured to produce carbonate-containing precipitation material in excess of 100 ton per day. In some embodiments, the system is configured to produce carbonate-containing precipitation material in excess of 1000 tons per day. In some embodiments, the system is configured to produce carbonate-containing precipitation material in excess of 10,000 tons per day. In some embodiments, the slaker is selected from a slurry detention slaker, a paste slaker, and a ball mill slaker. In some embodiments, the system further comprises a source of carbon dioxide. In some embodiments, the source of carbon dioxide is from a coal-fired power plant or cement plant. In some embodiments, the system further comprises a source of proton-removing agents. In some embodiments, the system further comprises a source of divalent cations. In some embodiments, the system further comprising a building-materials production unit configured to produce a building material from solid product of the liquid-solid separator.

The following examples are put forth so as to provide those of ordinary skill in the art with a complete disclosure and description of how to make and use the invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

EXAMPLES

The following analytical instrumentation and methods of use thereof were used to characterize materials produced in the examples below.

Coulometer: Liquid and solid carbon-containing samples were acidified with 2.0 N perchloric acid (HClO4) to evolve carbon dioxide gas into a carrier gas stream, and subsequently scrubbed with 3% w/v silver nitrate at pH 3.0 to remove any evolved sulfur gasses prior to analysis by an inorganic carbon coulometer (UIC Inc, model CM5015). Samples of cement, fly ash, and seawater are heated after addition of percholoric acid with a heated block to aid digestion of the sample.

Brunauer-Emmett-Teller ("BET") Specific Surface Area: Specific surface area (SSA) measurement was by surface absorption with dinitrogen (BET method). SSA of dry samples was measured with a Micromeritics Tristar™ II 3020 Specific Surface Area and Porosity Analyzer after preparing the sample with a Flowprep™ 060 sample degas system. Briefly, sample preparation involved degassing approximately 1.0 g of dry sample at an elevated temperature while exposed to a stream of dinitrogen gas to remove residual water vapour and other adsorbants from the sample surfaces.

The purge gas in the sample holder was subsequently evacuated and the sample cooled before being exposed to dinitrogen gas at a series of increasing pressures (related to adsorption film thickness). After the surface was blanketed, the dinitrogen was released from the surface of the particles by systematic reduction of the pressure in the sample holder. The desorbed gas was measured and translated to a total surface area measurement.

Particle Size Analysis ("PSA"): Particle size analysis and distribution were measured using static light scattering. Dry particles were suspended in isopropyl alcohol and analyzed using a Horiba Particle Size Distribution Analyzer (Model LA-950V2) in dual wavelength/laser configuration. Mie scattering theory was used to calculate the population of particles as a function of size fraction, from 0.1 mm to 1000 mm.

Powder X-ray Diffraction ("XRD"): Powder X-ray diffraction was undertaken with a Rigaku Miniflex™ (Rigaku) to identify crystalline phases and estimate mass fraction of different identifiable sample phases. Dry, solid samples were hand-ground to a fine powder and loaded on sample holders. The X-ray source was a copper anode (Cu kα), powered at 30 kV and 15 mA. The X-ray scan was run over 5-90 °2θ, at a scan rate of 2 °2θ per min, and a step size of 0.01 °2θ per step. The X-ray diffraction profile was analyzed by Rietveld refinement using the X-ray diffraction pattern analysis software Jade™ (version 9, Materials Data Inc. (MDI)).

Fourier Transform Infrared ("FT-IR") Spectroscopy: FT-IR analyses were performed on a Nicolet 380 equipped with the Smart Diffuse Reflectance module. All samples were weighed to 3.5±0.5 mg and hand ground with 0.5 g KBr and subsequently pressed and leveled before being inserted into the FT-IR for a 5-minute nitrogen purge. Spectra were recorded in the range 400-4000 cm$^{-1}$.

Scanning Electron Microscopy ("SEM"): SEM was performed using an Hitachi TM-1000 tungsten filament tabletop microscope using a fixed acceleration voltage of 15 kV at a working pressure of 30-65 Pa, and a single BSE semiconductor detector. Solid samples were fixed to the stage using a carbon-based adhesive; wet samples were vacuum dried to a graphite stage prior to analysis.

Chloride Concentration: Chloride concentrations were determined with Chloride QuanTab® Test Strips (Product No. 2751340), having a testing range between 300-6000 mg chloride per liter solution measured in 100-200 ppm increments.

Example 1

Fly Ash pH Study

A. Experimental 500 mL of seawater (initial pH=8.01) was continuously stirred in a glass beaker using a magnetic stir bar. The pH and temperature of the reaction was continuously monitored. Class F fly ash (~10% CaO) was incrementally added as a powder, allowing the pH to equilibrate in between additions.

B. Results and Observations:

(Amounts of fly ash listed are the cumulative totals, i.e. the total amount added at that point in the experiment.)

After the additions of 5.00 g of fly ash the pH reached 9.00.

| Fly ash (g) | pH |
|---|---|
| 5.00 | 9.00 |
| 34.14 | 9.50 |
| 168.89 | 9.76 |
| 219.47 | 10.94 |
| 254.13 | 11.20 |
| 300.87 | 11.28 |

Much more fly ash was needed to raise the pH of the seawater than distilled water. The initial rise in pH (pH 8 to pH 9) required much less fly ash than the subsequent rises in pH of the same magnitude. The pH remained fairly stable around 9.7 for much of the reaction. The rate of pH increase went up after ~10. Also of note was an initial drop in pH when the fly ash was added. This drop in pH is quickly overcome by the effects of the calcium hydroxide. SEM images of vacuum-dried slurry from the reaction indicated that some spheres of the fly ash may have partially dissolved. The remaining spheres also seemed to be embedded in a possibly cementitious material.

C. Conclusions

In fresh (distilled) water, it was found that small amounts of class F fly ash (<1 g/L) immediately raised the pH from 7 (neutral) to ~11. The small amount necessary to raise the pH is most likely due to the unbuffered nature of nature of distilled water. Seawater is highly buffered by the carbonate system, and thus it took much more fly ash to raise the pH to similar levels.

Example 2

Precipitation Material Using Fly Ash as Source of Divalent Cations and Proton-Removing Agents Protocol A. Slaking
 1. Fly ash (322.04 g of FAF11-001) was weighed into a 500 mL plastic reaction vessel.
 2. Deionized water (320.92 g) was added to the reaction vessel resulting in a 1:1 ratio of fly ash to water.
 3. Resultant mixture stirred until a homogeneous slurry.
 4. Reaction vessel closed and sealed with tape.
 5. Slurry was rotated for 24 hours.

B. Precipitation
 1. Deionized water (680 ml at pH 7.13) was added to a 2 L plastic reaction vessel equipped with a large stir bar and stirred at 250 rpm.
 2. Slaked slurry was slowly added with stirring, resulting in a reaction mixture that was about 320 g fly ash per liter.
 3. Stirring maintained until a stable pH level was reached (pH 12.40).
 4. 15% CO2 in compressed air was added (CO2: 0.4 scfh; compressed air: 2.1 scfh; total: 2.5 scfh) using a sparger placed as low in the reaction mixture as possible (without disturbing the stir bar).
 5. Reaction vessel was covered, leaving only a small opening for the gas tubing and pH probe.
 6. pH monitored and recorded for over 5 hours.
 7. After adequate CO2 was added to the reaction slurry (i.e. ~2× equivalents based on CaO/MgO in fly ash as measured by XRF), CO2 sparging was stopped (by removing the sparger), the reaction vessel was sealed, and the precipitation reaction mixture was allowed to stir overnight at 250 rpm.

Work Up
1. pH of the precipitation reaction mixture was measured at pH 8.37 after stirring overnight.
2. Stirring was stopped and the precipitation reaction mixture was filtered.
3. Resultant precipitation material was dried overnight at 50° C.
4. Resultant supernatant was collected.

Analysis
1. Precipitation material was analyzed by SEM, XRD TGA, coulometry, and FT-IR. FIG. 3 provides SEM images of the precipitation material of at 1000×, 2500×, and 6000× magnification. FIG. 4 provides an XRD of the precipitation material. FIG. 5 provides a TGA for the precipitation material. Coulometry indicated that the precipitation material 1.795% carbon.
2. Supernatant was analyzed using alkalinity and hardness.

TABLE 3

Reaction profile for Example 2.

| Time (min) | pH | $CO_2$ Delivered (moles) | $CO_2$ (on/off) | Air (on/off) |
|---|---|---|---|---|
| 0 | 7.13 | 0.000 | off | off |
| 0 | 12.39 | 0.000 | off | off |
| 0 | 12.40 | 0.000 | off | off |
| 1 | 12.37 | 0.008 | on | on |
| 2 | 12.33 | 0.015 | on | on |
| 4 | 12.27 | 0.030 | on | on |
| 5 | 12.22 | 0.038 | on | on |
| 7 | 12.10 | 0.053 | on | on |
| 9 | 11.98 | 0.068 | on | on |
| 16 | 11.51 | 0.122 | on | on |
| 42 | 10.55 | 0.319 | on | on |
| 51 | 9.93 | 0.387 | on | on |
| 55 | 9.77 | 0.418 | on | on |
| 115 | 8.66 | 0.873 | on | on |
| 180 | 8.14 | 1.367 | off | off |
| 230 | 7.60 | 1.747 | off | off |
| 285 | 7.13 | 2.165 | off | off |
| 345 | 7.31 | 2.620 | off | off |

Example 3

Precipitation Material Using Cement Kiln Dust as Source of Divalent Cations and Proton-Removing Agents Protocol
A. Slaking
  1. Cement kiln dust (318.01 g) was weighed into a 500 mL plastic reaction vessel.
  2. Deionized water (319.21 g) was added to the reaction vessel resulting in a 1:1 ratio of cement kiln dust to water.
  3. Resultant mixture stirred until a homogeneous slurry.
  4. Reaction vessel closed and sealed with tape.
  5. Slurry rotated for 18 hours.
B. Precipitation
  1. Deionized water (680 mL) combined with homogeneous slurry of cement kiln dust in a 2 L plastic reaction vessel with large stir bar, resulting in a reaction mixture that was about 318 g cement kiln dust per liter.
  2. The reaction mixture was stirred at 250 rpm until a stable pH level was reached (pH 12.41).
  3. 15% $CO_2$ in compressed air was added ($CO_2$: 0.4 scfh; compressed air: 2.1 scfh; total: 2.5 scfh) using a sparger placed as low in the reaction mixture as possible (without disturbing the stir bar).
  4. Reaction vessel was covered, leaving only a small opening for the gas tubing and pH probe.
  5. Continued to sparge 15% $CO_2$ in compressed air into reaction mixture overnight.
  6. $CO_2$ sparging was stopped (by removing the sparger), the reaction vessel was sealed, and the precipitation reaction mixture was allowed to stir overnight at 250 rpm.

Work Up
1. pH of the precipitation reaction mixture was measured at pH 6.88 after stirring overnight.
2. Stirring was stopped and the precipitation reaction mixture was filtered.
3. Resultant precipitation material was dried overnight at 50° C.
4. Resultant supernatant was collected.

Analysis
1. Precipitation material was analyzed by SEM, XRD, TGA, coulometry, and percent soluble chloride. FIG. 6 provides an SEM image of the precipitation material at 2,500× magnification. FIG. 7 provides an XRD of the precipitation material. FIG. 8 provides a TGA of the precipitation material. Coulometry indicated that the precipitation material was 7.40% carbon. The percent soluble chloride in the precipitation material was found to be 2.916% soluble chloride.
2. Supernatant was analyzed using alkalinity and hardness.

TABLE 4

Reaction profile for Example 3.

| Time (min) | pH | $CO_2$ Delivered (moles) | $CO_2$ (on/off) | Air (on/off) |
|---|---|---|---|---|
| 0 | 12.41 | 0.000 | Off | Off |
| 1 | 12.41 | 0.008 | On | On |
| 2 | 12.37 | 0.015 | On | On |
| 5 | 12.32 | 0.038 | On | On |
| 65 | 12.32 | 0.494 | On | On |
| 137 | 12.19 | 1.041 | On | On |
| 177 | 11.30 | 1.344 | On | On |
| 247 | 10.13 | 1.876 | On | On |
| 298 | 9.25 | 2.264 | On | On |
| 320 | 8.04 | 2.431 | On | On |
| 356 | 6.93 | 2.704 | On | On |
| 404 | 6.70 | 3.069 | On | On |
| 539 | 6.71 | 4.094 | On | On |
| 479 | 6.73 | 5.689 | On | On |
| 1311 | 6.68 | 9.958 | Off | Off |
| 2749 | 6.88 | 9.958 | Off | Off |

Example 4

Precipitation Material Using Cement Kiln Dust as Source of Divalent Cations and Proton-Removing Agents Protocol
1. Cement kiln dust (80 g) was weighed into a 1.5 L plastic reaction vessel.
2. Deionized water (1 L) was added to the reaction vessel and the resultant mixture stirred at 250 rpm (pH 12.45).
3. 15% $CO_2$ in compressed air was added ($CO_2$: 0.3 scfh; compressed air: 2.0 scfh; total: 2.3 scfh) using a sparger placed at the bottom of the reaction vessel using suction cups.

4. Reaction vessel was covered, leaving only a small opening for the gas and pH probe.
5. pH monitored and recorded for about 4 hours.
6. After adequate CO2 was added to the precipitation reaction mixture (i.e., ~2× equivalents based on CaO/MgO in cement kiln dust as measured by XRF), CO2 sparging was stopped, the reaction vessel was sealed, and the precipitation reaction mixture was allowed to stir overnight at 250 rpm.

Sample Work Up
1. pH of the precipitation reaction mixture was measured after stirring overnight.
2. Stirring was stopped and the precipitation reaction mixture was filtered.
3. Resultant precipitation material was dried overnight at 40° C.
4. Resultant supernatant was collected.

Analysis
1. Precipitation material was analyzed by SEM, FT-IR, and coulometry. FIG. 9 provides an SEM image of oven-dried precipitation material at 2,500× magnification. FIG. 10 provides an FT-IR of the oven-dried precipitation material. Coulometry indicated that the precipitation material was 7.75% carbon.

Example 5

Measurement of $\delta^{13}C$ Value for Precipitation Material and Starting Materials In this experiment, carbonate-containing precipitation material was prepared using a mixture of bottled sulfur dioxide (SO2) and bottled carbon dioxide (CO2) gases and fly ash as a waste source of metal oxides. The procedure was conducted in a closed container.

The starting materials were a mixture of commercially available bottled SO2 and CO2 gas (SO2/CO2 gas or "simulated flue gas"), de-ionized water, and fly ash as the waste source of metal oxides.

A container was filled with de-ionized water. Fly ash was added to the de-ionized water after slaking, providing a pH (alkaline) and divalent cation concentration suitable for precipitation of carbonate-containing precipitation material without releasing CO2 into the atmosphere. SO2/CO2 gas was sparged at a rate and time suitable to precipitate precipitation material from the alkaline solution. Sufficient time was allowed for interaction of the components of the reaction, after which the precipitation material was separated from the remaining solution ("precipitation reaction mixture), resulting in wet precipitation material and supernatant.

$\delta^{13}C$ values for the process starting materials, precipitation material, and supernatant were measured. The analytical system used was manufactured by Los Gatos Research and uses direct absorption spectroscopy to provide $\delta^{13}C$ and concentration data for dry gases ranging from 2% to 20% CO2. The instrument was calibrated using standard 5% CO2 gases with known isotopic composition, and measurements of CO2 evolved from samples of travertine and IAEA marble #20 digested in 2M perchloric acid yielded values that were within acceptable measurement error of the values found in literature. The CO2 source gas was sampled using a syringe. The CO2 gas was passed through a gas dryer (Perma Pure MD Gas Dryer, Model MD-110-48F-4 made of Nafion® polymer), then into the bench-top commercially available carbon isotope analytical system. Solid samples were first digested with heated perchloric acid (2M HClO4). CO2 gas was evolved from the closed digestion system, and then passed into the gas dryer. From there, the gas was collected and injected into the analysis system, resulting in $\delta^{13}C$ data. Similarly, the supernatant was digested to evolve CO2 gas that was then dried and passed to the analysis instrument resulting in $\delta^{13}C$ data.

Measurements from the analysis of the SO2/CO2 gas, waste source of metal oxides (i.e., fly ash), carbonate-containing precipitation material, and supernatant are listed in Table 5. The $\delta^{13}C$ values for the precipitation material and supernatant are −15.88‰ and −11.70‰, respectively. The $\delta^{13}C$ values of both products of the reaction reflect the incorporation of the SO2/CO2 gas ($\delta^{13}C=-12.45‰$) and the fly ash that included some carbon that was not fully combusted to a gas ($\delta^{13}C=-17.46‰$). Because the fly ash, itself a product of fossil fuel combustion, had a more negative $\delta^{13}C$ than the CO2 used, the overall $\delta^{13}C$ value of the precipitation material reflects that by being more negative than that of the CO2 itself. This Example illustrates that $\delta^{13}C$ values may be used to confirm the primary source of carbon in a carbonate-containing composition material.

TABLE 5

Values ($\delta^{13}C$) for starting materials and products of Example 5.

| Atmosphere $\delta^{13}C$ Value (‰) | CO2 Source | CO2 Source $\delta^{13}C$ Value (‰) | Base Source | Base $\delta^{13}C$ Value (‰) | Supernatant Solution $\delta^{13}C$ Value (‰) | Precipitatoin Material $\delta^{13}C$ Value (‰) |
|---|---|---|---|---|---|---|
| −8 | SO2/CO2 bottled gas mix | −12.45 | fly ash | −17.46 | −11.70 | −15.88 |

Example 6

Cement Production

A. Cement #1
1. Raw Material Precipitation
1000 mL seawater (pH=8.07, T=20.3° C.) obtained from Santa Cruz Harbor. 1 M NaOH added drop wise to seawater. Beginning around pH 10, a precipitate formed as evidenced by the cloudy reaction mixture. Despite continued addition of NaOH, the pH did not rise above about pH 10.15. When base addition was paused, pH dropped to a lower pH value. The solution became progressively cloudy with addition of bases, indicating progressive precipitation. After about 20 minutes, the pH stopped dropping when base addition was paused. The precipitation reaction mixture was subsequently filtered through a Watman 410 1 μm filter, and filtrate is freeze dried.
2. Cement
Freeze-dried powder produced as immediately above was hydrated by drop wise addition of fresh distilled water to form a cement paste, which was mixed for about 30 seconds in an agate mortar and pestle until the cement paste had a consistency of toothpaste. The pH of the paste was measured using pH paper, and the pH was found to be between pH 11 and pH 12. The cement paste was formed into a sphere, left in the mortar, and sealed (with the mortar) in a resealable plastic bag for one day. After one day, the cement sphere was hard and shaped like an egg due to slumping while drying.

B. Cement #2

A cement powder consisting of amorphous magnesium calcium carbonate (AMCC), silica fume, vaterite, and brucite (magnesium hydroxide) was formulated in the following ratio by mass: 3 AMCC:5 silica fume:7 vaterite:0.2 brucite.

The AMCC was precipitated from a seawater desalination plant by-product concentrated to 46,000-ppm salinity at ambient temperature. Precipitation of AMCC was induced by the addition of sodium hydroxide to the concentrated aqueous by-product, increasing the pH to above 11 until precipitation commenced, and adding sodium hydroxide to maintain pH at pH 11. The AMCC precipitate was continuously filtered from the system and freeze-dried for storage.

Silica fume was obtained from a commercial source.

Vaterite was precipitated from seawater stabilized with 2 μmol/kg LaCl3 at a temperature of about 45° C. Seawater processed by the desalination facility was already 5-10 degrees warmer than the incoming seawater. Additional heating to 45° C., should it be needed, may be accomplished by running the seawater through solar panels prior to precipitation of vaterite.

Brucite was also obtained from a commercial source.

Water was added to the above mixture in a water:cement mass ratio of 0.4:1.0 (L/S=0.4) to form a workable paste with an alkaline pH. The paste thickens after about one hour and is set into a hardened cement by 2 hours. The cement attained greater than 90% of its compressive strength over the next several weeks.

C. Cement #3

A cement powder consisting of aragonite, amorphous magnesium calcium carbonate (AMCC), and fly ash, was formulated in the following ratio by mass: 4 Aragonite:3 AMCC:3 silica fume:0.4 Betonies Clay The aragonite was precipitated from a seawater desalination plant by-product concentrated to 46,000 ppm salinity at 60° C. Seawater processed by the desalination facility was already 5-10 degrees warmer than incoming seawater. Additional heating to 60° C., should it be needed, may be accomplished by running the water through solar panels prior to precipitation of aragonite. Precipitation was induced by the addition of sodium hydroxide to the water, increasing the pH to above 9 until precipitation commenced, and adding sodium hydroxide to maintain pH at pH 9. The aragonite precipitate was continuously filtered from the system and freeze-dried for storage.

The AMCC is precipitated from a seawater desalination plant by-product concentrated to 46,000-ppm salinity at ambient temperature. Precipitation was induced by the addition of sodium hydroxide to the water, increasing the pH to above 11 until precipitation commenced, and adding sodium hydroxide to maintain pH at pH 11. The AMCC precipitate was continuously filtered from the system and freeze-dried for storage.

Fly ash was provided from a coal-fired power plant source.

Water was added to the above mixture at a mass ratio of 0.25:1.0 water:cement powder (L/S=0.25) to form a workable paste with an alkaline pH. The paste thickened after about one hour and was set into a hardened cement by about 2 hours. The cement attained greater than about 90% of its compressive strength over the next several weeks.

Example 7

Compressive Strength of Hydraulic Cement Mortar Cubes Comprising Precipitation Material Hydraulic cement mortar cubes were prepared and tested for compressive strength in accordance with ASTM C109. As indicated in Table 6 below, hydraulic cement mortar cubes were prepared with 100% OPC, 80% OPC4-1+20% fly ash, 80% OPC4-1+20% PPT 1, 80% OPC4-1+20% PPT 2, and 50% OPC+50% PPT 2, wherein PPT 1 and PPT 2 are precipitation material prepared as in Example 2. Blends of OPC and precipitation material were mixed dry before combining with water (w/c=0.50). 100% OPC was also combined with water in a water/cement ratio of 0.50.

TABLE 6

Compressive strength and flow for hydraulic cement mortars comprising precipitation material.

| | | Compression Strength (psi) | | | |
|---|---|---|---|---|---|
| Time | | 80% OPC4-1 + 20% Material | | | 50% OPC + |
| (days) | 100% OPC | Fly Ash | PPT 1 | PPT 2 | 50% PPT 2 |
| 1 | 1891 | 1470.7 | N/A | N/A | N/A |
| 3 | 2985.5 | 3128.8 | 2622.5 | 2790 | 1352.7 |
| 7 | 3959.8 | 3830.8 | 3674 | 3914.3 | 2458.3 |
| 28 | 5070.8 | 4752.5 | 5347.5 | 4148 | 4148 |
| 56 | 5056.1 | 6562.5 | 6206.3 | | |
| Flow | 96% | 99% | 74% | 86% | 92% |

As evidenced by the data presented in Table 6, the compressive strength of hydraulic cement mortar cubes comprising precipitation material are generally equal to or better than hydraulic cement mortar cubes of OPC alone.

Example 8

Preparation of Aggregate from Precipitation Material

The steel molds of a Wabash hydraulic press (Model No.: 75-24-2TRM; ca. 1974) were cleaned and the platens were preheated such that the platen surfaces (including mold cavity and punch) were at 90° C. for a minimum of 1 hour.

Some of the precipitation material filter cake from Example 1 was oven-dried in sheet pans at 40° C. for 48 hours and subsequently crushed and ground in a blender such that the ground material passed a No. 8 sieve. The ground material was then mixed with water resulting in a mixture that was 90-95% solids with the remainder being the added water (5-10%).

A 4"×8" mold in the Wabash press was filled with the wet mixture of ground precipitation material and a pressure of 64 tons (4000 psi) was applied to the precipitation material for about 10 seconds. The pressure was then released and the mold was reopened. Precipitation material that stuck to the sides of the mold was scraped and moved toward the center of the mold. The mold was then closed again and a pressure of 64 tons was applied for a total of 5 minutes. The pressure was subsequently released, the mold was reopened, and the pressed precipitation material (now aggregate) was removed from the mold and cooled under ambient conditions. Optionally, the aggregate may be transferred from the mold to a drying rack in a 110° C. oven and dried for 16 hours before cooling under ambient conditions.

Although the foregoing invention has been described in some detail by way of illustration and example for purposes of clarity of understanding, it should be readily apparent to those of ordinary skill in the art in light of the teachings of this invention that certain changes and modifications may be made thereto without departing from the spirit or scope of the appended claims. Accordingly, the preceding merely illustrates the principles of the invention. It will be appreciated that those skilled in the art will be able to devise various arrangements, which, although not explicitly described or shown herein, embody the principles of the invention, and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein. It is intended that the following claims define the scope of the invention and that methods and structures within the scope of these claims and their equivalents be covered thereby.

What is claimed is:

1. A method comprising:
    a) contacting an aqueous solution with metal oxide comprising CaO wherein the metal oxide provides proton-removing agent upon hydration of the CaO in the aqueous solution, wherein the metal oxide is slag, and wherein the aqueous solution further comprises a supplemental proton removing agent comprising ammonia;
    b) charging the aqueous solution with carbon dioxide from an industrial process; and
    c) subjecting the aqueous solution to precipitation conditions favoring precipitation of precipitation material comprising aragonite, vaterite, or mixture thereof.

2. The method of claim 1, wherein the metal oxide and the carbon dioxide are from the same industrial process.

3. The method of claim 1, wherein contacting the aqueous solution with the metal oxide occurs prior to charging the aqueous solution with the carbon dioxide.

4. The method of claim 1, wherein the carbon dioxide further comprises $SO_x$, $NO_x$, mercury, or any combinations thereof.

5. The method of claim 1, wherein the carbon dioxide is flue gas from a coal fired power plant or flue gas from cement plant.

6. The method of claim 1, wherein the slag is blast furnace slag, electric arc slag, steel slag, copper slag, nickel slag, phosphorus slag, or combinations thereof.

7. The method of claim 1, wherein the slag is steel slag.

8. The method of claim 1, wherein the metal oxide provides divalent cations comprising calcium ions, magnesium ions, or combinations thereof, for producing the precipitation material.

9. The method of claim 1, wherein the metal oxide further provides silica, alumina, ferric oxide, or a combination thereof.

10. The method of claim 1, wherein the aqueous solution comprises brine, seawater, or freshwater.

11. The method of claim 1, wherein the precipitation material further comprises $MgCO_3$.

12. The method of claim 1, wherein the precipitation material further comprises bicarbonate.

13. The method of claim 1, further comprising processing the precipitation material to form a building material selected from the group consisting of hydraulic cement, pozzolanic cement, and aggregate.

14. The method of claim 1, wherein the precipitation conditions are selected from the group consisting of temperature, pH, additive, ion ratio, rate of precipitation, mixing rate, form of agitation, presence of seed crystal, catalyst, membrane, or substrate, and combinations thereof.

15. The method of claim 1, further comprising separating the precipitation material from the supernatant.

16. The method of claim 1, further comprising drying the precipitation material.

* * * * *